US012677101B2

(12) United States Patent
Han et al.

(10) Patent No.: US 12,677,101 B2
(45) Date of Patent: Jul. 7, 2026

(54) VIBRATION APPARATUS AND APPARATUS INCLUDING THE SAME

(71) Applicant: LG Display Co., Ltd., Seoul (KR)

(72) Inventors: Joongsup Han, Paju-si (KR); Yongjoon Kim, Paju-si (KR); Sungsu Ham, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 54 days.

(21) Appl. No.: 17/502,614

(22) Filed: Oct. 15, 2021

(65) Prior Publication Data

US 2022/0124439 A1 Apr. 21, 2022

(30) Foreign Application Priority Data

Oct. 21, 2020 (KR) ........................ 10-2020-0137041

(51) Int. Cl.
| | |
|---|---|
| *H04R 23/00* | (2006.01) |
| *B06B 1/06* | (2006.01) |
| *G06F 1/16* | (2006.01) |
| *G10K 9/125* | (2006.01) |
| *H04R 7/04* | (2006.01) |
| *H04R 7/10* | (2006.01) |

(Continued)

(52) U.S. Cl.
CPC ............. *H04R 23/00* (2013.01); *H04R 7/045* (2013.01); *B06B 1/0603* (2013.01); *G06F 1/1605* (2013.01); *G10K 9/125* (2013.01); *H04R 7/10* (2013.01); *H04R 7/26* (2013.01); *H04R 17/00* (2013.01); *H04R 17/005* (2013.01); *H04R 2307/025* (2013.01); *H04R 2440/05* (2013.01); *H04R 2499/15* (2013.01)

(58) Field of Classification Search
CPC .... H04R 23/00; H04R 2499/15; H04R 7/045; H04R 17/005; H04R 7/10; H04R 17/00; H04R 2307/025; H04R 2440/05; B06B 1/0603; B06B 1/0688; G06F 1/1605; G10K 9/125
See application file for complete search history.

(56) References Cited

U.S. PATENT DOCUMENTS

| | | |
|---|---|---|
| 10,582,282 B2 | 3/2020 | Kim |
| 11,166,108 B2 | 11/2021 | Kim et al. |

(Continued)

FOREIGN PATENT DOCUMENTS

| | | |
|---|---|---|
| CN | 109862462 A | 6/2019 |
| CN | 104751743 B | 7/2019 |

(Continued)

OTHER PUBLICATIONS

Office Action dated Jun. 26, 2023, issued in corresponding Taiwanese Patent Application No. 11220611670.

(Continued)

*Primary Examiner* — Carolyn R Edwards
*Assistant Examiner* — Kuassi A Ganmavo
(74) *Attorney, Agent, or Firm* — Morgan, Lewis & Bockius LLP

(57) ABSTRACT

An apparatus may include a display panel configured to display an image, a vibration apparatus disposed at a rear surface of the display panel to vibrate the display panel, wherein the vibration apparatus includes a plurality of vibration structures, and a pad member disposed outside or inside the vibration apparatus.

48 Claims, 18 Drawing Sheets

(51) Int. Cl.
  *H04R 7/26* (2006.01)
  *H04R 17/00* (2006.01)

(56) References Cited

U.S. PATENT DOCUMENTS

| | | | | |
|---|---|---|---|---|
| 2005/0200243 | A1* | 9/2005 | Spangler | G03F 7/709 |
| | | | | 310/338 |
| 2006/0078138 | A1 | 4/2006 | Wada | |
| 2006/0152112 | A1* | 7/2006 | Sasaki | H10N 30/872 |
| | | | | 310/331 |
| 2006/0158064 | A1* | 7/2006 | Asakawa | H04R 1/2842 |
| | | | | 310/328 |
| 2010/0244630 | A1* | 9/2010 | Wada | H03H 9/19 |
| | | | | 29/25.35 |
| 2012/0153774 | A1* | 6/2012 | Maruyama | H02N 2/163 |
| | | | | 310/323.02 |
| 2014/0140551 | A1* | 5/2014 | Ramstein | H04R 17/005 |
| | | | | 381/182 |
| 2015/0169118 | A1* | 6/2015 | Lee | G06F 3/0445 |
| | | | | 345/174 |
| 2015/0185963 | A1 | 7/2015 | Lee et al. | |
| 2016/0128174 | A1* | 5/2016 | Lim | G02F 1/13458 |
| | | | | 174/254 |
| 2016/0190428 | A1* | 6/2016 | Lim | H05K 5/0017 |
| | | | | 310/317 |
| 2016/0241165 | A1* | 8/2016 | Miyazawa | H02N 2/004 |
| 2017/0192508 | A1* | 7/2017 | Lim | G06F 3/0412 |
| 2018/0091635 | A1* | 3/2018 | Lee | G06F 1/1688 |
| 2018/0098139 | A1* | 4/2018 | Arevalo Carreno . | H04R 31/006 |
| 2018/0102717 | A1* | 4/2018 | Hendriks | H10N 30/802 |
| 2018/0164888 | A1* | 6/2018 | Ham | H10N 30/877 |
| 2018/0288202 | A1* | 10/2018 | Park | B06B 1/06 |
| 2019/0027678 | A1* | 1/2019 | Kishimoto | H10N 30/50 |
| 2019/0028669 | A1* | 1/2019 | Shin | H10K 50/841 |
| 2019/0050024 | A1 | 2/2019 | Ahn et al. | |
| 2019/0166429 | A1 | 5/2019 | Lee et al. | |
| 2019/0182572 | A1* | 6/2019 | Kim | H04R 7/04 |
| 2019/0240698 | A1* | 8/2019 | Yonehara | B06B 1/0644 |
| 2020/0059375 | A1 | 2/2020 | Hewitt et al. | |
| 2020/0059733 | A1 | 2/2020 | Shin et al. | |
| 2020/0167122 | A1 | 5/2020 | Lee et al. | |
| 2020/0184939 | A1 | 6/2020 | Lee et al. | |
| 2020/0213764 | A1 | 7/2020 | Lee et al. | |
| 2020/0213768 | A1 | 7/2020 | Lee et al. | |
| 2020/0233629 | A1 | 7/2020 | Yeon et al. | |
| 2020/0287123 | A1* | 9/2020 | Jiang | H10N 30/092 |
| 2020/0314515 | A1 | 10/2020 | Jang et al. | |
| 2020/0314553 | A1 | 10/2020 | Kim et al. | |
| 2020/0314556 | A1 | 10/2020 | Lee et al. | |
| 2020/0401227 | A1* | 12/2020 | Kim | G06F 3/0446 |
| 2021/0400395 | A1 | 12/2021 | Miyoshi | |
| 2022/0246831 | A1* | 8/2022 | Ikeuchi | H10N 30/88 |

FOREIGN PATENT DOCUMENTS

| | | | |
|---|---|---|---|
| CN | 111225314 A | 6/2020 |
| CN | 111754858 A | 10/2020 |
| CN | 111755592 A | 10/2020 |
| CN | 111757220 A | 10/2020 |
| EP | 1414266 A2 | 4/2004 |
| GB | 2582674 A | 9/2020 |
| JP | 2012-216903 A | 11/2012 |
| KR | 10-2019-0018084 A | 2/2019 |
| KR | 10-2019-00683336 A | 6/2019 |
| KR | 10-2020-0058164 A | 5/2020 |
| KR | 10-2020-0082965 A | 7/2020 |
| KR | 10-2020-0083222 A | 7/2020 |
| KR | 10-2020-0091533 A | 7/2020 |
| KR | 10-2020-0114910 A | 10/2020 |
| TW | 202034709 A | 9/2020 |
| TW | 202036941 A | 10/2020 |

OTHER PUBLICATIONS

Extended European Search Report dated Mar. 23, 2022, issued in corresponding European Patent Application No. 21203538.0.

Japanese office action dated Oct. 31, 2022 issued in corresponding Japanese Patent Application No. 2021-170401.

Office Action issued Feb. 29, 2024 for European Patent Application No. 21203538.0. (Note: GB 2582674 A, US 2019/0028669 A1, US 2020/0213768 A1 & US 2020/0184939 A1 (D1-D4) were cited in a prior IDS.).

Office Action dated Mar. 18, 2024, issued in corresponding Chinese Patent Application No. 202111218931.5. (Note: US 2019/0028669 A1, US 2020/0059733 A1, US 2020/0184939 A1, and US 2020/0213768 A1 were previously cited).

Office Action dated Dec. 4, 2024 issued in corresponding Taiwanese Divisional Patent Application No. 11321253220. (Note: US 2019/0028669 A1, US 2005/0200243 A1, US 2016/0190428 A1, US 2019/0182572 A1, US 2014/0140551 A1, and US 2018/0288202 A1, cited in this TW Office Action, were previously in a PTO-892.).

Office Action dated Dec. 9, 2024 issued in corresponding Taiwanese Patent Application No. 11321264660. (Note: TW 202036941 A, US 2019/0028669 A1, and TW 202034709 A, cited in this TW Office Action, were cited in a previously-filed IDS or by the Examiner in a prior PTO-892.).

Office Action dated Dec. 10, 2024 issued in corresponding Korean Patent Application No. 10-2020-0137041. (Note: CN 111754858 A, cited in this KR Office Action, was cited in a previously-filed IDS.).

Office Action dated Mar. 25, 2025 issued in corresponding Japanese Patent Application No. 2024-061185. (Note: US 2020/0059733 A1 cited in this JP Office Action was cited in a prior IDS.).

* cited by examiner

211(210)

☒ : 211a

☐ : 211b

211(210)

☒ : 211a

☐ : 211b

III-III'

II-II'

FIG. 27
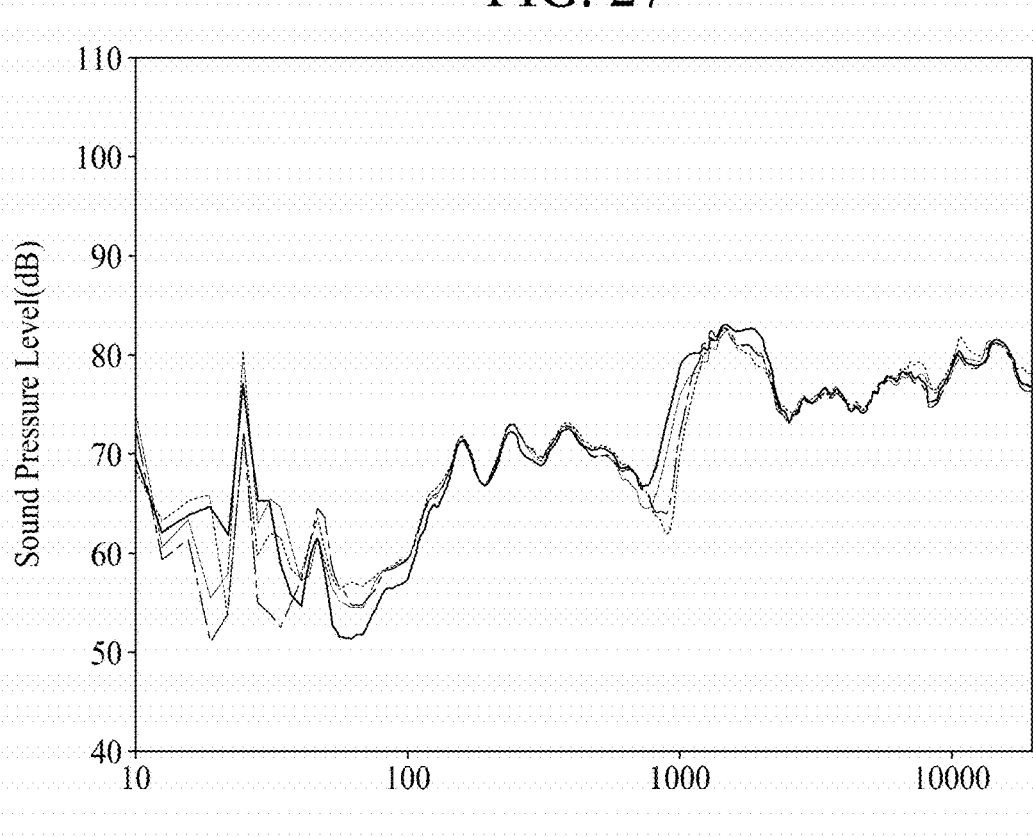
Frequency(Hz)
FIG. 28
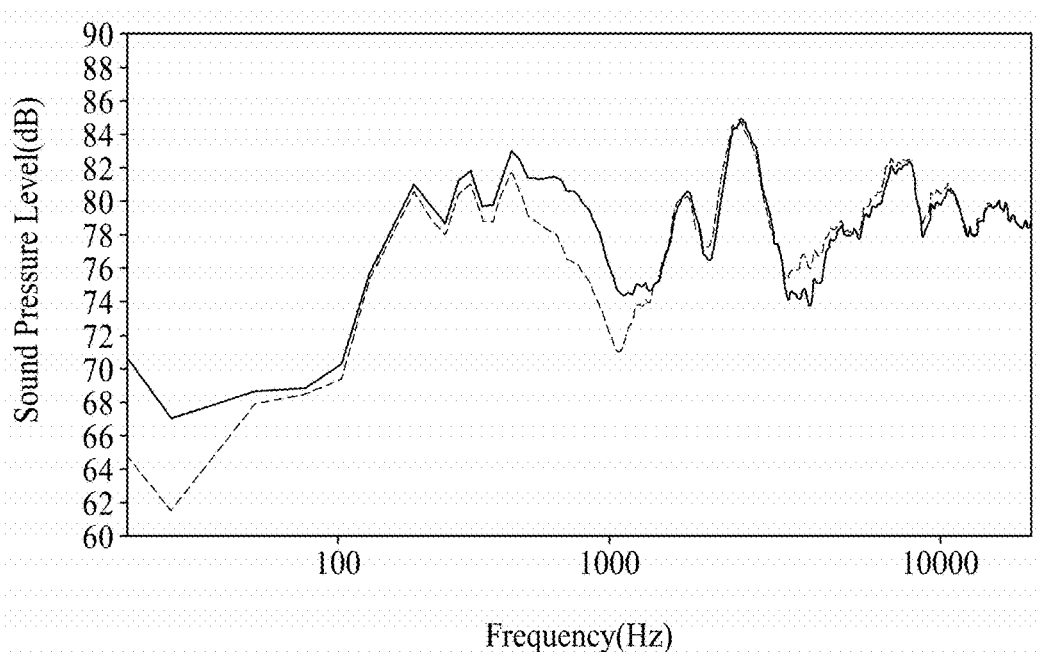
Frequency(Hz)

VIBRATION APPARATUS AND APPARATUS INCLUDING THE SAME

CROSS-REFERENCE TO RELATED APPLICATIONS

This application claims the benefit of and priority to Korean Patent Application No. 10-2020-0137041 filed on Oct. 21, 2020, the entirety of which is hereby incorporated by reference.

BACKGROUND

Technical Field

The present disclosure relates to a vibration apparatus and an apparatus including the same.

Discussion of the Related Art

Generally, in display apparatuses, a display panel displays an image, and a separate speaker should be installed for providing a sound. When a speaker is in a display apparatus, the speaker occupies a space; due to this, the design and spatial disposition of the display apparatus are limited.

A speaker applied to display apparatuses may be, for example, an actuator, including a magnet and a coil. However, when the actuator is applied to the display apparatuses, a thickness thereof is large. Piezoelectric elements that enable thinness to be implemented are attracting much attention.

Because the piezoelectric elements are fragile, the piezoelectric elements are easily damaged by an external impact, and thus the reliability of sound reproduction is low. Also, when a speaker such as a piezoelectric element is applied to a flexible display apparatus, there is a problem where damage occurs due to a fragile characteristic.

SUMMARY

The inventors of the present disclosure have recognized problems described above and have performed various experiments for implementing a vibration apparatus for enhancing the quality of a sound and a sound pressure level characteristic. Therefore, through the various experiments, the inventors of the present disclosure have invented an apparatus having a new structure, which includes a vibration apparatus for enhancing the quality of a sound and a sound pressure level characteristic.

Accordingly, embodiments of the present disclosure are directed to an apparatus that substantially obviates one or more problems due to limitations and disadvantages of the related art.

An aspect of the present disclosure is to provide a vibration apparatus and an apparatus including the same, which vibrates a vibration member (or vibration object) to generate a sound and have enhanced a sound pressure level characteristic.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, an apparatus comprises a display panel configured to display an image, a vibration apparatus disposed at a rear surface of the display panel to vibrate the display panel, the vibration apparatus including a plurality of vibration modules, and a pad member disposed outside or inside the vibration apparatus.

In another aspect of the present disclosure, an apparatus comprises a vibration portion including a plurality of vibration modules, and a pad member outside or inside the vibration portion.

In another aspect of the present disclosure, an apparatus comprises a vibration member, and a vibration apparatus disposed at the vibration member, the vibration apparatus comprises a vibration portion including a plurality of vibration modules, and a pad member outside or inside the vibration portion.

The apparatus according to the embodiments of the present disclosure may include a vibration apparatus which vibrates a vibration member (or vibration object), and thus, may generate a sound so that a traveling direction of the sound of the apparatus is a direction toward a forward region in front of the display panel or the vibration member (or vibration object).

According to embodiments of the present disclosure, a pad member may be provided outside or inside the vibration apparatus, thereby providing an apparatus having an enhanced sound output characteristic.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure.

It is to be understood that both the foregoing general description and the following detailed description of the present disclosure are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain principles of the disclosure.

FIG. 27 illustrates a sound output characteristic of an apparatus according to another embodiment of the present disclosure.

FIG. 28 illustrates a sound output characteristic of an apparatus according to another embodiment of the present disclosure.

Figure 1:
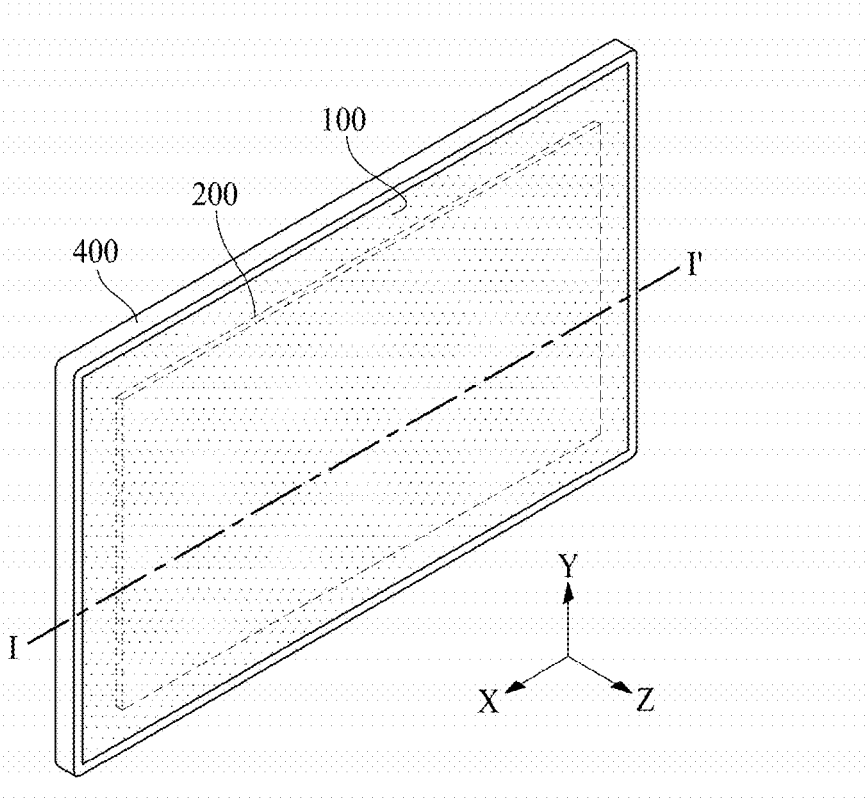
FIG. 1 illustrates an apparatus according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. When "comprise," "have," and "include" described in the present specification are used, another part may be added unless "only" is used. The terms of a singular form may include plural forms unless referred to the contrary.

In construing an element, the element is construed as including an error or tolerance range although there is no explicit description of such an error or tolerance range.

In describing a position relationship, for example, when a position relation between two parts is described as, for example, "on," "over," "under," and "next," one or more other parts may be disposed between the two parts unless a more limiting term, such as "just" or "direct(ly)" is used.

In describing a time relationship, for example, when the temporal order is described as, for example, "after," "subsequent," "next," and "before," a case that is not continuous may be included unless a more limiting term, such as "just," "immediate(ly)," or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. may be used. These terms are intended to identify the corresponding elements from the other elements, and basis, order, or number of the corresponding elements should not be limited by these terms. The expression that an element is "connected," "coupled," or "adhered" to another element or layer the element or layer can not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the present disclosure, examples of a display apparatus may include a narrow-sense display apparatus such as an organic light emitting display (OLED) module or a liquid crystal module (LCM) including a display panel and a driver for driving the display panel. Also, examples of the display apparatus may include a set device (or a set apparatus) or a set electronic apparatus such as a notebook computer, a TV, a computer monitor, an equipment apparatus including an automotive apparatus or another type apparatus for vehicles, or a mobile electronic device such as a smartphone or an electronic pad, which is a complete product (or a final product) including an LCM or an OLED module.

Therefore, in the present disclosure, examples of the display apparatus may include a narrow-sense display apparatus itself, such as an LCM or an OLED module, and a set device (or a set apparatus) which is a final consumer device or an application product including the LCM or the OLED module.

In some embodiments, an LCM or an OLED module including a display panel and a driver may be referred to as a narrow-sense display apparatus, and an electronic apparatus which is a final product including an LCM or an OLED module may be referred to as a set apparatus. For example, the narrow-sense display apparatus may include a display panel, such as an LCD or an OLED, and a source printed circuit board (PCB) which is a controller for driving the display panel. The set apparatus may further include a set PCB which is a set controller electrically connected to the source PCB to overall control the set apparatus.

A display panel applied to an embodiment of the present disclosure may use all types of display panels such as a liquid crystal display panel, an organic light emitting diode (OLED) display panel, and an electroluminescent display panel, but the terms are not limited to a specific display panel, which is vibrated by a vibration apparatus according to an embodiment of the present disclosure to output a sound. Also, a shape or a size of a display panel applied to a display apparatus according to an embodiment of the present disclosure is not limited.

For example, when the display panel is the liquid crystal display panel, the display panel may include a plurality of gate lines, a plurality of data lines, and a plurality of pixels respectively provided in a plurality of pixel areas defined by intersections of the gate lines and the data lines. Also, the display panel may include an array substrate including a thin film transistor (TFT) which is a switching element for adjusting a light transmittance of each of the plurality of pixels, an upper substrate including a color filter and/or a black matrix, and a liquid crystal layer between the array substrate and the upper substrate.

Moreover, when the display panel is the organic light emitting display panel, the display panel may include a plurality of gate lines, a plurality of data lines, and a plurality of pixels respectively provided in a plurality of pixel areas defined by intersections of the gate lines and the data lines. Also, the display panel may include an array substrate including a TFT which is an element for selectively applying a voltage to each of the pixels, an organic light emitting device layer on the array substrate, and an encapsulation substrate disposed at the array substrate to cover the organic light emitting device layer. The encapsulation substrate may protect the TFT and the organic light emitting device layer from an external impact and may prevent water or oxygen from penetrating into the organic light emitting device layer. Also, a layer provided on the array substrate may include an inorganic light emitting layer (for example, a nano-sized material layer, a quantum dot, or the like). As another embodiment of the present disclosure, the layer provided on the array substrate may include a micro light emitting diode.

The display panel may further include a backing such as a metal plate attached on the display panel. However, embodiments of the present disclosure are not limited to the metal plate, and the display panel may include another structure.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of the present disclosure will be described in detail with reference to the accompanying drawings. For convenience of description, a scale of each of elements illustrated in the accompanying drawings differs from a real scale, and thus, is not limited to a scale illustrated in the drawings.

In a case where a speaker is provided in a display apparatus so as to realize a sound in the display apparatus, the speaker may be implemented as a film-type, and thus, a thickness of the display apparatus may be thin. A film-type vibration apparatus may be manufactured to have a large area, and may be applied to a display apparatus having a large area. However, because the film-type vibration apparatus is low in a piezoelectric characteristic, it may be difficult to apply the film-type vibration apparatus to a display apparatus having a large area due to a low vibration. When ceramic is used for enhancing a piezoelectric characteristic, the film-type vibration apparatus may weak in durability, and a size of ceramic may be limited. When a vibration apparatus including a piezoelectric composite including piezoelectric ceramic is applied to a display apparatus, because the piezoelectric composite vibrates in a horizontal direction with respect to a left-right direction (for example, a horizontal direction with respect to a left-right direction of the display apparatus), it may unable to sufficiently vibrate the display apparatus in a vertical (or front-to-rear) direction. Thus, it may difficult to apply the vibration apparatus to the display apparatus, and it may unable to output a desired sound to a forward region in front of the display apparatus. In a case where a film-type piezoelectric element is applied to an apparatus, there may be a problem where a sound pressure level characteristic is lower than a speaker such as an actuator. In a case where a stack type piezoelectric element where a plurality of film-type piezoelectric elements are stacked as a plurality of layers is applied to an apparatus, power consumption may increase, and a thickness of the apparatus may be thickened. Also, when one vibration apparatus is disposed at a rear surface of a display panel (for example, a rear surface of a mobile apparatus), a mono sound may be output, but the inventors of the present disclosure have recognized a problem where it is difficult to output a stereo sound. Therefore, a vibration apparatus may be further disposed at a periphery of a display panel so as to implement a stereo sound, but the inventors of the present disclosure have recognized a problem where it is difficult to place an exciter in a flexible apparatus where a curved portion is provided in a display panel, and when a speaker including piezoelectric ceramic is provided, the piezoelectric ceramic is breakable.

Therefore, the inventors of the present disclosure have performed various experiments for implementing a vibration apparatus which may realize a stereo sound characteristic, may be applied to a flexible apparatus, and may vibrate in a vertical direction with respect to a widthwise direction of the display panel. Through the various experiments, the inventors of the present disclosure have invented an apparatus including a vibration apparatus having a new structure, which may realize a stereo sound characteristic and may be applied to a flexible apparatus. This will be described below in detail.

Figure 2:
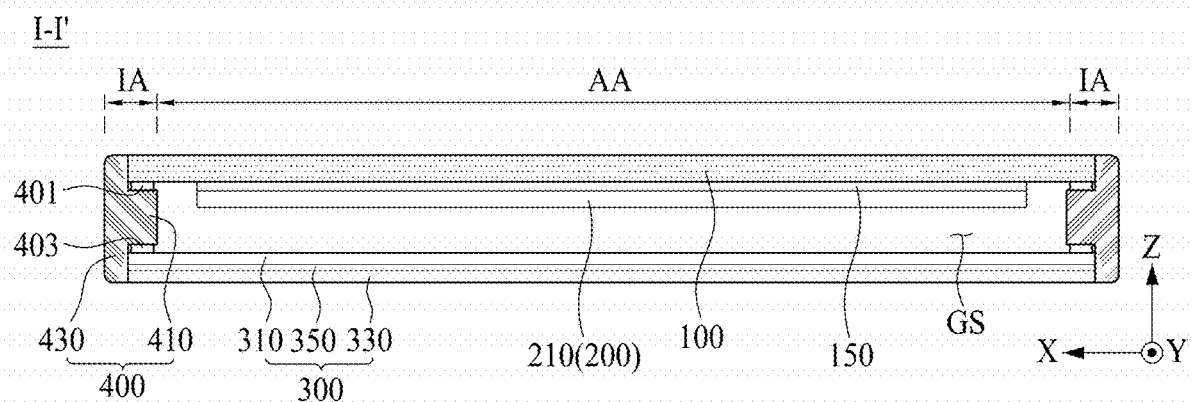
FIG. 2 is a cross-sectional view taken along line I-I' illustrated in FIG. 1.

FIG. 1 illustrates an apparatus according to an embodiment of the present disclosure, and FIG. 2 is a cross-sectional view taken along line I-I' illustrated in FIG. 1.

With reference to FIGS. 1 and 2, an apparatus according to an embodiment of the present disclosure may include a display panel 100 to display an image, and a vibration apparatus 200 disposed at a rear surface (or a backside surface) of the display panel 100.

It is noted that directional indications, such as rear surface or front surface, are given with respect to a user in front of the apparatus for viewing an image. That is, a front surface of a display panel (or a vibration member or a vibration object) may be a surface having a display area, i.e. a surface on which an image can be displayed. Likewise, a rear surface of a display panel (or a vibration member or a vibration object) may be a surface opposite to the front surface, i.e. facing away from a user. Also, a thickness direction may refer to a direction perpendicular to the front and/or rear surface. Further, "spaced apart in a plane parallel to the front/rear surface of the display panel" may mean that a distance parallel to the front/rear surface of the display panel (or a vibration member or a vibration object) is provided between two elements. Further, "planarly" may mean in a plane and/or parallel to the front/rear surface of the display panel.

The display panel 100 may display an electronic image or a digital image. For example, the display panel 100 may output light to display an image. The display panel 100 may be a curved display panel, or may be any type of display panel, such as a liquid crystal display panel, an organic light-emitting display panel, a quantum dot light-emitting display panel, a micro light-emitting diode display panel, and an electrophoresis display panel. The display panel 100 may be a flexible display panel. For example, the display panel 100 may a flexible light emitting display panel, a flexible electrophoretic display panel, a flexible electro-wetting display panel, a flexible micro light emitting diode display panel, or a flexible quantum dot light emitting display panel, but embodiments of the present disclosure are not limited thereto.

The display panel 100 according to an embodiment of the present disclosure may include a display area AA (or an active area) for displaying an image according to driving of the plurality of pixels. The display panel 100 may include a non-display area IA (or an inactive area) surrounding the display area AA, but embodiments of the present disclosure are not limited thereto.

The display panel 100 according to an embodiment of the present disclosure may be configured to display an image in a type such as a top emission type, a bottom emission type, a dual emission type, or the like according to a structure of the pixel array layer including an anode electrode, a cathode electrode, and a light emitting device. In the top emission type, an image may be displayed by outputting visible light generated from the pixel array layer to the forward region of a base substrate. In the bottom emission type, an image may be displayed by outputting visible light generated from the pixel array layer to the backward region of the base substrate.

The display panel 100 according to an embodiment of the present disclosure may include a pixel array part disposed at a pixel area configured by a plurality of gate lines and/or a plurality of data lines. The pixel array part may include a plurality of pixels which display image based on a signal supplied through the signal lines. The signal lines may include a gate line, a data line, a pixel driving power line, and/or the like, but embodiments of the present disclosure are not limited thereto.

Each of the plurality of pixels may include a pixel circuit layer including a driving thin film transistor (TFT) provided at the pixel area, an anode electrode electrically connected to the driving TFT, a light emitting device formed over the anode electrode, and a cathode electrode electrically connected to the light emitting device.

The driving TFT may be configured at a transistor region of each pixel area provided at a substrate. The driving TFT may include a gate electrode, a gate insulation layer, a semiconductor layer, a source electrode, and a drain electrode. The semiconductor layer of the driving TFT may include silicon such as amorphous silicon (a-Si), polysilicon (poly-Si), or low temperature poly-Si or may include oxide such as indium-gallium-zinc-oxide (IGZO), but embodiments of the present disclosure are not limited thereto.

The anode electrode may be provided at an opening region provided at each pixel area and may be electrically connected to the driving TFT.

A light emitting device according to an embodiment may include an organic light emitting device layer formed over an anode electrode. The organic light emitting device layer may be implemented to emit light having the same color (for example, white light) for each pixel, or may be implemented to emit light having a different color (for example, red light, green light, or blue light) for each pixel. A cathode electrode (or a common electrode) may be connected to the organic light emitting device layer provided in each pixel area in common. For example, the organic light emitting device layer may have a stack structure including a single structure or two or more structures including the same color for each pixel. As another embodiment of the present disclosure, the organic light emitting device layer may have a stack structure including two or more structures including one or more different colors for each pixel. The two or more structures including the one or more different colors may be configured with one or more of blue, red, yellow-green, and green or a combination thereof, but embodiments of the present disclosure are not limited thereto. An example of the combination may include blue and red, red and yellow-green, red and green, red/yellow-green/green, or the like, but embodiments of the present disclosure are not limited thereto. Also, regardless of a stack order thereof, the present disclosure may be applied. The stack structure including two or more structures having the same color or one or more different colors may further include a charge generating layer between the two or more structures. The charge generating layer may have a PN junction structure and may include an N-type charge generating layer and a P-type charge generating layer.

The light emitting device according to another embodiment of the present disclosure may include a micro light emitting diode device electrically connected to each of an anode electrode and a cathode electrode. The micro light emitting diode device may be a light emitting diode implemented as an integrated circuit (IC) or chip type. The micro light emitting diode device may include a first terminal electrically connected to the anode electrode and a second terminal electrically connected to the cathode electrode. The cathode electrode may be connected to the second terminal of the micro light emitting diode device provided in each pixel area in common.

An encapsulation part may be formed on the substrate to surround the pixel array part, thereby preventing oxygen or water from penetrating into the light emitting device of the pixel array part. The encapsulation part according to an embodiment of the present disclosure may be formed in a multi-layer structure where an organic material layer and an inorganic material layer are alternately stacked, but embodiment of the present disclosure is not limited thereto. The inorganic material layer may prevent oxygen or water from penetrating into the light emitting device of the pixel array part. The organic material layer may be formed to have a thickness which is relatively thicker than the inorganic material layer, so as to cover particles occurring in a manufacturing process. For example, the encapsulation part may include a first inorganic layer, an organic layer over the first inorganic layer, and a second inorganic layer over the organic layer. The organic layer may be a particle cover layer, but embodiments of the present disclosure are not limited thereto. The touch panel may be disposed over the encapsulation part, or may be disposed at a rear surface of the pixel array part.

The display panel 100 according to an embodiment of the present disclosure may include a first substrate, a second substrate, and a liquid crystal layer. The first substrate may be an upper substrate or a thin film transistor (TFT) array substrate. For example, the first substrate may include a pixel array (or a display part or a display area) including a plurality of pixels which are respectively provided in a plurality of pixel areas defined by intersections between a plurality of gate lines and/or a plurality of data lines. Each of the plurality of pixels may include a TFT connected to a gate line and/or a data line, a pixel electrode connected to the TFT, and a common electrode which is provided adjacent to the pixel electrode and is supplied with a common voltage.

The first substrate may further include a pad part provided at a first periphery (or a first non-display part) and a gate driving circuit provided at a second periphery (or a second non-display part).

The pad part may supply a signal, supplied from the outside, to the pixel array and/or the gate driving circuit. For example, the pad part may include a plurality of data pads connected to a plurality of data lines through a plurality of data link lines and/or a plurality of gate input pads connected to the gate driving circuit through a gate control signal line. For example, a size of the first substrate may be greater than the second substrate, but embodiments of the present disclosure are not limited thereto.

The gate driving circuit according to an embodiment of the present disclosure may be embedded (or integrated) into a second periphery of the first substrate so as to be connected to the plurality of gate lines. For example, the gate driving circuit may be implemented with a shift register including a transistor, which is formed through the same process as the TFT provided at the pixel area. The gate driving circuit according to another embodiment of the present disclosure may be implemented as an integrated circuit (IC) and may be provided at a panel driving circuit without being embedded into the first substrate.

The second substrate may be a lower substrate or a color filter array substrate. For example, the second substrate may include a pixel including an opening area overlapping with the pixel area formed in the first substrate, and a color filter layer formed at the opening area. The second substrate may have a size which is smaller than the first substrate, but embodiments of the present disclosure are not limited thereto. For example, the second substrate may overlap a remaining portion, other than the first periphery, of the upper substrate. The second substrate may be attached to a remaining portion, other than the first periphery, of the first substrate with a liquid crystal layer therebetween using a sealant.

The liquid crystal layer may be disposed between the first substrate and the second substrate. The liquid crystal layer may include a liquid crystal including liquid crystal molecules where an alignment direction thereof is changed based on an electric field generated by the common voltage and a data voltage applied to a pixel electrode for each pixel.

A second polarization member may be attached at a lower surface of the second substrate and may polarize light which is incident from the backlight and travels to the liquid crystal layer. A first polarization member may be attached at an upper surface of the first substrate and may polarize light which passes through the first substrate and is output to the outside.

The display panel 100 according to an embodiment of the present disclosure may drive the liquid crystal layer based on an electric field which is generated in each pixel by the data voltage and the common voltage applied to each pixel, and thus, may display an image based on light passing through the liquid crystal layer.

In display panel 100 according to another embodiment of the present disclosure, the first substrate may be implemented as the color filter array substrate, and the second substrate may be implemented as the TFT array substrate. For example, the display panel 100 according to another embodiment of the present disclosure may have a type where an upper portion and a lower portion of the display panel 100 are reversed therebetween. For example, a pad part of the display panel 100 according to another embodiment of the present disclosure may be covered by a separate mechanism or structure.

The display panel 100 according to another embodiment of the present disclosure may include a bending portion that may be bent or curved to have a curved shape or a certain curvature radius.

The bending portion of the display panel 100 may be in at least one of one periphery and the other periphery of the display panel 100, which are parallel to each other. The one periphery and/or the other periphery, where the bending portion is implemented, of the display panel 100 may include only the non-display area IA, or may include a periphery of the display area AA and the non-display area IA. The display panel 100 including the bending portion implemented by bending of the non-display area IA may have a one-side bezel bending structure or a both-side bezel bending structure. Moreover, the display panel 100 including the bending portion implemented by bending of the periphery of the display area AA and the non-display area IA may have a one-side active bending structure or a both-side active bending structure.

The vibration apparatus 200 may vibrate the display panel 100. For example, the vibration apparatus 200 may be implemented at the rear surface of the display panel 100 to directly vibrate the display panel 100. For example, the vibration apparatus 200 may vibrate the display panel 100 at the rear surface of the display panel 100, thereby providing a sound and/or a haptic feedback based on the vibration of the display panel 100 to a user (or a viewer). For example, the vibration apparatus 200 may be a vibration generating apparatus, a displacement apparatus, a sound apparatus, or a sound generating apparatus, but embodiments of the present disclosure are not limited thereto.

According to an embodiment of the present disclosure, the vibration apparatus 200 may vibrate according to a voice signal synchronized with an image displayed by the display panel 100 to vibrate the display panel 100. As another embodiment of the present disclosure, the vibration apparatus 200 may vibrate according to a haptic feedback signal (or a tactile feedback signal) synchronized with a user touch applied to a touch panel (or a touch sensor layer) which is disposed at the display panel 100 or embedded into the display panel 100 and may vibrate the display panel 100.

Accordingly, the display panel 100 may vibrate based on a vibration of the vibration apparatus 200 to provide a user (or a viewer) with at least one or more of a sound and a haptic feedback.

The vibration apparatus 200 according to an embodiment of the present disclosure may be implemented to have a size corresponding to the display area AA of the display panel 100. A size of the vibration apparatus 200 may be 0.9 to 1.1 times a size of the display area AA, but embodiments of the present disclosure are not limited thereto. For example, a size of the vibration apparatus 200 may be the same as or smaller than the size of the display area AA. For example, a size of the vibration apparatus 200 may be the same as or approximately same as the display area AA of the display panel 100, and thus, the vibration apparatus 200 may cover a most region of the display panel 100 and a vibration generated by the vibration apparatus 200 may vibrate a whole portion of the display panel 100, and thus, localization of a sound may be high, and satisfaction of a user may be improved. Also, a contact area (or panel coverage) between the display panel 100 and the vibration apparatus 200 may increase, and thus, a vibration region of the display panel 100 may increase, thereby improving a sound of a middle-low-pitched sound band generated based on a vibration of the display panel 100. Also, a vibration apparatus 200 applied to a large-sized display apparatus may vibrate the entire display panel 100 having a large size (or a large area), and thus, localization of a sound based on a vibration of the display panel 100 may be further enhanced, thereby realizing an improved sound effect. Therefore, the vibration apparatus 200 according to an embodiment of the present disclosure may be on the rear surface of the display panel 100 to sufficiently vibrate the display panel 100 in a vertical (or front-to-rear) direction, thereby outputting a desired sound to a forward region in front of the apparatus or the display apparatus. For example, the vibration apparatus 200 according to an embodiment of the present disclosure may be disposed at the rear surface of the display panel 100 to sufficiently vibrate the display panel 100 in a vertical (or front-to-rear) direction with respect to a first direction (X) of the display panel 100, thereby outputting a desired sound to a forward region in front of the apparatus or the display apparatus.

The vibration apparatus 200 may include a vibration generator 210 disposed at or connected to a rear surface (or a backside surface) of the display panel 100. The vibration apparatus 200 according to an embodiment of the present disclosure may be implemented as a film-type. Since the vibration apparatus 200 may be implemented as a film-type, it may have a thickness which is thinner than the display panel 100, and thus, a thickness of the display apparatus may not increase due to the arrangement of the vibration apparatus 200. For example, the vibration apparatus 200 may be referred to as a sound generating module, a sound generating device, a film actuator, a film-type piezoelectric composite actuator, a film speaker, a film-type piezoelectric speaker, a film-type piezoelectric composite speaker, or the like, which uses the display panel 100 as a vibration plate, but embodiments of the present disclosure are not limited thereto. As another embodiment of the present disclosure, the vibration apparatus 200 may not be disposed at the rear surface of the display panel 100 and may be applied to a non-display panel instead of the display panel. For example, the non-display panel may be one or more of wood, plastic, glass, cloth, paper, a vehicle interior material, a building indoor ceiling, an aircraft interior material, and the like, but embodiments of the present disclosure are not limited thereto. In this case, the non-display panel may be applied as a vibration plate, and the vibration apparatus 200 may vibrate the non-display panel to output a sound.

For example, the apparatus according to an embodiment of the present disclosure may include a vibration member (or a vibration object) and a vibration apparatus 200 disposed at the vibration member. For example, the vibration member may include a display panel including a pixel configured to display an image, or may include a non-display panel. For example, the vibration member may include a display panel including a pixel configured to display an image, or may include one or more among wood, plastic, glass, cloth, paper, a vehicle interior material, a vehicle glass window, a building indoor ceiling, a building glass window, a building interior material, an aircraft interior material, an aircraft glass window, but embodiments of the present disclosure are not limited thereto. For example, the vibration member may include one or more among a display panel including a pixel configured to display an image, a screen panel on which an image is projected from a display apparatus, a lighting panel, a signage panel, a vehicular interior material, a vehicular glass window, a vehicular exterior material, a building ceiling material, a building interior material, a building glass window, an aircraft interior material, an aircraft glass window, and a mirror, but embodiments of the present disclosure are not limited thereto. For example, the non-display panel may be a light emitting diode lighting panel (or apparatus), an organic light emitting lighting panel (or apparatus), an inorganic light emitting lighting panel (or apparatus), and the like, but embodiments of the present disclosure are not limited thereto. For example, the vibration member may include a display panel including a pixel configured to display an image, or may include one or more of a light emitting diode lighting panel (or apparatus), an organic light emitting lighting panel (or apparatus), an inorganic light emitting lighting panel (or apparatus), but embodiments of the present disclosure are not limited thereto.

According to another embodiment of the present disclosure, the vibration member may include a plate, and the plate may include a metal material, or may include one or more single nonmetal materials or composite nonmetal materials of wood, plastic, glass, cloth, paper, and leather. However, embodiments of the present disclosure are not limited thereto. According to another embodiment of the present disclosure, the vibration member may include one or more of wood, plastic, glass, cloth, paper, and leather, but embodiments of the present disclosure are not limited thereto. For example, the paper may be cone (or cone paper) for speakers. For example, the cone may be formed of pulp or foamed plastic, but embodiments of the present disclosure are not limited thereto. For example, the vibration member may be a vibration object, a vibration plate, or a front member, but embodiments of the present disclosure are not limited thereto.

The vibration generator 210 may be disposed at the rear surface of the display panel 100 to overlap the display area of the display panel 100. For example, the vibration generator 210 may overlap half or more of the display area of the display panel 100. As another embodiment of the present disclosure, the vibration generator 210 may overlap the whole display area of the display panel 100.

The vibration generator 210 according to an embodiment of the present disclosure may vibrate by alternately and repeatedly contract and expand based on an inverse piezoelectric effect when an alternating current (AC) voltage is applied, thereby directly vibrating the display panel 100 through the vibration thereof. For example, the vibration generator 210 may vibrate according to a voice signal synchronized with an image displayed by the display panel 100 to vibrate the display panel 100. As another embodiment of the present disclosure, the vibration generator 210 may vibrate according to a haptic feedback signal (or a tactile feedback signal) synchronized with a user touch applied to a touch panel (or a touch sensor layer) which is disposed over the display panel 100 or embedded into the display panel 100 and may vibrate the display panel 100. Accordingly, the display panel 100 may vibrate based on a vibration of the vibration generator 210 to provide a user (or a viewer) with at least one or more of a sound and a haptic feedback.

Therefore, the apparatus according to an embodiment of the present disclosure may output a sound, generated by a vibration of the display panel 100 based on a vibration of the vibration generator 210, in a forward region in front of the display panel. Moreover, in the apparatus according to an embodiment of the present disclosure, a most region of the display panel 100 may be vibrated by the vibration generator 210 having a film-type, thereby more enhancing a sense of sound localization and a sound pressure level characteristic of a sound based on the vibration of the display panel 100.

The apparatus according to an embodiment of the present disclosure may further include a connection member (or a first connection member) 150 disposed between the display panel 100 and the vibration apparatus 200.

According to an embodiment of the present disclosure, the connection member 150 may be disposed between the display panel 100 and the vibration apparatus 200, and may connect or couple the vibration apparatus 200 to the rear surface of the display panel 100. For example, the vibration apparatus 200 may be connected or coupled to the rear surface of the display panel 100 by the connection member 150, and thus, may be supported by or disposed at the rear surface of the display panel 100. For example, the vibration generator 210 may be disposed at the rear surface of the display panel 100 by the connection member 150.

The connection member 150 according to an embodiment of the present disclosure may include a material including an adhesive layer which is good in adhesive force or attaching force with respect to each of the rear surface of the display panel 100 and the vibration apparatus 200. For example, the connection member 150 may include a foam pad, a double-sided tape, an adhesive, or the like, but embodiments of the present disclosure are not limited thereto. For example, the adhesive layer of the connection member 150 may include epoxy, acrylic, silicone, or urethane, but embodiments of the present disclosure are not limited thereto. For example, the adhesive layer of the connection member 150 may include an acrylic-based material which is relatively better in adhesive force and hardness among acrylic and urethane. Accordingly, a vibration of the vibration apparatus 200 may be transferred to the display panel 100 well.

The adhesive layer of the connection member 150 may further include an additive, such as a tackifier or an adhesion enhancing agent, a wax component, an anti-oxidation agent, or the like. The additive may prevent or reduce the connection member 150 from being detached (stripped) from the display panel 100 by a vibration of the vibration apparatus 200. For example, the tackifier may be rosin derivative or the like, and the wax component may be paraffin wax or the like. For example, the anti-oxidation agent may be a phenol-based anti-oxidation agent, such as thioester, but embodiments of the present disclosure are not limited thereto.

The connection member 150 according to another embodiment of the present disclosure may further include a hollow portion between the display panel 100 and the vibration apparatus 200. The hollow portion of the connection member 150 may provide an air gap between the display panel 100 and the vibration apparatus 200. Due to the air gap, a sound wave (or a sound pressure) based on a vibration of the vibration apparatus 200 may not be dispersed by the connection member 150, and may concentrate on the display panel 100. Thus, the loss of a vibration caused by the connection member 150 may be minimized, thereby increasing a sound characteristic and/or a sound pressure level characteristic of a sound generated based on a vibration of the display panel 100.

The apparatus according to an embodiment of the present disclosure may further include a supporting member 300 disposed at a rear surface of the display panel 100.

The supporting member 300 may cover a rear surface of the display panel 100. For example, the supporting member 300 may cover a whole rear surface of the display panel 100 with a gap space GS therebetween. For example, the supporting member 300 may include at least one or more among a glass material, a metal material, and a plastic material. For example, the supporting member 300 may be a rear surface structure, a supporting structure, a supporting cover, a rear member, a case, a housing, or a set structure, but embodiments of the present disclosure are not limited thereto. For example, the supporting member 300 may be referred to as the other term such as a cover bottom, a plate bottom, a back cover, a base frame, a metal frame, a metal chassis, a chassis base, or m-chassis. For example, the supporting member 300 may be implemented as an arbitrary type frame or a plate-shaped structure disposed at a rear surface of the display panel 100.

A periphery or a sharp corner of the supporting member 300 may have an inclined shape or a curved shape through a chamfer process or a corner rounding process. For example, the supporting member 300 of the glass material may be sapphire glass. As another embodiment of the present disclosure, the supporting member 300 of the metal material may include one or more of aluminum (Al), an Al alloy, a magnesium (Mg), a Mg alloy, and an iron (Fe)-nickel (Ni) alloy.

The supporting member 300 according to an embodiment of the present disclosure may include a first supporting member 310 and a second supporting member 330.

The first supporting member 310 may cover a rear surface of the display panel 100. For example, the first supporting member 310 may cover a whole rear surface of the first supporting member 310. For example, the first supporting member 310 may be a member which covers a whole rear surface of the first supporting member 310. For example, the first supporting member 310 may include one or more materials of a glass material, a metal material, and a plastic material. For example, the first supporting member 310 may be a first rear structure, a first supporting structure, a first supporting cover, a first back cover, a first rear member, an inner plate, or an internal plate, but embodiments of the present disclosure are not limited thereto.

The first supporting member 310 may be spaced apart from a rearmost surface of the display panel 100 with a gap space GS therebetween. For example, the gap space GS may be referred to as an air gap, a vibration space, a sound resonance box, or the like, but embodiments of the present disclosure are not limited thereto.

The second supporting member 330 may be disposed at a rear surface of the first supporting member 310. The second supporting member 330 may be a plate-shaped member which covers the whole rear surface of the first supporting member 310. For example, the second supporting member 330 may include at least one or more among a glass material, a metal material, and a plastic material. For example, the second supporting member 330 may be a second rear structure, a second supporting structure, a second supporting cover, a second back cover, a second rear member, an external plate, an outer plate, a rear plate, a back plate, or a rear cover, but embodiments of the present disclosure are not limited thereto.

The supporting member 300 according to an embodiment of the present disclosure may further include a connection member (or a second connection member) 350.

The connection member 350 may be disposed between the first supporting member 310 and the second supporting member 330. For example, the first supporting member 310 and the second supporting member 330 may be coupled or connected to each other by the connection member 350. For example, the connection member 350 may be an adhesive resin, a double-sided tape, or a double-sided adhesive foam pad, but embodiments of the present disclosure are not limited thereto. For example, the connection member 350 may have elasticity for absorbing an impact, but embodiments of the present disclosure are not limited thereto. For example, the connection member 350 may be disposed at a whole region between the first supporting member 310 and the second supporting member 330. As another embodiment of the present disclosure, the connection member 350 may be provided in a mesh structure including an air gap between the first supporting member 310 and the second supporting member 330.

The apparatus according to an embodiment of the present disclosure may further include a middle frame 400. The middle frame 400 may be disposed between a rear periphery of the display panel 100 and a front periphery of the supporting member 300. The middle frame 400 may support at least one or more among the rear periphery of the display panel 100 and the front periphery of the supporting member 300. The middle frame 400 may surround one or more of side surfaces among each of the display panel 100 and the supporting member 300. The middle frame 400 may provide a gap space GS between the display panel 100 and the supporting member 300. The middle frame 400 may be referred to as a connection member, a frame, a frame member, an intermediate member, a side cover member, a middle cabinet, a middle cover, a middle chassis, or the like, but embodiments of the present disclosure are not limited thereto.

The middle frame 400 according to an embodiment of the present disclosure may include a first supporting portion 410 and a second supporting portion 430. For example, the first supporting portion 410 may be a supporting portion, but embodiments of the present disclosure are not limited thereto. For example, the second supporting portion 430 may be a sidewall portion, but embodiments of the present disclosure are not limited thereto.

The first supporting portion 410 may be disposed between the rear periphery of the display panel 100 and the front periphery of the supporting member 300, and thus, may provide a gap space GS between the display panel 100 and the supporting member 300. A front surface of the first supporting portion 410 may be coupled or connected to the rear periphery of the display panel 100 by a first frame connection member 401. A rear surface of the first supporting portion 410 may be coupled or connected to the front periphery of the supporting member 300 by a second frame connection member 403. For example, the first supporting portion 710 may have a single picture frame structure having a square shape or a frame structure having a plurality of divided bar shapes, but embodiments of the present disclosure are not limited thereto.

The second supporting portion 430 may be disposed in parallel with a thickness direction Z of the apparatus. For example, the second supporting portion 430 may be vertically coupled to an outer surface of the first supporting portion 410 in parallel with a thickness direction Z of the apparatus. The second supporting portion 430 may surround one or more among an outer surface of the display panel 100 and an outer surface of the supporting member 300, thereby protecting the outer surface of each of the display panel 100 and the supporting member 300. The first supporting portion 410 may protrude from an inner surface of the second supporting portion 430 toward the gap space GS between the display panel 100 and the supporting member 300.

The apparatus according to an embodiment of the present disclosure may include a panel connection member instead of the middle frame 400.

The panel connection member may be disposed between the rear periphery of the display panel 100 and the front periphery of the supporting member 300 and may provide the gap space GS between the display panel 100 and the supporting member 300. The panel connection member may be disposed between the rear periphery of the display panel 100 and the front periphery of the supporting member 300 to adhere the display panel 100 and the supporting member 300. For example, the panel connection member may be a double-sided tape, a single-sided tape, or a double-sided adhesive foam pad, but embodiments of the present disclosure are not limited thereto. For example, the panel connection member may include epoxy, acrylic, silicone, or urethane, but embodiments of the present disclosure are not limited thereto. For example, in order to minimize the vibration of the display panel 100 from being transmitted to the supporting member 300, an adhesive layer of the panel connection member may include a urethane-based material which relatively has a ductile characteristic compared to acrylic among acrylic and urethane. Accordingly, a vibration of the display panel 100 transmitted to the supporting member 300 may be minimized.

In the apparatus according to an embodiment of the present disclosure, when the apparatus includes a panel connection member instead of a middle frame 400, the supporting member 300 may include a bending sidewall which is bent from an end (or an end portion) of the second supporting member 330 and surrounds one or more among an outer surface (or an outer sidewall) of each of the first supporting member 310, the panel connection member, and the display panel 100. The bending sidewall according to an embodiment of the present disclosure may have a single sidewall structure or a hemming structure. The hemming structure may be a structure where end portions of an arbitrary member are bent in a curve shape and overlap each other or are apart from each other in parallel. For example, in order to enhance a sense of beauty in design, the bending sidewall may include a first bending sidewall, bent from one side of the second supporting member 330, and a second bending sidewall bent from the first bending sidewall to a region between the first bending sidewall and an outer surface of the display panel 100. The second bending sidewall may be apart from an inner surface of the first bending sidewall. Therefore, the second bending sidewall may prevent the outer surface of the display panel 100 from contacting an inner surface of the first bending sidewall or may prevent a lateral-direction external impact from being transferred to the outer surface of the display panel 100.

According to another embodiment of the present disclosure, the middle frame 400 may be omitted. The apparatus according to another embodiment of the present disclosure may include the panel connection member or adhesive member instead of the middle frame 400. The apparatus according to another embodiment of the present disclosure may include a partition instead of the middle frame 400.

Figures 3, 4:
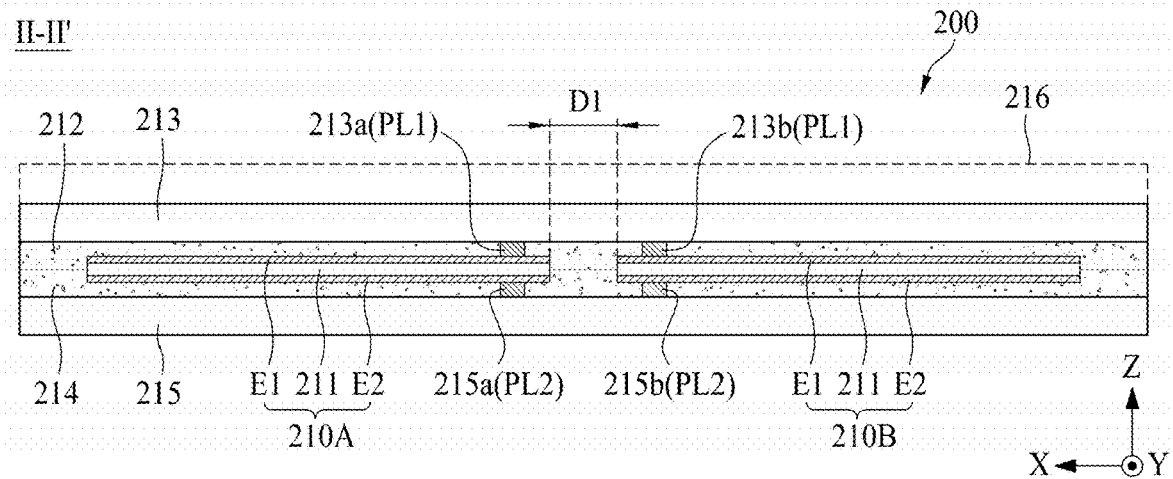
FIG. 3 illustrates a vibration apparatus according to an embodiment of the present disclosure.
FIG. 4 is a cross-sectional view taken along line II-II' illustrated in FIG. 3.

FIG. 3 illustrates a vibration apparatus according to an embodiment of the present disclosure. FIG. 4 is a cross-sectional view taken along line II-IF illustrated in FIG. 3.

With reference to FIGS. 2 to 4, the vibration apparatus 200 according to an embodiment of the present disclosure may include a vibration generator 210.

The vibration generator 210 according to an embodiment of the present disclosure may include a plurality of vibration structures 210A to 210D which are electrically disconnected from one another and are disposed spaced apart from one another in a first direction X (or a widthwise direction) and a second direction Y (or a lengthwise direction) intersecting with the first direction X. Each of the plurality of vibration structures 210A to 210D may alternately and/or repeatedly contract and expand based on a piezoelectric effect (or a piezoelectric characteristic) to vibrate. The vibration generator 210 according to an embodiment of the present disclosure may alternately and/or repeatedly contract and expand based on an inverse piezoelectric effect (or a piezoelectric characteristic) to vibrate in a thickness direction Z, thereby directly vibrating the display panel 100. The vibration generator 210 may include the plurality of vibration structures 210A to 210D which are disposed or tiled at a certain interval. For example, the plurality of vibration structures 210A to 210D may each be a vibration array, a vibration generating array, a division vibration array, a partial vibration array, a division vibration structure, a partial vibration structure, an individual vibration structure, a vibration module, a vibration module array portion, a vibration array structure, a vibration film, a displacement generator, a vibration layer, a displacement structure, a sound generating structure, a sound generator, a tiling vibration array, a tiling vibration array module, or a tiling vibration film, but embodiments of the present disclosure are not limited thereto. The vibration generator 210 may be referred to as a vibration film, a displacement generator, a displacement film, a displacement structure, a sound generating structure, a sound generator, a tiling vibration array, a tiling vibration array module, or a tiling vibration film, but embodiments of the present disclosure are not limited thereto.

Each of the plurality of vibration structures 210A to 210D according to an embodiment of the present disclosure may have a tetragonal shape or a square shape. For example, each of the plurality of vibration structures 210A to 210D may have a tetragonal shape having a width of about 5 cm or more. For example, each of the plurality of vibration structures 210A to 210D may have a square shape having a size of 5 cm×5 cm or more.

The plurality of vibration structures 210A to 210D may be disposed or tiled in i×j form on the same plane, and thus, the vibration generator 210 may have an enlarged area based on tiling of the plurality of vibration structures 210A to 210D having a relatively small size. For example, i may be the number of vibration structures arranged in the first direction X or may be a natural number of 2 or more, and j may be the number of vibration structures arranged in the second direction Y or may be a natural number of 1 or more which is the same as or different from i.

The plurality of vibration structures 210A to 210D may be disposed or tiled at a certain interval (or distance), and thus, may be implemented as one vibration apparatus (or a single vibration apparatus) which is driven as one complete single body without being independently driven. According to an embodiment of the present disclosure, with respect to the first direction X, a first separation distance D1 between the plurality of vibration structures 210A to 210D may be 0.1 mm or more and smaller than 3 cm, but embodiments of the present disclosure are not limited thereto. Also, with respect to the second direction Y, a second separation distance D2 between the plurality of vibration structures 210A to 210D may be 0.1 mm or more and smaller than 3 cm, but embodiments of the present disclosure are not limited thereto. For example, the first separation distance D1 may be the same as the second separation distance D2. For example, the first separation distance D1 may be the same as the second separation distance D2 within a process error range.

According to an embodiment of the present disclosure, the plurality of vibration structures 210A to 210D may be disposed or tiled to have the separation distances (or intervals) D1 and D2 of 0.1 mm or more and smaller than 3 cm, and thus, may be driven as one vibration apparatus. Thereby, a reproduction band and a sound pressure level characteristic of a sound which is generated based on a single vibration of the plurality of vibration structures 210A to 210D may be increased. For example, the plurality of vibration structures 210A to 210D may be arranged at an interval of 0.1 mm or more and smaller than 5 mm, in order to increase a reproduction band of a sound generated based on a single vibration of the plurality of vibration structures 210A to 210D and to increase a sound of a low-pitched sound band (for example, a sound pressure level characteristic in 500 Hz or less).

According to an embodiment of the present disclosure, in a case where the plurality of vibration structures 210A to 210D are arranged at the intervals D1 and D2 of smaller than 0.1 mm or without the intervals D1 and D2, the reliability of the vibration structures 210A to 210D or the vibration generator 210 may be reduced due to damage or a crack caused by a physical contact therebetween which occurs when each of the vibration structures 210A to 210D vibrates.

According to an embodiment of the present disclosure, in a case where the plurality of vibration structures 210A to 210D are arranged at the intervals D1 and D2 of 3 cm or more, the plurality of vibration structures 210A to 210D may not be driven as one vibration apparatus due to an independent vibration of each of the plurality of vibration structures 210A to 210D. Therefore, a reproduction band and a sound pressure level characteristic of a sound which is generated based on vibrations of the plurality of vibration structures 210A to 210D may be reduced. For example, in a case where the plurality of vibration structures 210A to 210D are arranged at the intervals D1 and D2 of 3 cm or more, a sound characteristic and a sound pressure level characteristic of the low-pitched sound band (for example, in 500 Hz or less) may each be reduced.

According to an embodiment of the present disclosure, in a case where the plurality of vibration structures 210A to 210D are arranged at an interval of 5 mm, each of the plurality of vibration structures 210A to 210D may not be perfectly driven as one vibration apparatus, and thus, a sound characteristic and a sound pressure level characteristic of the low-pitched sound band (for example, in 200 Hz or less) may each be reduced.

According to another embodiment of the present disclosure, in a case where the plurality of vibration structures 210A to 210D are arranged at an interval of 1 mm, each of the plurality of vibration structures 210A to 210D may be driven as one vibration apparatus, and thus, a reproduction band of a sound may increase and a sound of the low-pitched sound band (for example, a sound pressure level character- istic in 500 Hz or less) may increase. For example, in a case where the plurality of vibration structures 210A to 210D are arranged at an interval of 1 mm, the vibration generator 210 may be implemented as a large-area vibrator which is enlarged based on optimization of a separation distance between the plurality of vibration structures 210A to 210D. Therefore, the vibration generator 210 may be driven as a large-area vibrator based on a single vibration of the plu- rality of vibration structures 210A to 210D, and thus, a sound characteristic and a sound pressure level characteristic may each increase in the low-pitched sound band and a reproduction band of a sound generated based on a large- area vibration of the vibration generator 210.

Therefore, in order to implement a single vibration (or one vibration apparatus) of the plurality of vibration structures 210A to 210D, a separation distance between the plurality of vibration structures 210A to 210D may be adjusted to 0.1 mm or more and smaller than 3 cm. Also, in order to implement a single vibration (or one vibration apparatus) of the plurality of vibration structures 210A to 210D and to increase a sound pressure level characteristic of a sound of the low-pitched sound band, the separation distance between the plurality of vibration structures 210A to 210D may be adjusted to 0.1 mm or more and smaller than 5 mm.

The vibration generator 210 according to an embodiment of the present disclosure may include first to fourth vibration structures 210A to 210D which are electrically disconnected from one another and are disposed spaced apart from one another in each of the first direction X and the second direction Y. For example, the first to fourth vibration struc- tures 210A to 210D may be arranged or tiled in 2×2 form.

According to an embodiment of the present disclosure, the first and second vibration structures 210A and 210B may be spaced apart from each other in the first direction X. The third and fourth vibration structures 210C and 210D may be spaced apart from each other in the first direction X and may be spaced apart from each of the first and second vibration structures 210A and 210B in the second direction Y. The first and third vibration structures 210A and 210C may be spaced apart from each other in the second direction Y to face each other. The second and fourth vibration structures 210B and 210D may be spaced apart from each other in the second direction Y to face each other.

According to an embodiment of the present disclosure, the first to fourth vibration structures 210A to 210D may be arranged (or tiled) at the intervals D1 and D2 of 0.1 mm or more and smaller than 3 cm or may be arranged (or tiled) at the interval of 0.1 mm or more and smaller than 5 mm in each of the first direction X and the second direction Y, so that the first to fourth vibration structures 210A to 210D are driven as one vibration apparatus or are driven for a single vibration or a vibration of a large-area vibrator of the vibration apparatus 200.

Each of the first to fourth vibration structures 210A to 210D according to an embodiment of the present disclosure may include a vibration portion 211, a first electrode layer E1, and a second electrode layer E2.

The vibration portion 211 may include a piezoelectric material, a composite piezoelectric material, or an electro- active material, and the piezoelectric material, the composite piezoelectric material and the electroactive material may have a piezoelectric effect. The vibration portion 211 may include an inorganic material and an organic material. For example, the vibration portion 211 may include a plurality of inorganic material portion configured as a piezoelectric material and at least one organic material portion configured as a flexible material. For example, the vibration portion 211 may be referred to as a piezoelectric vibration portion, a piezoelectric vibration layer, a piezoelectric displacement portion, a piezoelectric displacement layer, a sound wave generating portion, a sound wave generating layer, a piezo- electric composite layer, a piezoelectric composite, or a piezoelectric ceramic composite, but embodiments of the present disclosure are not limited thereto. The vibration portion 211 may be formed of a transparent, semitranspar- ent, or opaque piezoelectric material, and the vibration portion 211 may be transparent, semitransparent, or opaque.

The vibration portion 211 according to an embodiment of the present disclosure may include a ceramic-based material capable of realizing a relatively high vibration. For example, the vibration portion 211 may include a 1-3 composite structure or a 2-2 composite structure. For example, a piezoelectric deformation coefficient "$d_{33}$" of the vibration portion 211 in a thickness direction Z may have 1,000 pC/N or more, but embodiments of the present disclosure are not limited thereto.

The first electrode layer E1 may be disposed at a first surface (or an upper surface) of the vibration portion 211 and may be electrically connected to the first surface of the vibration portion 211. For example, the first electrode layer E1 may have a single-body electrode type (or a common electrode type) which is disposed at a whole first surface of the vibration portion 211. The first electrode layer E1 according to an embodiment of the present disclosure may include a transparent conductive material, a semitransparent (or translucent) conductive material, or an opaque conduc- tive material. For example, examples of the transparent conductive material or the semitransparent conductive mate- rial may include indium tin oxide (ITO) or indium zinc oxide (IZO), but embodiments of the present disclosure are not limited thereto. The opaque conductive material may include aluminum (Al), copper (Cu), gold (Au), silver (Ag), molybdenum (Mo), magnesium (Mg), or the like, and an alloy of any thereof, but embodiments of the present dis- closure are not limited thereto.

The second electrode layer E2 may be at a second surface (or a rear surface) opposite to the first surface of the vibration portion 211, and may be electrically connected to the second surface of the vibration portion 211. For example, the second electrode layer E2 may have a single-body electrode type (or a common electrode type) which is disposed at a whole second surface of the vibration portion 211. The second electrode layer E2 according to an embodi- ment of the present disclosure may include a transparent conductive material, a semitransparent conductive material, or an opaque conductive material. For example, the second electrode layer E2 may include the same material as the first electrode layer E1, but embodiments of the present disclo- sure are not limited thereto. As another embodiment of the present disclosure, the second electrode layer E2 may include a material different from the first electrode layer E1.

The vibration portion 211 may be polarized by a certain voltage applied to the first electrode layer E1 and the second electrode layer E2 in a certain temperature atmosphere, or in a temperature atmosphere that may be changed from a high temperature to a room temperature, but embodiments of the present disclosure are not limited thereto.

The vibration generator 210 according to an embodiment of the present disclosure may further include a first protection member 213 and a second protection member 215.

The first protection member 213 may be disposed at the first surface of the vibration generator 210. For example, the first protection member 213 may cover the first electrode layer E1 disposed at a first surface of each of the plurality of vibration structures 210A to 210D, and thus, may be connected to the first surface of each of the plurality of vibration structures 210A to 210D in common or may support the first surface of each of the plurality of vibration structures 210A to 210D in common. Accordingly, the first protection member 213 may protect the first surface of each of the plurality of vibration structures 210A to 210D or the first electrode layer E1.

The first protection member 213 may be disposed at the first surface of each of the plurality of vibration structures 210A to 210D by a first adhesive layer 212. For example, the first protection member 213 may be directly disposed at the first surface of each of the plurality of vibration structures 210A to 210D by a film laminating process using the first adhesive layer 212. Accordingly, the plurality of vibration structures 210A to 210D may be integrated (or disposed) or tiled with the first protection member 213 to have the certain intervals D1 and D2.

The second protection member 215 may be disposed at the second surface of the vibration generator 210. For example, the second protection member 215 may cover the second electrode layer E2 disposed at a second surface of each of the plurality of vibration structures 210A to 210D, and thus, may be connected to the second surface of each of the plurality of vibration structures 210A to 210D in common or may support the second surface of each of the plurality of vibration structures 210A to 210D in common. Accordingly, the second protection member 215 may protect the second surface of each of the plurality of vibration structures 210A to 210D or the second electrode layer E2.

The second protection member 215 may be disposed at the second surface of each of the plurality of vibration structures 210A to 210D by a second adhesive layer 214. For example, the second protection member 215 may be directly disposed at the second surface of each of the plurality of vibration structures 210A to 210D by a film laminating process using the second adhesive layer 214. Accordingly, the plurality of vibration structures 210A to 210D may be integrated (or disposed) or tiled with the second protection member 215 to have the certain intervals D1 and D2.

Each of the first protection member 213 and the second protection member 215 according to an embodiment of the present disclosure may include a plastic film. For example, each of the first protection member 213 and the second protection member 215 may be a polyimide (PI) film or a polyethyleneterephthalate (PET) film, but embodiments of the present disclosure are not limited thereto.

The first adhesive layer 212 may be disposed between the first surface of each of the plurality of vibration structures 210A to 210D and between the plurality of vibration structures 210A to 210D. For example, the first adhesive layer 212 may be formed at a rear surface (or an inner surface) of the first protection member 213 facing the first surface of the vibration generator 210, disposed at the first surface of each of the plurality of vibration structures 210A to 210D, and filled between the plurality of vibration structures 210A to 210D.

The second adhesive layer 214 may be disposed between the second surface of each of the plurality of vibration structures 210A to 210D and between the plurality of vibration structures 210A to 210D. For example, the second adhesive layer 214 may be formed at a front surface (or an inner surface) of the second protection member 215 facing the second surface of the vibration generator 210, disposed at the second surface of each of the plurality of vibration structures 210A to 210D, and filled between the plurality of vibration structures 210A to 210D.

The first and second adhesive layers 212 and 214 may be connected to each other between the plurality of vibration structures 210A to 210D. Therefore, each of the plurality of vibration structures 210A to 210D may be surrounded by the first and second adhesive layers 212 and 214. For example, the first and second adhesive layers 212 and 214 may entirely surround the whole plurality of vibration structures 210A to 210D. For example, the plurality of vibration structures 210A to 210D may be embedded between the first and second adhesive layers 212 and 214. For example, the first and second adhesive layers 212 and 214 may be referred to as a cover member, but embodiments of the present disclosure are not limited thereto. When each of the first and second adhesive layers 212 and 214 is a cover member, the first protection member 213 may be disposed at a first surface of the cover member, and the second protection member 215 may be disposed at a second surface of the cover member. For example, for convenience of description, the first and second adhesive layers 212 and 214 are illustrated as first and second adhesive layers 212 and 214, but embodiments of the present disclosure are not limited thereto and may be provided as one adhesive layer.

Each of the first and second adhesive layers 212 and 214 according to an embodiment of the present disclosure may include an electric insulating material which has adhesiveness and may include a material capable of compression and decompression. For example, each of the first and second adhesive layers 212 and 214 may include an epoxy resin, an acrylic resin, a silicone resin, or a urethane resin, but embodiments of the present disclosure are not limited thereto.

The vibration apparatus 200 or the vibration generator 210 according to an embodiment of the present disclosure may further include a first power supply line PL1, a second power supply line PL2, and a pad part 201.

The first power supply line PL1 may be disposed at the first protection member 213. For example, the first power supply line PL1 may be disposed at a rear surface of the first protection member 213 facing the first surface of the vibration generator 210. The first power supply line PL1 may be electrically connected to the first electrode layer E1 of each of the plurality of vibration structures 210A to 210D. For example, the first power supply line PL1 may be directly and electrically connected to the first electrode layer E1 of each of the plurality of vibration structures 210A to 210D. For example, the first power supply line PL1 may be electrically connected to the first electrode layer E1 of each of the plurality of vibration structures 210A to 210D by an anisotropic conductive film. As another embodiment of the present disclosure, the first power supply line PL1 may be electrically connected to the first electrode layer E1 of each of the plurality of vibration structures 210A to 210D by a conductive material (or particle) included in the first adhesive layer 212.

The first power supply line PL1 according to an embodiment of the present disclosure may include first and second upper power lines 213a and 213b disposed in a second direction Y. For example, the first upper power line 213a may be electrically connected to the first electrode layer E1 of each of the first and third vibration structures 210A and 210C (or a first group) parallel to the second direction Y among the plurality of vibration structures 210A to 210D. The second upper power line 213b may be electrically connected to the first electrode layer E1 of each of the second and fourth vibration structures 210B and 210D (or a second group) parallel to the second direction Y among the plurality of vibration structures 210A to 210D.

The second power supply line PL2 may be disposed at the second protection member 215. For example, the second power supply line PL2 may be disposed at a front surface of the second protection member 215 facing the second surface of the vibration generator 210. The second power supply line PL2 may be electrically connected to the second electrode layer E2 of each of the plurality of vibration structures 210A to 210D. For example, the second power supply line PL2 may be directly and electrically connected to the second electrode layer E2 of each of the plurality of vibration structures 210A to 210D. For example, the second power supply line PL2 may be electrically connected to the second electrode layer E2 of each of the plurality of vibration structures 210A to 210D by an anisotropic conductive film. As another embodiment of the present disclosure, the second power supply line PL2 may be electrically connected to the second electrode layer E2 of each of the plurality of vibration structures 210A to 210D by a conductive material (or particle) included in the second adhesive layer 214.

The second power supply line PL2 according to an embodiment of the present disclosure may include first and second lower power lines 215a and 215b disposed in a second direction Y. For example, the first lower power line 215a may be electrically connected to the second electrode layer E2 of each of the first and third vibration structures 210A and 210C (or a first group) parallel to the second direction Y among the plurality of vibration structures 210A to 210D. The second lower power line 215b may be electrically connected to the second electrode layer E2 of each of the second and fourth vibration structures 210B and 210D (or a second group) parallel to the second direction Y among the plurality of vibration structures 210A to 210D.

The pad part 201 may be electrically connected to each of the first power supply line PL1 and the second power supply line PL2. The pad part 201 may be disposed in the vibration generator 210 so as to be electrically connected to one portion (or one end or one side) of each of the first power supply line PL1 and the second power supply line PL2. The pad part 201 according to an embodiment of the present disclosure may include a first pad electrode and a second pad electrode. The first pad electrode may be electrically connected to one portion of the first power supply line PL1. The second pad electrode may be electrically connected to one portion of the second power supply line PL2.

The first pad electrode may be connected to one portion of each of the first and second upper power lines 213a and 213b of the first power supply line PL1 in common. For example, the one portion of each of the first and second upper power lines 213a and 213b may branch from the first pad electrode.

The second pad electrode may be connected to one portion of each of the first and second lower power lines 215a and 215b of the second power supply line PL2 in common. For example, the one portion of each of the first and second lower power lines 215a and 215b may branch from the second pad electrode.

The vibration apparatus 200 or the vibration generator 210 according to an embodiment of the present disclosure may further include a flexible cable 220.

The flexible cable 220 may be electrically connected to the pad part 201 disposed in the vibration generator 210 and may supply the vibration generator 210 with vibration driving signals (or a sound signal) provided from a sound processing circuit. The flexible cable 220 according to an embodiment of the present disclosure may include a first terminal and a second terminal. A first terminal may be electrically connected to the first pad electrode of the pad part 201. The second terminal may be electrically connected to the second pad electrode of the pad part 201. For example, the flexible cable 220 may be a flexible printed circuit cable or a flexible flat cable, but embodiments of the present disclosure are not limited thereto.

The sound processing circuit may generate an alternating current (AC) vibration driving signal including a first vibration driving signal and a second vibration driving signal based on a sound source. The first vibration driving signal may be any one of a positive (+) vibration driving signal and a negative (−) vibration driving signal, and the second vibration driving signal may be any one of a positive (+) vibration driving signal and a negative (−) vibration driving signal. For example, the first vibration driving signal may be supplied to the first electrode layer E1 of each of the plurality of vibration structures 210A to 210D through a first terminal of the flexible cable 220, the first pad electrode of the pad part 201, and the first power supply line PL1. The second vibration driving signal may be supplied to the second electrode layer E2 of each of the plurality of vibration structures 210A to 210D through a second terminal of the flexible cable 220, the second pad electrode of the pad part 201, and the second power supply line PL2.

The vibration generator 210 according to an embodiment of the present disclosure may further include a plate 216.

The plate 216 may be disposed at the first protection member 213 or the second protection member 215. For example, the plate 216 may have the same shape as the first protection member 213 (or the second protection member 215). The plate 216 may have a size which is greater than or equal to the first protection member 213 (or the second protection member 215). The plate 216 according to an embodiment of the present disclosure may include a metal material, and for example, may include one or more materials among stainless steel, aluminum (Al), a magnesium (Mg), a Mg alloy, a magnesium-lithium (Mg—Li) alloy, and an Al alloy, but embodiments of the present disclosure are not limited thereto. The plate 216 may be disposed at the first protection member 213 (or the second protection member 215) and may reinforce a mass of the vibration generator 210 to decrease a resonance frequency of the vibration generator 210 based on an increase in mass, and thus, may increase a sound characteristic and a sound pressure level characteristic of the low-pitched sound band generated based on a vibration of the vibration generator 210 and may enhance the flatness of a sound pressure level characteristic. For example, the flatness of a sound pressure level characteristic may be a magnitude of a deviation between a highest sound pressure level and a lowest sound pressure level.

The plate 216 according to an embodiment of the present disclosure may be disposed at a front surface (or a first surface) of the first protection member 213. The plate 216 may be disposed at the front surface of the first protection member 213 of the vibration generator 210 by a connection member 150. The plate 216 according to an embodiment of the present disclosure may be disposed between the display panel 100 and the vibration generator 210. For example, the plate 216 may be disposed at the rear surface of the display panel 100 by the connection member 150.

According to another embodiment of the present disclosure, the plate 216 may be disposed at a rear surface (or a second surface) of the second protection member 215. The plate 216 may be disposed at the rear surface of the second protection member 215 of the vibration generator 210 by a connection member. According to another embodiment of the present disclosure, the plate 216 may be disposed between the vibration generator 210 and the supporting member 300.

Therefore, the vibration apparatus 200 according to an embodiment of the present disclosure may include the vibration generator 210 including the plurality of vibration structures 210A to 210D which are arranged (or tiled) at a certain interval so as to be implemented as a single vibrator without being independently driven, and thus, may be driven as a large-area vibrator based on a single vibration of the plurality of vibration structures 210A to 210D. Accordingly, the vibration apparatus 200 may vibrate the whole area of the display panel 100, and thus, a sound characteristic and a sound pressure level characteristic in the low-pitched sound band and a reproduction band of a sound generated based on a large-area vibration of the display panel 100 may each be increased or enhanced.

Moreover, the vibration apparatus 200 according to an embodiment of the present disclosure may further include the plate 216 disposed in the vibration generator 210, and thus, a resonance frequency of the vibration generator 210 may decrease by the plate 216. Accordingly, the vibration apparatus 200 according to an embodiment of the present disclosure may increase a sound characteristic, a sound pressure level characteristic of the low-pitched sound band, and a flatness of a sound pressure level characteristic of a sound generated according to a vibration of the display panel 100 based on a vibration of the vibration generator 210.

FIGS. 5A to 5F illustrate a vibration structure illustrated in FIG. 4.

Figures 5A, 5B:
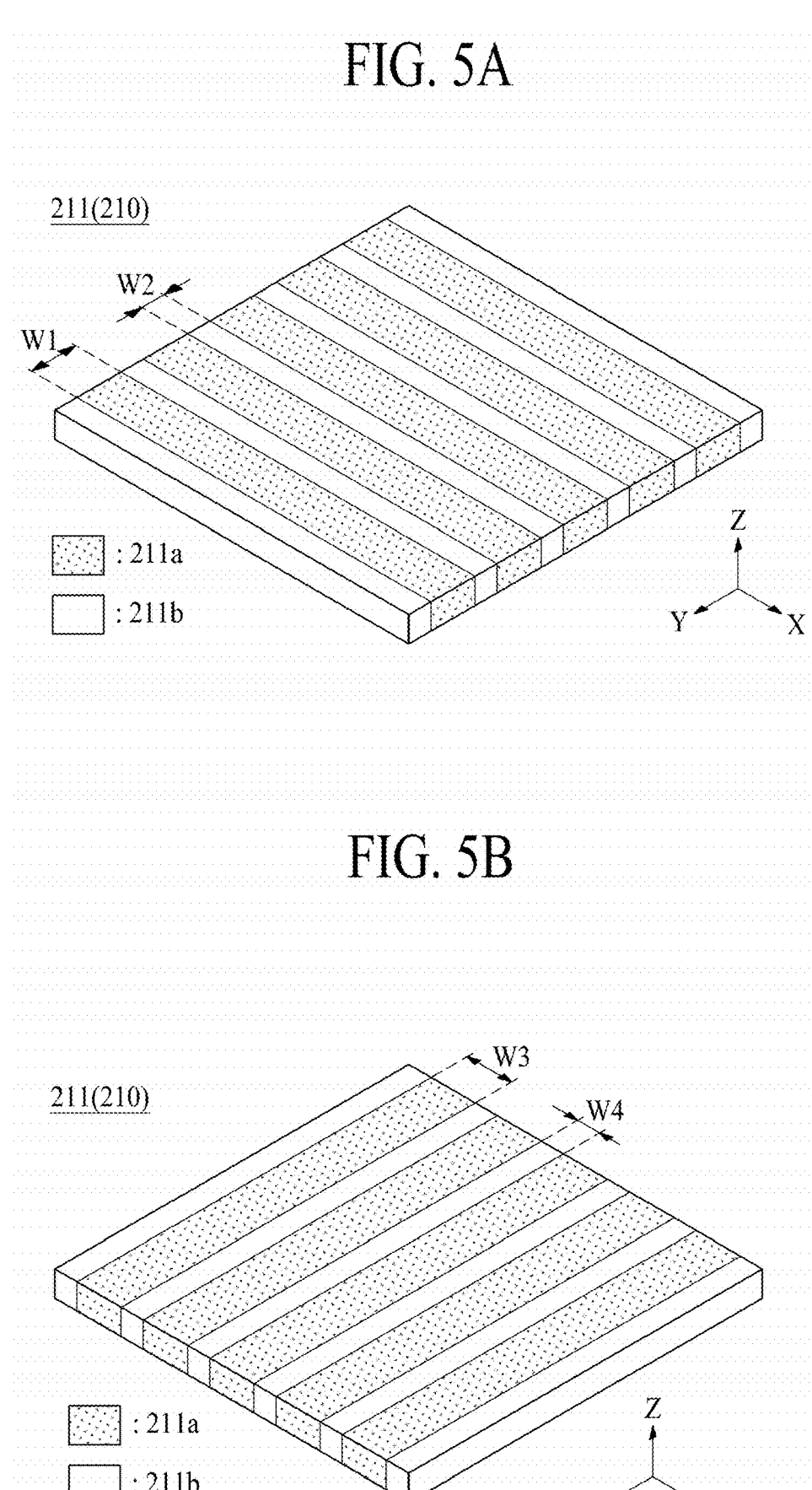
FIGS. 5A to 5F illustrate a vibration structure illustrated in FIG. 4.

With reference to FIGS. 3, 4, and 5A, each of the plurality of vibration structures 210A to 210D arranged (or tiled) in the vibration generator 210 according to an embodiment of the present disclosure may include a vibration portion 211. The vibration portion 211 may include a plurality of first portions 211a and a plurality of second portions 211b. For example, the plurality of first portions 211a and the plurality of second portions 211b may be alternately and repeatedly arranged along a second direction Y. Each of the plurality of first portions 211a may be disposed between two adjacent second portions 211b of the plurality of second portions 211b. For example, each of the plurality of first portions 211a may have a first width W1 parallel to the second direction Y and a length parallel to a first direction X. Each of the plurality of second portions 211b may be disposed in parallel to the second direction Y. For example, each of the plurality of second portions 211b may have a second width W2 and a length parallel to the first direction X. Each of the plurality of second portions 211b may have the same size, for example, the same width, area, or volume. For example, each of the plurality of second portions 211b may have the same size (for example, the same width, area, or volume) within a process error range (or an allowable error) occurring in a manufacturing process. The first width W1 may be the same as or different from the second width W2. For example, the first width W1 may be greater than the second width W2. For example, the first portion 211a and the second portion 211b may include a line shape or a stripe shape which has the same size or different sizes. Therefore, the vibration portion 211 illustrated in FIG. 5A may include a 2-2 composite structure and thus may have a resonance frequency of 20 kHz or less, but embodiments of the present disclosure are not limited thereto and a resonance frequency of the vibration portion 211 may vary based on at least one or more among a shape, a length, and a thickness of the vibration portion.

With reference to FIGS. 3, 4, and 5B, a vibration portion 211 of each of the plurality of vibration structures 210A to 210D arranged (or tiled) in the vibration generator 210 according to another embodiment of the present disclosure may include a plurality of first portions 211a and a plurality of second portions 211b, which are alternately and repeatedly arranged in a first direction X. Each of the plurality of first portions 211a may be disposed between two adjacent second portions 211b of the plurality of second portions 211b. For example, each of the plurality of first portions 211a may have a third width W3 parallel to the first direction X and a length parallel to a second direction Y. Each of the plurality of second portions 211b may have a fourth width W4 parallel to the first direction X and may have a length parallel to the second direction Y. The third width W3 may be the same as or different from the fourth width W4. For example, the third width W3 may be greater than the fourth width W4. For example, the first portion 211a and the second portion 211b may include a line shape or a stripe shape which has the same size or different sizes. Therefore, the vibration portion 211 illustrated in FIG. 5B may include a 2-2 composite structure and thus may have a resonance frequency of 20 kHz or less, but embodiments of the present disclosure are not limited thereto and a resonance frequency of the vibration portion 211 may vary based on at least one or more among a shape, a length, and a thickness of the vibration portion.

In the vibration portion 211 illustrated in each of FIGS. 5A and 5B, each of the plurality of first portions 211a and each of the plurality of second portions 211b may be disposed (or arranged) in parallel on the same plane (or the same layer). Each of the plurality of second portions 211b may be configured to fill a gap between two adjacent first portions 211a. Each of the plurality of second portions 211b may be connected to or attached at an adjacent first portion 211a. Accordingly, the vibration portion 211 may be enlarged to have a desired size or length based on side coupling (or side connection) between the first portion 211a and the second portion 211b.

In the vibration portion 211 illustrated in each of FIGS. 5A and 5B, a width (or a size) W2 and W4 of each of the plurality of second portions 211b may progressively decrease in a direction from a center portion to both peripheries (or both sides or both ends) of the vibration portion 211 or the vibration apparatus.

According to another embodiment of the present disclosure, a second portion 211b, having a largest width (W2, W4) among the plurality of second portions 211b, may be located at a portion on which a highest stress may concentrate when the vibration portion 211 or the vibration apparatus is vibrating in a vertical (or upper and lower) direction Z (or a thickness direction). A second portion 211b, having a smallest width (W2, W4) among the plurality of second portions 211b, may be located at a portion where a relatively low stress may occur when the vibration portion 211 or the vibration apparatus is vibrating in the vertical direction Z. For example, the second portion 211b, having the largest width (W2, W4) among the plurality of second portions 211b, may be disposed at the center portion of the vibration portion 211, and the second portion 211b, having the smallest width (W2, W4) among the plurality of second portions 211b may be disposed at each of the both peripheries of the vibration portion 211. Therefore, when the vibration portion 211 or the vibration apparatus is vibrating in the vertical direction Z, interference of a sound wave or overlapping of a resonance frequency, each occurring in the portion on which the highest stress concentrates, may be reduced or minimized. Thus, dipping phenomenon of a sound pressure level occurring in the low-pitched sound band may be reduced, thereby improving flatness of a sound characteristic in the low-pitched sound band. For example, flatness of a sound characteristic may be a level of a deviation between a highest sound pressure and a lowest sound pressure.

In the vibration portion 211 illustrated in each of FIGS. 5A and 5B, each of the plurality of first portions 211a may have different sizes (or widths). For example, a size (or a width) of each of the plurality of first portions 211a may progressively decrease or increase in a direction from the center portion to the both peripheries (or both sides or both ends) of the vibration portion 211 or the vibration apparatus. For example, in the vibration portion 211, a sound pressure level characteristic of a sound may be enhanced and a sound reproduction band may increase, based on various natural vibration frequencies according to a vibration of each of the plurality of first portions 211a having different sizes.

Figure 5C:
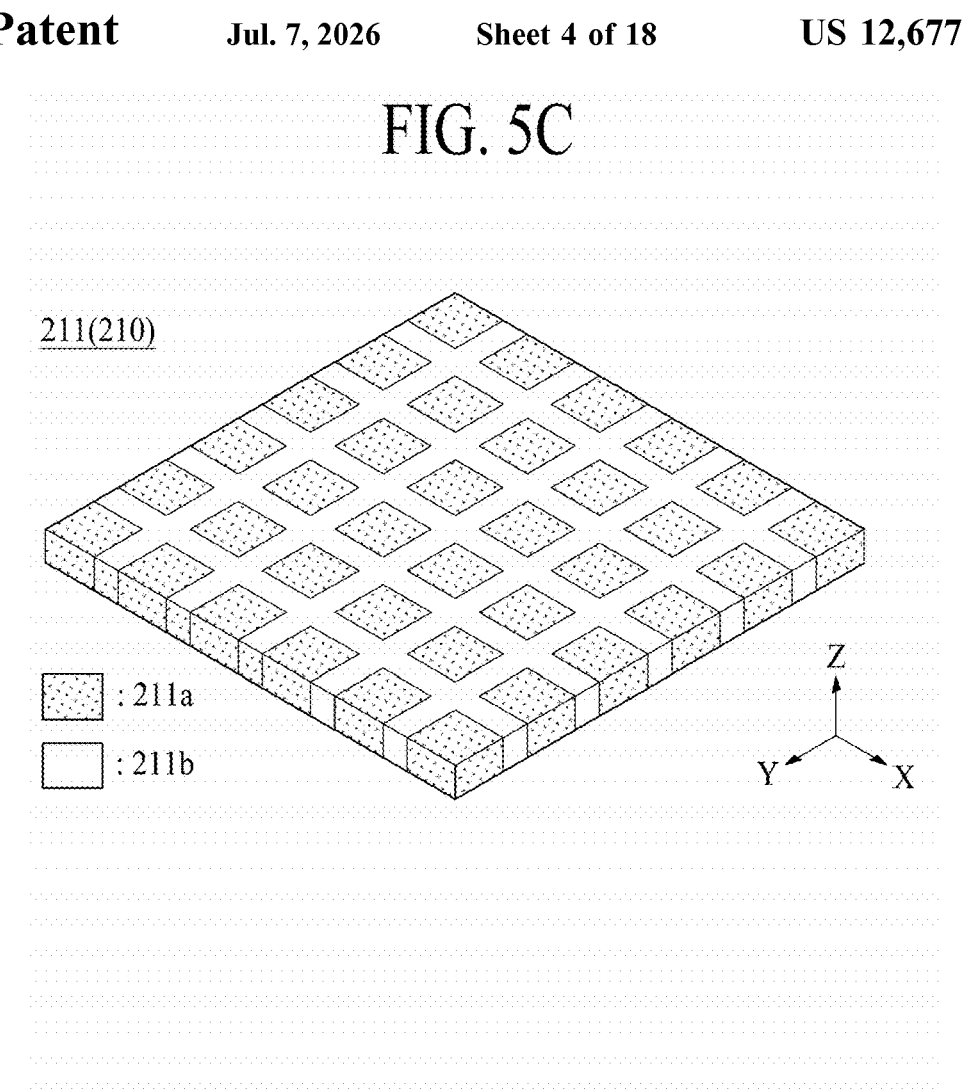
Figure 5C:

With reference to FIGS. 3, 4, and 5C, a vibration portion 211 of each of the plurality of vibration structures 210A to 210D arranged (or tiled) in the vibration generator 210 according to another embodiment of the present disclosure may include a plurality of first portions 211a, which are spaced apart from one another in a first direction X and a second direction Y, and a second portion 211b disposed between the plurality of first portions 211a. The plurality of first portions 211a may be disposed to be spaced apart from one another in the first direction X and the second direction Y. For example, each of the plurality of first portions 211a may have a hexahedral shape (or a six-sided object shape) having the same size and may be disposed in a lattice shape. The second portion 211b may be disposed between the plurality of first portions 211a in each of the first direction X and the second direction Y. The second portion 211b may be configured to fill a gap or a space between two adjacent first portions 211a or to surround each of the plurality of first portions 211a. Thus, the second portion 211b may be connected to or attached to an adjacent first portion 211a. For example, a width of a second portion 211b disposed between two first portions 211a adjacent to each other in the first direction X may be the same as or different from the first portion 211a, and a width of a second portion 211b disposed between two first portions 211a adjacent to each other in the second direction Y may be the same as or different from the first portion 211a. Therefore, the vibration portion 211 illustrated in FIG. 5C may have a resonance frequency of 30 MHz or less according to a 1-3 composite structure, but embodiments of the present disclosure are not limited thereto and a resonance frequency of the vibration portion 211 may vary based on at least one or more among a shape, a length, and a thickness of the vibration portion.

Figure 5D:
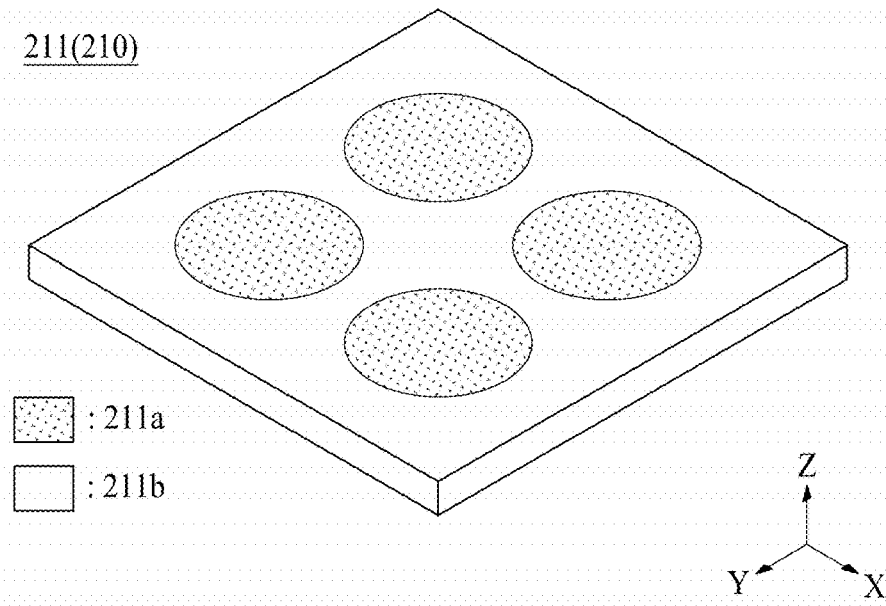

With reference to FIGS. 3, 4, and 5D, a vibration portion 211 of each of the plurality of vibration structures 210A to 210D arranged (or tiled) in the vibration generator 210 according to another embodiment of the present disclosure may include a plurality of first portions 211a, which are spaced apart from one another in a first direction X and a second direction Y, and a second portion 211b which surrounds each of the plurality of first portions 211a. Each of the plurality of first portions 211a may have a flat structure of a circular shape. For example, each of the plurality of first portions 211a may have a circular plate shape, but embodiments of the present disclosure are not limited thereto and may have a dot shape including an oval shape, a polygonal shape, or a donut shape. The second portion 211b may be configured to surround each of the plurality of first portions 211a. Thus, the second portion 211b may be connected to or attached on a side surface of each of the plurality of first portions 211a. The plurality of first portions 211a and the second portion 211b may be disposed (or arranged) in parallel on the same plane (or the same layer). Therefore, the vibration portion 211 illustrated in FIG. 5D may include a 1-3 composite structure and may be implemented as a circular vibration source (or vibrator), and thus, may be enhanced in vibration characteristic or sound output characteristic and may have a resonance frequency of 30 MHz or less, but embodiments of the present disclosure are not limited thereto and a resonance frequency of the vibration portion 211 may vary based on at least one or more among a shape, a length, and a thickness of the vibration portion.

Figure 5E:
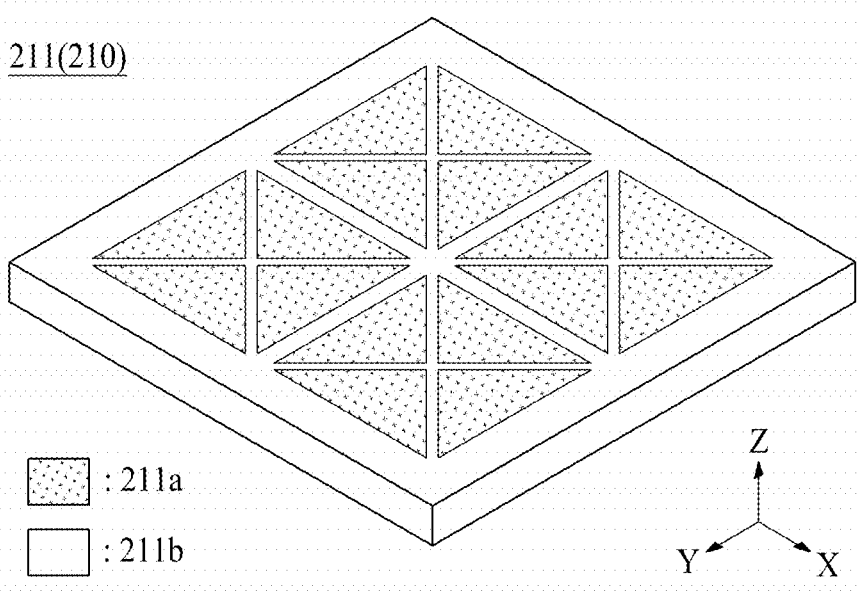

With reference to FIGS. 3, 4, and 5E, a vibration portion 211 of each of the plurality of vibration structures 210A to 210D arranged (or tiled) in the vibration generator 210 according to another embodiment of the present disclosure may include a plurality of first portions 211a, which are spaced apart from one another in a first direction X and a second direction Y, and a second portion 211b which surrounds each of the plurality of first portions 211a. Each of the plurality of first portions 211a may have a flat structure of a triangular shape. For example, each of the plurality of first portions 211a may have a triangular plate shape.

For example, four adjacent first portions 211a among the plurality of first portions 211a may be adjacent to one another to form a tetragonal or quadrilateral shape (or a square shape). Vertices of the four adjacent first portions 211a forming a tetragonal shape may be adjacent to one another in a center portion (or a central portion) of the tetragonal shape. The second portion 211b may be configured to surround each of the plurality of first portions 211a. Thus, the second portion 211b may be connected to or attached to a side surface (or a lateral surface) of each of the plurality of first portions 211a. The plurality of first portions 211a and the second portion 211b may be disposed (or arranged) in parallel on the same plane (or the same layer). Therefore, the vibration portion 211 illustrated in FIG. 5E may have a resonance frequency of 30 MHz or less according to a 1-3 composite structure, but embodiments of the present disclosure are not limited thereto and a resonance frequency of the vibration portion 211 may vary based on at least one or more among a shape, a length, and a thickness of the vibration portion.

Figure 5F:
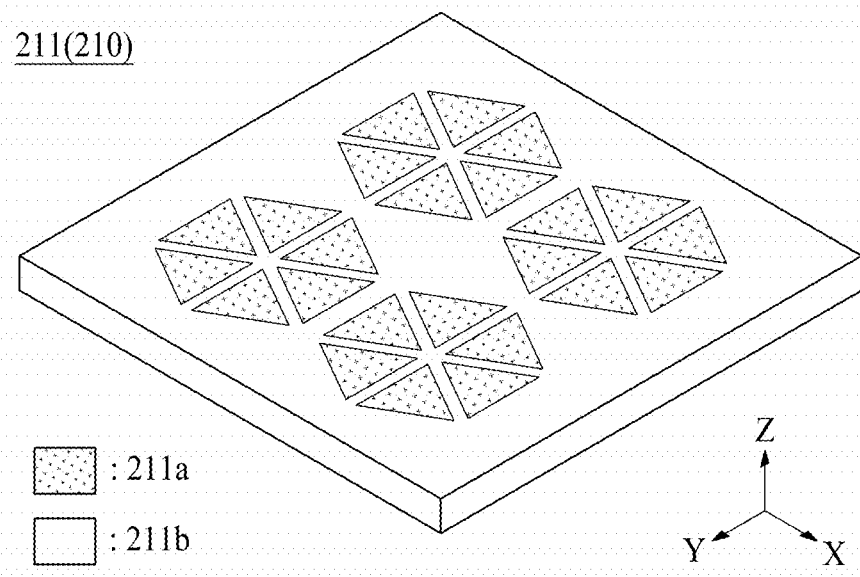

As another embodiment of the present disclosure, as illustrated in FIG. 5F, six adjacent first portions 211a among the plurality of first portions 211a may be adjacent to one another to form a hexagonal shape (or a regularly hexagonal shape). Vertices of the six adjacent first portions 211a forming a hexagonal shape may be adjacent to one another in a center portion (or a central portion) of the hexagonal shape. The second portion 211b may be configured to surround each of the plurality of first portions 211a. Thus, the second portion 211b may be connected to or attached on a side surface (or a lateral surface) of each of the plurality of first portions 211a. The plurality of first portions 211a and the second portion 211b may be disposed (or arranged) in parallel on the same plane (or the same layer). Therefore, the vibration portion 211 illustrated in FIG. 5F may include a 1-3 composite structure and may be implemented as a circular vibration source (or vibrator), and thus, may be enhanced in vibration characteristic or sound output characteristic and may have a resonance frequency of 30 MHz or less, but embodiments of the present disclosure are not limited thereto, and a resonance frequency of the vibration portion 211 may vary based on at least one or more among a shape, a length, and a thickness of the vibration portion.

With reference to FIGS. 5E and 5F, 2N (where N is a natural number greater than or equal to 2) adjacent first portions 211a among the plurality of first portions 211a having the triangular shape may be disposed adjacent to one another to form a 2N-angular shape.

In FIGS. 5A to 5F, the plurality of first portions 211a according to an embodiment of the present disclosure may each be configured as an inorganic material portion. The inorganic material portion may include a piezoelectric material or an electroactive material. The piezoelectric material or the electroactive material may have a characteristic in which, when pressure or twisting (or bending) is applied to a crystalline structure by an external force, a potential difference occurs due to dielectric polarization caused by a relative position change of a positive (+) ion and a negative (−) ion, and a vibration is generated by an electric field based on a reverse voltage applied thereto. As described above with reference to FIG. 4, a first surface of each of the plurality of first portions 211a may be electrically connected to the first electrode layer E1, and a second surface of each of the plurality of first portions 211a may be electrically connected to the second electrode layer E2.

In FIGS. 5A to 5F, the inorganic material portion included in each of the plurality of first portions 211a may include a ceramic-based material for generating a relatively high vibration, or may include a piezoelectric ceramic having a perovskite-based crystalline structure. The perovskite crystalline structure may have a piezoelectric effect and an inverse piezoelectric effect, and may be a plate-shaped structure having orientation. The perovskite crystalline structure may be represented by a chemical formula "ABO₃". In the chemical formula, "A" may include a divalent metal element, and "B" may include a tetravalent metal element. For example, in the chemical formula "$ABO_3$", "A", and "B" may be cations, and "O" may be anions. For example, the chemical formula "$ABO_3$" may include one of lead(II) titanate ($PbTiO_3$), lead zirconate ($PbZrO_3$), lead zirconate titanate($PbZrTiO_3$), barium titanate ($BaTiO_3$), and strontium titanate ($SrTiO_3$), but embodiments of the present disclosure are not limited thereto.

When the perovskite crystalline structure includes a center ion (for example, lead(II) titanate), a position of a titanium (Ti) ion may be changed by an external stress or a magnetic field, and thus, polarization may be changed, thereby generating a piezoelectric effect. For example, in the perovskite crystalline structure, a cubic shape corresponding to a symmetric structure may be changed to a tetragonal (or quadrilateral), orthorhombic, or rhombohedral structure corresponding to an unsymmetric structure, and thus, a piezoelectric effect may be generated. In a tetragonal (or quadrilateral), orthorhombic, or rhombohedral structure corresponding to an unsymmetric structure, polarization may be high in a morphotropic phase boundary, and realignment of polarization may be easy, whereby the perovskite crystalline structure may have a high piezoelectric characteristic.

According to an embodiment of the present disclosure, the inorganic material portion included in each of the plurality of first portions 211a may include one or more materials among lead (Pb), zirconium (Zr), titanium (Ti), zinc (Zn), nickel (Ni), and niobium (Nb), but embodiments of the present disclosure are not limited thereto.

According to another embodiment of the present disclosure, the inorganic material portion included in each of the plurality of first portions 211a may include a lead zirconate titanate (PZT)-based material, including lead (Pb), zirconium (Zr), and titanium (Ti); or may include a lead zirconate nickel niobate (PZNN)-based material, including lead (Pb), zirconium (Zr), nickel (Ni), and niobium (Nb), but embodiments of the present disclosure are not limited thereto. Also, the inorganic material portion may include at least one or more among calcium titanate ($CaTiO_3$), $BaTiO_3$, and $SrTiO_3$, each without Pb, but embodiments of the present disclosure are not limited thereto.

According to another embodiment of the present disclosure, an inorganic material portion included in each of the plurality of first portions 211a may have a piezoelectric deformation coefficient "$d_{33}$" of 1,000 pC/N or more in a thickness direction Z. The vibration apparatus may be applied to a display panel having a large size and may need to have a high piezoelectric deformation coefficient "$d_{33}$", for having a sufficient vibration characteristic or piezoelectric characteristic. For example, in order to have the high piezoelectric deformation coefficient "$d_{33}$", the inorganic material portion may include a PZT-based material ($PbZrTiO_3$) as a main component and may include a softener dopant material doped into A site (Pb) and a relaxor ferroelectric material doped into B site (ZrTi).

The softener dopant material may enhance a piezoelectric characteristic and a dielectric characteristic of the inorganic material portion, and for example, may increase the piezoelectric deformation coefficient "$d_{33}$" of the inorganic material portion. The softener dopant material according to an embodiment of the present disclosure may include a dyad element "+2" to a triad element "+3". Morphotropic phase boundary (MPB) may be implemented by adding the softener dopant material to the PZT-based material ($PbZrTiO_3$), and thus, a piezoelectric characteristic and a dielectric characteristic may be enhanced. For example, the softener dopant material may include strontium (Sr), barium (Ba), lanthanum (La), neodymium (Nd), calcium (Ca), yttrium (Y), erbium (Er), or ytterbium (Yb). For example, ions ($Sr^{2+}$, $Ba^{2+}$, $La^{2+}$, $Nd^{3+}$, $Ca^{2+}$, $Y^{3+}$, $Er^{3+}$, $Yb^{3+}$) of the softener dopant material doped into the PZT-based material ($PbZrTiO_3$) may substitute a portion of lead (Pb) in the PZT-based material ($PbZrTiO_3$), and a substitution rate thereof may be about 2 mol % to about 20 mol %. For example, when the substitution rate is smaller than 2 mol % or greater than 20 mol %, a perovskite crystal structure may be broken, and thus, an electromechanical coupling coefficient "kP" and the piezoelectric deformation coefficient "$d_{33}$" may decrease. When the softener dopant material is substituted, the MPB may be formed, and a piezoelectric characteristic and a dielectric characteristic may be high in the MPB, thereby implementing a vibration apparatus having a high piezoelectric characteristic and a high dielectric characteristic.

According to an embodiment of the present disclosure, the relaxor ferroelectric material doped into the PZT-based material ($PbZrTiO_3$) may enhance an electric deformation characteristic of the inorganic material portion. The relaxor ferroelectric material according to an embodiment of the present disclosure may include a lead magnesium niobate (PMN)-based material or a lead nickel niobate (PNN)-based material, but embodiments of the present disclosure are not limited thereto. The PMN-based material may include Pb, Mg, and Nb, and for example, may include Pb(Ni, Nb)O₃. For example, the relaxor ferroelectric material doped into the PZT-based material ($PbZrTiO_3$) may substitute a portion of each of zirconium (Zr) and titanium (Ti) in the PZT-based material (PbZrTiO$_3$), and a substitution rate thereof may be about 5 mol % to about 25 mol %. For example, when the substitution rate is smaller than 5 mol % or greater than 25 mol %, a perovskite crystal structure may be broken, and thus, the electromechanical coupling coefficient "kP" and the piezoelectric deformation coefficient "d$_{33}$" may decrease.

According to an embodiment of the present disclosure, the inorganic material portion provided in each of the plurality of first portions 211 may further include a donor material doped into B site (ZrTi) of the PZT-based material (PbZrTiO$_3$), in order to more enhance a piezoelectric coefficient. For example, the donor material doped into the B site (ZrTi) may include a tetrad element "+4" or a hexad element "+6". For example, the donor material doped into the B site (ZrTi) may include tellurium (Te), germanium (Ge), uranium (U), bismuth (Bi), niobium (Nb), tantalum (Ta), antimony (Sb), or tungsten (W).

The inorganic material portion provided in each of the plurality of first portions 211 according to an embodiment of the present disclosure may have a piezoelectric deformation coefficient "d$_{33}$" of 1,000 pC/N or more in a thickness direction Z, thereby implementing a vibration apparatus having an enhanced vibration characteristic. For example, a vibration apparatus having an enhanced vibration characteristic may be implemented in a large-area apparatus.

In FIGS. 5A to 5F, the second portion 211$b$ may be disposed between the plurality of first portions 211$a$, or may be disposed to surround each of the plurality of first portions 211$a$. Therefore, in the vibration portion 211 of the vibration generator 210 or the vibration apparatus 200, vibration energy based on a link in a unit lattice of each first portion 211$a$ may increase by a corresponding second portion 211$b$. Thus, a vibration may increase, and a piezoelectric characteristic and flexibility may be secured. For example, the second portion 211$b$ may include one among an epoxy-based polymer, an acrylic-based polymer, and a silicone-based polymer, but embodiments of the present disclosure are not limited thereto.

The second portion 211$b$ according to an embodiment of the present disclosure may be configured as an organic material portion. For example, the organic material portion may be disposed between the inorganic material portions and may absorb an impact applied to the inorganic material portion (or the first portion), may release a stress concentrating on the inorganic material portion to enhance the total durability of the vibration portion 211 of the vibration generator 210 or the vibration apparatus, and may provide flexibility to the vibration portion 211 of the vibration generator 210 or the vibration apparatus.

The second portion 211$b$ according to an embodiment of the present disclosure may have modulus and viscoelasticity that are lower than those of each first portion 211$a$. Thus, the second portion 211$b$ may enhance the reliability of each first portion 211$a$ vulnerable to an impact due to a fragile characteristic. For example, the second portion 211$b$ may include a material having a loss coefficient of about 0.01 to about 1.0 and modulus of about 0.1 [GPa] to about 10 [GPa].

The organic material portion included in the second portion 211$b$ may include one or more of an organic material, an organic polymer, an organic piezoelectric material, and an organic non-piezoelectric material that has a flexible characteristic in comparison with the inorganic material portion of the first portions 211$a$. For example, the second portion 211$b$ may be referred to as an elastic portion, an elasticity portion, a connection portion, an organic portion, an organic material portion, an adhesive portion, a stretch portion, a bending portion, a damping portion, or a flexible portion, but embodiments of the present disclosure are not limited thereto.

Therefore, the plurality of first portions 211$a$ and the second portion 211$b$ may be disposed at (or connected to) the same plane, and thus, the vibration portion 211 of the vibration generator 210 according to various embodiments of the present disclosure may have a single thin film-type. For example, the vibration portion 211 may be vibrated in a vertical (or upper and lower) direction (or a thickness direction) by the first portion 211$a$ having a vibration characteristic and may be bent in a curved shape by the second portion 211$b$ having flexibility. Also, in the vibration portion 211 of the vibration generator 210 according to various embodiments of the present disclosure, a size of the first portion 211$a$ and a size of the second portion 211$b$ may be adjusted based on a piezoelectric characteristic and flexibility needed for the vibration portion 211. For example, in a case where the vibration portion 211 needs a piezoelectric characteristic rather than flexibility, a size of the first portion 211$a$ may be adjusted to be greater than the second portion 211$b$. As another embodiment of the present disclosure, in a case where the vibration portion 211 needs flexibility rather than a piezoelectric characteristic, a size of the second portion 211$b$ may be adjusted to be greater than the first portion 211$a$. Accordingly, a size of the vibration portion 211 may be adjusted based on a characteristic needed therefor, and thus, the vibration portion 211 may be easy to design.

One or more of the vibration portions 211 illustrated in FIGS. 5A to 5F may be one or more of the vibration portion 211 among the plurality of vibration structures 210A to 210D illustrated in FIG. 3. For example, each of the plurality of vibration structures 210A to 210D may be implemented with one or more among the vibration portion 211 described above with reference to FIGS. 5A to 5F, based on a desired characteristic of a sound generated based on a vibration of the vibration apparatus 200.

According to an embodiment of the present disclosure, each of the plurality of vibration structures 210A to 210D may include one or more of the vibration portions 211 described above with reference to FIGS. 5A to 5F, or may include different vibration portion 211.

According to an embodiment of the present disclosure, some and the other vibration generating portions among the plurality of vibration structures 210A to 210D may include different vibration portion 211 among the vibration portion 211 described above with reference to FIGS. 5A to 5F. For example, in the first to fourth vibration structures 210A to 210D illustrated in FIG. 3, each of the first and second vibration structures 210A and 210B may include one or more of the vibration portions 211 described above with reference to FIGS. 5A to 5F, and each of the third and fourth vibration structures 210C and 210D may include the vibration portion 211, which differs from the vibration portion 211 of the first and second vibration structures 210A and 210B, among the vibration portion 211 described above with reference to FIGS. 5A to 5F. For example, in the first to fourth vibration structures 210A to 210D illustrated in FIG. 3, the first and fourth vibration structures 210A and 210D disposed in a first diagonal direction may include one or more of the vibration portions 211 described above with reference to FIGS. 5A to 5F, and the second and third vibration structures 210B and 210C disposed in a second diagonal direction may include the vibration portion 211, which differs from the vibration portion 211 of the first and fourth vibration structures 210A and 210D disposed in the first diagonal direction, among the vibration portion 211 described above with reference to FIGS. 5A to 5F.

Figure 6:
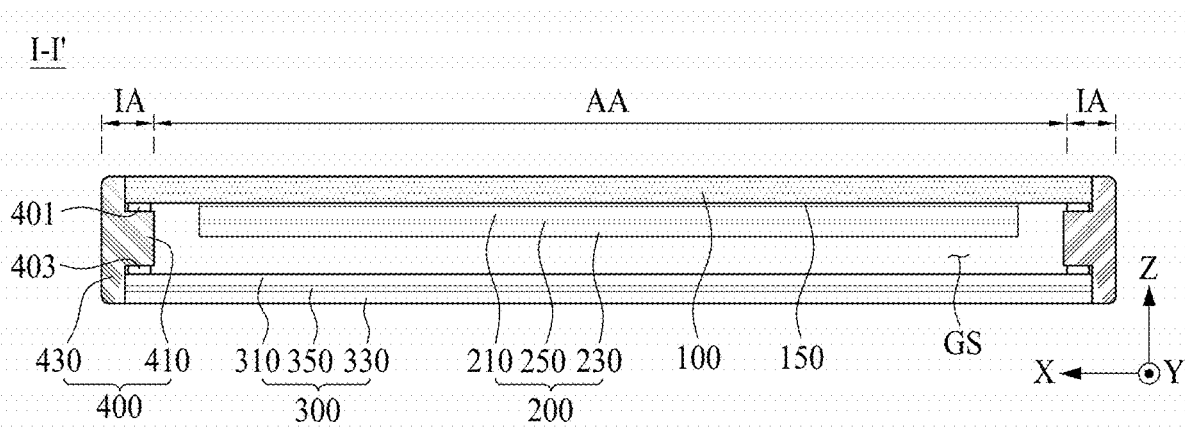
FIG. 6 illustrates an apparatus according to another embodiment of the present disclosure.

FIG. 6 illustrates an apparatus according to another embodiment of the present disclosure. FIG. 6 illustrates another cross-sectional view taken along line I-I' illustrated in FIG. 1.

A vibration apparatus including one vibration generator may have a problem where it is unable to output a sufficient sound. For example, when a vibration apparatus including one vibration generator is applied to an apparatus such as a television (TV) or the like, there may be a problem where it is difficult to secure a sufficient sound. Therefore, when a vibration apparatus implemented with two vibration generators is applied to an apparatus, an attachment area of the display panel 100 and the vibration apparatus may be enlarged. As the attachment area is enlarged, when the vibration apparatus is attached to the rear surface of the display panel 100, it may be difficult to attach the vibration apparatus on the rear surface of the display panel 100 without an air bubble. For example, when the display panel 100 may be a light emitting display panel, there may be a problem where it is difficult to attach the vibration apparatus on an encapsulation substrate without an air bubble. Also, in a vibration apparatus implemented with two vibration generators arranged in parallel, because vibrations of adjacent vibration generators differ, there may be a problem of a division vibration where different vibrations occur. Due to this, there may be a problem where it is difficult to output a sound having enhanced sound flatness. There may be a problem where a division vibration increases as an attachment area of a vibration apparatus increases.

The vibration apparatus 200 according to an embodiment of the present disclosure may include a plurality of vibration generators 210 and 230 which overlap (or stack) each other. The vibration apparatus 200 may include the plurality of vibration generators 210 and 230 which overlap or are stacked to be displaced in the same direction. For example, the vibration apparatus 200 may include the plurality of vibration generators 210 and 230 which are stacked on each other and configured to vibrate in the same direction. For example, some of the plurality of vibration generators 210 and 230 may overlap in a direction perpendicular to a front surface of the display panel 100. For example, in the vibration generator or in each of the vibration generators (when the apparatus or the vibration apparatus includes a plurality of vibration generators), the vibration structures may be arranged planarly with each other. For example, in the vibration generator or in each of the vibration generators (when the apparatus or the vibration apparatus includes a plurality of vibration generators), the vibration structures may be arranged to be displaced in the same direction. For example, the vibration apparatus 200 may include the plurality of vibration generators 210 and 230 which are over-lapped or stacked to have the same driving direction. For example, each of the vibration generators 210 and 230 may be a vibration film, a displacement film, or a sound generator, but embodiments of the present disclosure are not limited thereto.

The plurality of vibration generators 210 and 230 may overlap or be stacked to be displaced (or driven or vibrated) in the same direction. For example, the plurality of vibration generators 210 and 230 may contract or expand in the same driving direction (or displacement direction) based on a vibration driving signal in a state where the plurality of vibration generators 210 and 230 overlap or are stacked, and thus, a displacement amount (or a bending force or a flexural force) or an amplitude displacement of the display panel 100 may increase or may be maximized. Therefore, the plurality of vibration generators 210 and 230 may increase (or maximize) a displacement amount (or a bending force or a flexural force) or an amplitude displacement of the display panel 100, thereby enhancing a sound pressure level characteristic of a sound and a sound characteristic of a middle-low-pitched sound band generated based on a vibration of the display panel 100. For example, the plurality of vibration generators 210 and 230 may be implemented so that the plurality of vibration generators 210 and 230 overlap or are stacked to have the same driving direction, and thus, a driving force of each of the plurality of vibration generators 210 and 230 may increase or may be maximized, thereby enhancing a sound pressure level characteristic of a sound and a sound characteristic of a middle-low-pitched sound band generated by the display panel 100 based on vibrations of the plurality of vibration generators 210 and 230. For example, the plurality of vibration generators 210 and 230 may be implemented so that the plurality of vibration generators 210 and 230 are stacked to have the same vibration direction, and thus, a vibration of each of the plurality of vibration generators 210 and 230 may increase or may be maximized. For example, the middle-low-pitched sound band may be 200 Hz to 1 kHz, but embodiments of the present disclosure are not limited thereto.

Each of the plurality of vibration generators 210 and 230 may include a vibration structure (or a piezoelectric structure, or a vibration portion, or a piezoelectric vibration portion) including piezoelectric ceramic having a piezoelectric characteristic, but embodiments of the present disclosure are not limited thereto. For example, each of the plurality of vibration generators 210 and 230 may include piezoelectric ceramic having a perovskite crystalline structure, and thus, may vibrate (or mechanical displacement) in response to an electrical signal applied from the outside. For example, when a vibration driving signal (or a voice signal) is applied, each of the plurality of vibration generators 210 and 230 may alternately and repeatedly contract and expand based on an inverse piezoelectric effect of the vibration structure (or the piezoelectric structure, or the vibration portion, or the piezoelectric vibration portion), and thus, may be displaced (or vibrated or driven) in the same direction based on a bending phenomenon where a bending direction is alternately changed, thereby increasing or maximizing a displacement amount (or a bending force or a flexural force) or an amplitude displacement of the vibration apparatus 200 or/and the display panel 100.

A first vibration generator 210 disposed at the display panel 100 among the plurality of vibration generators 210 and 230 may be one main vibration generator. For example, the remaining second vibration generator 230 among the plurality of vibration generators 210 and 230 may be at least one auxiliary vibration generator which is stacked on the first vibration generator 210. The second vibration generator 230 may have the same structure as the first vibration generator 210, but embodiments of the present disclosure are not limited thereto.

The vibration apparatus 200 according to an embodiment of the present disclosure may further include an adhesive member 250 (or a third connection member) disposed between the plurality of vibration generators 210 and 230.

The adhesive member 250 according to an embodiment of the present disclosure may be disposed between the plurality of vibration generators 210 and 230. For example, the adhesive member 250 may include a material including an adhesive layer which is good in adhesive force or attaching force with respect to each of the plurality of vibration generators 210 and 230. For example, the adhesive member 250 may include a foam pad, a double-sided tape, or an adhesive, but embodiments of the present disclosure are not limited thereto. For example, the adhesive layer of the adhesive member 250 may include epoxy, acrylic, silicone, or urethane, but embodiments of the present disclosure are not limited thereto. For example, the adhesive layer of the adhesive member 250 may include a urethane-based material which relatively has a ductile characteristic compared to acrylic among acrylic and urethane. Accordingly, the vibration loss of the vibration apparatus 200 caused by displacement interference between the plurality of vibration generators 210 and 230 may be minimized, or each of the plurality of vibration generators 210 and 230 may be freely displaced.

According to another embodiment of the present disclosure, the adhesive member 250 may include one or more of a thermo-curable adhesive, a photo-curable adhesive, and a thermal bonding adhesive. For example, the adhesive member 250 may include the thermal bonding adhesive. The thermal bonding adhesive may be a heat-active type or a thermo-curable type. For example, the adhesive member 250 including the thermal bonding adhesive may attach or couple two adjacent vibration generators 210 and 230 by heat and pressure.

The plurality of vibration generators 210 and 230 according to an embodiment of the present disclosure may be integrated as one structure (or an element) by a laminating process using the adhesive member 250. For example, the plurality of vibration generators 210 and 230 according to an embodiment of the present disclosure may be integrated as one structure (or an element or a component) by a laminating process using the adhesive member 250. For example, the plurality of vibration generators 210 and 230 may be integrated as one structure by a laminating process using a roller.

The apparatus according to an embodiment of the present disclosure may further include a connection member 150 (or a first connection member) disposed between the display panel 100 and the vibration apparatus 200.

The connection member 150 may be disposed between the display panel 100 and the vibration apparatus 200, and thus, may connect or couple the vibration apparatus 200 to the rear surface of the display panel 100. For example, the vibration apparatus 200 may be connected or coupled to the rear surface of the display panel 100 by using the connection member 150, and thus, may be supported by or disposed at the rear surface of the display panel 100.

The connection member 150 according to an embodiment of the present disclosure may include a material including an adhesive layer which is good in adhesive force or attaching force with respect to each of the rear surface of the display panel 100 and the vibration apparatus 200. For example, the connection member 150 may include a foam pad, a double-sided tape, or an adhesive, but embodiments of the present disclosure are not limited thereto. For example, the adhesive layer of the connection member 150 may include epoxy, acrylic, silicone, or urethane, but embodiments of the present disclosure are not limited thereto. For example, the adhesive layer of the connection member 150 may differ from the adhesive layer of the adhesive member 250. For example, the adhesive layer of the connection member 150 may include an acrylic-based material which is relatively better in adhesive force and hardness among acrylic and urethane so that the vibration of the vibration apparatus 200 may be transmitted to the display panel 100 well. Accordingly, a vibration of the vibration apparatus 200 may be transferred to the display panel 100 well.

The adhesive layer of the connection member 150 may further include an additive, such as a tackifier or an adhesion enhancing agent, a wax component, an anti-oxidation agent, or the like. The additive may prevent or reduce the connection member 150 from being detached (stripped) from the display panel 100 by a vibration of the vibration apparatus 200. For example, the tackifier may be rosin derivative or the like, and the wax component may be paraffin wax or the like. For example, the anti-oxidation agent may be a phenol-based anti-oxidation agent, such as thioester, but embodiments of the present disclosure are not limited thereto.

The connection member 150 according to another example of the present disclosure may further include a hollow portion between the display panel 100 and the vibration apparatus 200. The hollow portion of the connection member 150 may provide an air gap between the display panel 100 and the vibration apparatus 200. Due to the air gap, a sound wave (or a sound pressure) based on a vibration of the vibration apparatus 200 may not be dispersed by the connection member 150, and may concentrate on the display panel 100. Thus, the loss of a vibration caused by the connection member 150 may be minimized, thereby increasing a sound pressure level characteristic of a sound generated based on a vibration of the display panel 100.

The apparatus according to an embodiment of the present disclosure may further include a supporting member 300 and a middle frame 400 disposed at a rear surface of the display panel 100. A description of a supporting member 300 and a middle frame 400 may be substantially the same as descriptions given above with reference to FIGS. 1 and 2, and thus, their repetitive descriptions may be omitted.

Figure 7:
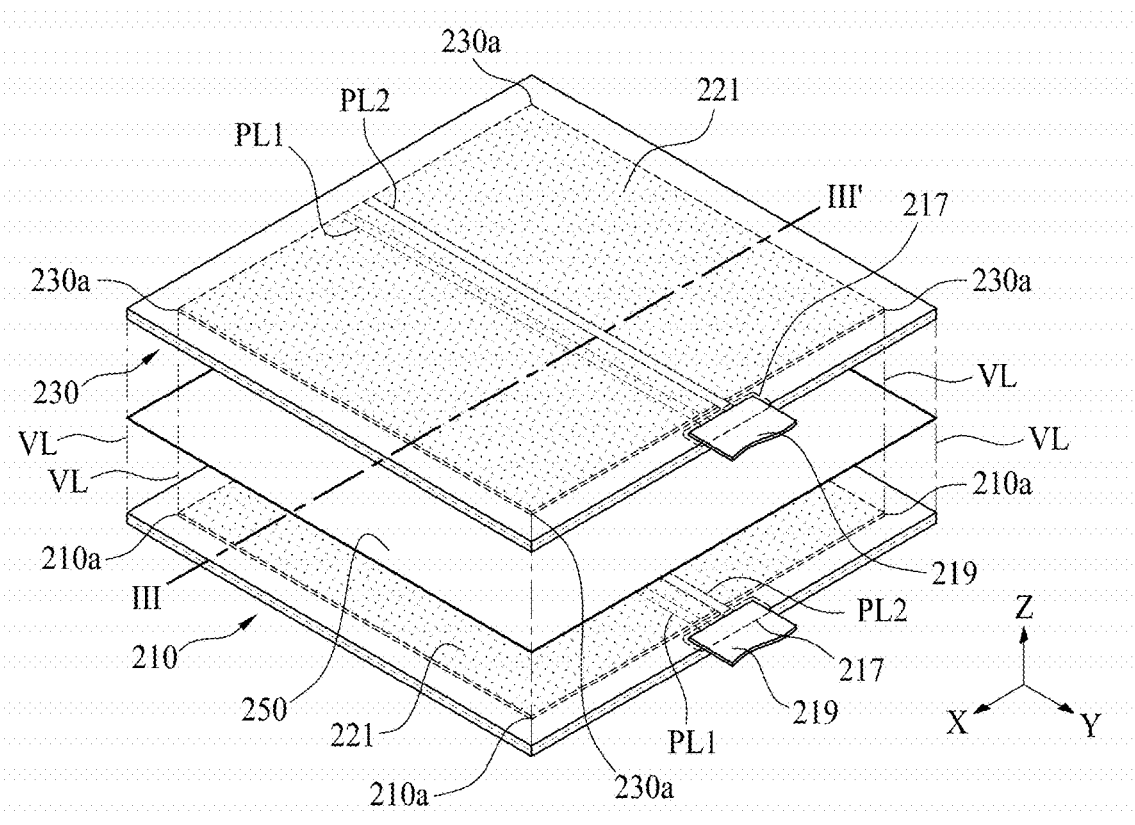
FIG. 7 illustrates a vibration apparatus according to another embodiment of the present disclosure.
Figure 8:
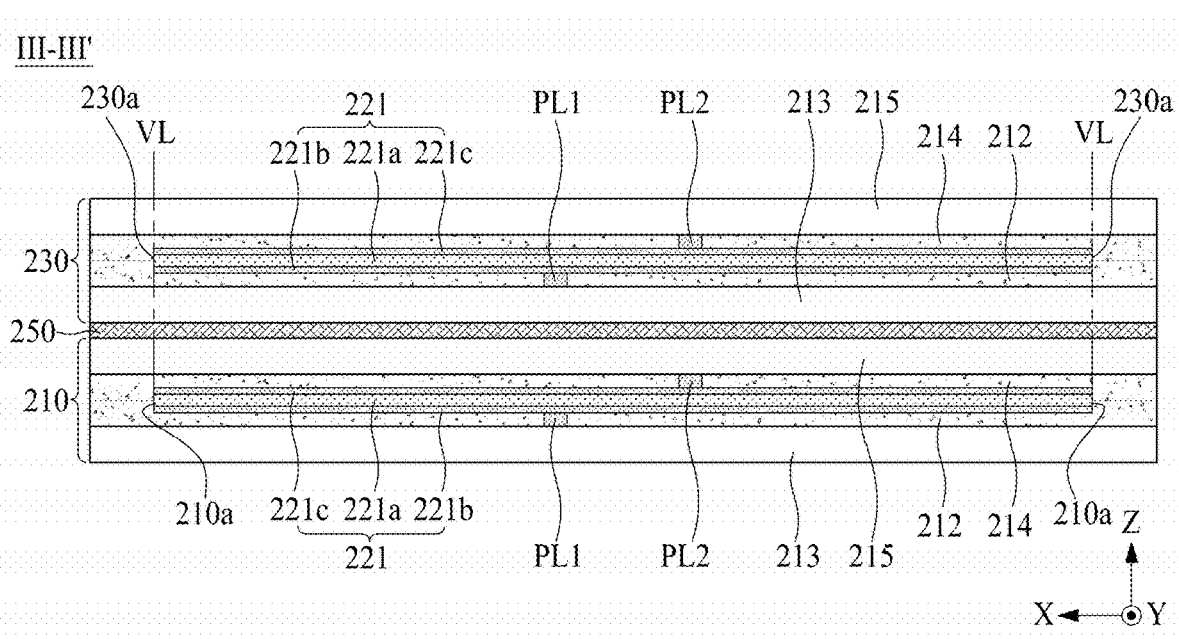
FIG. 8 is a cross-sectional view taken along line III-III' illustrated in FIG. 7.

FIG. 7 illustrates a vibration apparatus according to another embodiment of the present disclosure. FIG. 8 is a cross-sectional view taken along line illustrated in FIG. 7.

With reference to FIGS. 6 to 8, the vibration apparatus 200 according to another embodiment of the present disclosure may include a plurality of vibration generators 210 and 230 and an adhesive member 250.

The plurality of vibration generators 210 and 230 may overlap or be stacked to be displaced (or driven or vibrated) in the same direction in order to maximize an amplitude displacement of the vibration apparatus 200 and/or an amplitude displacement of the display panel 100. For example, the plurality of vibration generators 210 and 230 may have substantially the same size, but embodiments of the present disclosure are not limited thereto. For example, the plurality of vibration generators 210 and 230 may have substantially the same size within an error range of a manufacturing process, but embodiments of the present disclosure are not limited thereto. Therefore, the plurality of vibration generators 210 and 230 may maximize an amplitude displacement of the vibration apparatus 200 and/or an amplitude displacement of the display panel 100. One sides (or end portions, or outer surfaces, or each corner portion) 210a and 230a of the plurality of vibration generators 210 and 230 may be aligned on a virtual extension line VL extending in a thickness direction Z of the display panel 100, or may be disposed at the virtual extension line VL. For example, one sides (or end portions, or end, or outer surfaces, or each corner portion) 210a and 230a of each of the plurality of vibration generators 210 and 230 may be aligned in a direction perpendicular to a front surface of the display panel 100.

For example, in at least one of the plurality of vibration generators 210 and 230, displacement directions and amplitude displacements of the plurality of vibration generators 210 and 230 may not match, and thus, an amplitude displacement of the vibration apparatus 200 may not be maximized. For example, when at least one of the plurality of vibration generators 210 and 230 has a different size departing from an error range of a manufacturing process, the displacement directions and the amplitude displacements of the plurality of vibration generators 210 and 230 may not match, and thus, the amplitude displacement of the vibration apparatus 200 may not be maximized. Also, when at least one of the plurality of vibration generators 210 and 230 is displaced in a different direction, the displacement directions of the plurality of vibration generators 210 and 230 may not match, and thus, the amplitude displacement of the vibration apparatus 200 may not be maximized.

The vibration apparatus 200 according to an embodiment of the present disclosure may include two or more vibration generators 210 and 230 which are stacked to be displaced (or vibrated or driven) in the same direction. In the following description, an example where the vibration apparatus 200 includes the vibration generators 210 and 230 will be described.

According to an embodiment of the present disclosure, a first vibration generator 210 may be connected to or disposed at a rear surface of the display panel 100 by a connection member 150 (or a first connection member). A second vibration generator 230 may be disposed or attached on the first vibration generator 210 by an adhesive member 250 (or a third connection member).

The first and second vibration generators 210 and 230 according to an embodiment of the present disclosure may each include a vibration portion 221, a first protection member 213, and a second protection member 215.

The vibration portion 221 may include a piezoelectric material (or a piezoelectric element) having a piezoelectric characteristic (or a piezoelectric effect). For example, the piezoelectric material may have a characteristic where pressure or twisting is applied to a crystalline structure by an external force, a potential difference occurs due to dielectric polarization caused by a relative position change of a positive (+) ion and a negative (−) ion, and a vibration is generated by an electric field based on a voltage applied thereto. For example, the vibration portion 221 may be a vibration generating structure, a sound generating structure, a vibration generating portion, a sound generating portion, a piezoelectric structure, or a displacement structure, but embodiments of the present disclosure are not limited thereto.

The vibration portion 221 according to an embodiment of the present disclosure may include a vibration layer 221a including a piezoelectric material, a first electrode layer 221b disposed at a first surface of the vibration layer 221a, and a second electrode layer 221c disposed at a second surface, which is opposite to the first surface, of the vibration layer 221a.

The vibration layer 221a may include a piezoelectric material. The vibration layer 221a may be referred to as a vibration portion, a piezoelectric layer, a piezoelectric material layer, an electroactive layer, a piezoelectric vibration portion, a piezoelectric vibration layer, a piezoelectric composite, a displacement portion, a piezoelectric displacement portion, a piezoelectric displacement layer, a sound wave generating portion, a piezoelectric material portion, an electroactive portion, an organic/inorganic material layer, an inorganic material layer, an organic/inorganic material portion, or an inorganic material portion, but embodiments of the present disclosure are not limited thereto.

The vibration layer 221a may be formed of a transparent, semitransparent, or opaque piezoelectric material, and may be transparent, semitransparent, or opaque. The vibration layer 221a may be substantially the same as the vibration portion 211 described above with reference to FIGS. 5A to 6, and thus, their repetitive descriptions may be omitted.

The vibration layer 221a according to an embodiment of the present disclosure may be configured in a circular shape, an ellipse shape, or a polygonal shape, but embodiments of the present disclosure are not limited thereto.

The first electrode layer 221b may be disposed at a first surface (or an upper surface) of the vibration layer 221a. The second electrode layer 221c may be disposed at a second surface (or a rear surface) opposite to or different from the first surface the vibration layer 221a. The first electrode layer 221b and the second electrode layer 221c may be substantially the same as the first electrode layer E1 and the second electrode layer E2 described above with reference to FIGS. 3 and 4, and thus, their repetitive descriptions may be omitted or will be briefly given.

For example, the first electrode layer 221b may substantially have the same shape as the vibration layer 221a, but embodiments of the present disclosure are not limited thereto. For example, the second electrode layer 221c may substantially have the same shape as the vibration layer 221a, but embodiments of the present disclosure are not limited thereto.

In each of the first and second vibration generators 210 and 230, the first electrode layer 221b may be disposed closer to the display panel 100 than the second electrode layer 221c, but embodiments of the present disclosure are not limited thereto. For example, in the vibration apparatus 200 including the plurality of vibration generators 210 and 230 according to an embodiment of the present disclosure, the first electrode layer 221b of each of the plurality of vibration generators 210 and 230 may be disposed closer to the display panel 100 than the second electrode layer 221c.

The vibration layer 221a may be polarized (or poled) by a certain voltage applied to the first electrode layer 221b and the second electrode layer 221c in a certain temperature atmosphere or a temperature atmosphere which is changed from a high temperature to a room temperature, but embodiments of the present disclosure are not limited thereto. For example, the vibration layer 221a may alternately and repeatedly contract and expand based on an inverse piezoelectric effect according to a vibration driving signal (or a sound signal or a voice signal) applied to the first electrode layer 221b and the second electrode layer 221c from the outside, and thus, may be displaced or vibrated.

The vibration portion 221 (or the vibration layer 221a) of the first vibration generator 210 may have the same size as the vibration portion 221 (or the vibration layer 221a) of the second vibration generator 230. In order to maximize or increase a displacement amount or an amplitude displacement of the vibration apparatus 200, the vibration portion 221 (or the vibration layer 221a) of the first vibration generator 210 may substantially overlap or stack the vibration portion 221 (or the vibration layer 221a) of the second vibration generator 230 without being staggered. For example, the vibration portion 221 (or the vibration layer 221a) of the first vibration generator 210 may substantially overlap or stack the vibration portion 221 (or the vibration layer 221a) of the second vibration generator 230 within an error range of a manufacturing process without being staggered. For example, the vibration portion 221 (or the vibration layer 221a) of the first vibration generator 210 and the vibration portion 221 (or the vibration layer 221a) of the second vibration generator 230 may be implemented in a stack structure which has the same size and overlaps (or stacks) without being staggered, and thus, the displacement amount or the amplitude displacement of the vibration apparatus 200 may be maximized or increased. For example, the vibration portion 221 (or the vibration layer 221a) of the first vibration generator 210 and the vibration portion 221 (or the vibration layer 221a) of the second vibration generator 230 may be implemented in a stack structure which has the same size and accurately overlaps (or stacks) without being staggered, and thus, the displacement amount or the amplitude displacement of the vibration apparatus 200 may be maximized or increased.

According to an embodiment of the present disclosure, a first part (or an end portion, or an outer surface, or each corner portion) 210a of each vibration portion 221 (or vibration layer 221a) of the first vibration generator 210 may be aligned on a virtual extension line VL, or may be disposed at the virtual extension line VL. For example, the first part (or an end portion, or an outer surface, or each corner portion) 210a of each vibration portion 221 (or vibration layer 221a) of the first vibration generator 210 may be accurately aligned on a virtual extension line VL, or may be accurately disposed at the virtual extension line VL. A second part (or an end portion, or an outer surface, or each corner portion) 230a of each vibration portion 221 (or vibration layer 221a) of the second vibration generator 230 may be aligned on the virtual extension line VL, or may be disposed at the virtual extension line VL. For example, the second part (or an end portion, or an outer surface, or each corner portion) 230a of each vibration portion 221 (or vibration layer 221a) of the second vibration generator 230 may be accurately aligned on the virtual extension line VL, or may be accurately disposed at the virtual extension line VL. The first part 210a of each vibration portion 221 (or vibration layer 221a) of the first vibration generator 210 may be aligned with or overlap the second part 230a of each vibration portion 221 (or vibration layer 221a) of the second vibration generator 230. For example, the first part 210a of the vibration portion 221 (or the vibration layer 221a) of the first vibration generator 210 may be accurately aligned with or accurately overlap the second part 230a of each vibration portion 221 (or vibration layer 221a) of the second vibration generator 230. For example, the first part 210a of the vibration portion 221 (or the vibration layer 221a) of the first vibration generator 210 may correspond to the second part 230a of each vibration portion 221 (or vibration layer 221a) of the second vibration generator 230. Therefore, in the vibration apparatus 200 according to an embodiment of the present disclosure, the vibration portion 221 (or a first vibration portion) of the first vibration generator 210 and the vibration portion 221 (or a second vibration portion) of the second vibration generator 230 may be displaced in the same direction, and thus, the displacement amount or the amplitude displacement of the vibration apparatus 200 may be maximized or increased. Accordingly, a displacement amount (or a bending force or a flexural force) or an amplitude displacement of the display panel 100 may increase (or maximized).

In the first vibration generator 210, the first protection member 213 may be disposed over the first electrode layer 221b. The first protection member 213 may protect the first electrode layer 221b. The second protection member 215 may be disposed over the second electrode layer 221c. The second protection member 215 may protect the second electrode layer 221c. For example, the first protection member 213 and the second protection member 215 of the first vibration generator 210 may be formed of a plastic material, a fiber material, or wood material, but embodiments of the present disclosure are not limited thereto. For example, in the first vibration generator 210, the first protection member 213 may be formed of the same or different material as the second protection member 215. One or more among the first protection member 213 and the second protection member 215 of the first vibration generator 210 may be connected or coupled to a rear surface of the display panel 100 by a connection member (or a second connection member) 150. For example, the first protection member 213 of the first vibration generator 210 may be connected or coupled to the rear surface of the display panel 100 by the connection member (or the second connection member) 150.

In the second vibration generator 230, the first protection member 213 may be disposed over the first electrode layer 221b. The first protection member 213 may protect the first electrode layer 221b. The second protection member 215 may be disposed over the second electrode layer 221c. The second protection member 215 may protect the second electrode layer 221c. For example, the first protection member 213 and the second protection member 215 of the second vibration generator 230 may be formed of a plastic material, a fiber material, or wood material, but embodiments of the present disclosure are not limited thereto. For example, in the second vibration generator 230, the first protection member 213 may be formed of the same or different material as the second protection member 215. One or more among the first protection member 213 and the second protection member 215 of the second vibration generator 230 may be connected or coupled to a rear surface of the first vibration generator 210 by an adhesive member (or a third connection member) 250. For example, the first protection member 213 of the second vibration generator 230 may be connected or coupled to the second protection member 215 of the first vibration generator 210 by the adhesive member 250.

In each of the first vibration generator 210 and the second vibration generator 230, each of the first protection member 213 and the second protection member 215 may be formed of a plastic material. For example, each of the first protection member 213 and the second protection member 215 may be a polyimide (PI) film or a polyethylene terephthalate (PET) film, but embodiments of the present disclosure are not limited thereto.

One or more of the first vibration generator 210 and the second vibration generator 230 according to an embodiment of the present disclosure may further include a first adhesive layer 212 and a second adhesive layer 214.

In the first vibration generator 210, the first adhesive layer 212 may be disposed between the vibration portion 221 and the first protection member 213. For example, the first adhesive layer 212 may be disposed between the first electrode layer 221b of the vibration portion 221 and the first protection member 213. The first protection member 213 may be disposed over a first surface (or the first electrode layer 221b) of the vibration portion 221 by the first adhesive layer 212. For example, the first protection member 213 may be coupled or connected to the first surface (or the first electrode layer 221b) of the vibration portion 221 by a film laminating process using the first adhesive layer 212.

In the first vibration generator 210, the second adhesive layer 214 may be disposed between the vibration portion 221 and the second protection member 215. For example, the second adhesive layer 214 may be disposed between the second electrode layer 221c of the vibration portion 221 and the second protection member 215. The second protection member 215 may be disposed over a second surface (or the second electrode layer 221c) of the vibration portion 221 by the second adhesive layer 214. For example, the second protection member 215 may be coupled or connected to the second surface (or the second electrode layer 221c) of the vibration portion 221 by a film laminating process using the second adhesive layer 214.

In the first vibration generator 210, the first and the second adhesive layers 212 and 214 may be connected or coupled to each other between the first protection member 213 and the second protection member 215. For example, in the first vibration generator 210, the first and the second adhesive layers 212 and 214 may be connected or coupled to each other at a periphery portion between the first protection member 213 and the second protection member 215. Accordingly, in the first vibration generator 210, the vibration portion 221 may be surrounded by the first and second adhesive layers 212 and 214. For example, the first and second adhesive layers 212 and 214 may completely surround the whole vibration portion 221. For example, the first and second adhesive layers 212 and 214 may be referred to as a cover member, but embodiments of the present disclosure are not limited thereto. When the first and second adhesive layers 212 and 214 are a cover member, the first protection member 213 may be disposed at a first surface of the cover member, and the second protection member 215 may be disposed at a second surface of the cover member. For example, for convenience of description, the first and second adhesive layers 212 and 214 are illustrated as first and second adhesive layers 212 and 214, but embodiments of the present disclosure are not limited thereto and may be provided as one adhesive layer.

In the second vibration generator 230, the first adhesive layer 212 may be disposed between the vibration portion 221 and the first protection member 213. For example, the first adhesive layer 212 may be disposed between the first electrode layer 221b of the vibration portion 221 and the first protection member 213. The first protection member 213 may be disposed over a first surface (or the first electrode layer 221b) of the vibration portion 221 by the first adhesive layer 212. For example, the first protection member 213 may be coupled or connected to the first surface (or the first electrode layer 221b) of the vibration portion 221 by a film laminating process using the first adhesive layer 212.

In the second vibration generator 230, the second adhesive layer 214 may be disposed between the vibration portion 221 and the second protection member 215. For example, the second adhesive layer 214 may be disposed between the second electrode layer 221c of the vibration portion 221 and the second protection member 215. The second protection member 215 may be disposed over a second surface (or the second electrode layer 221c) of the vibration portion 221 by the second adhesive layer 214. For example, the second protection member 215 may be coupled or connected to the second surface (or the second electrode layer 221c) of the vibration portion 221 by a film laminating process using the second adhesive layer 214.

In the second vibration generator 230, the first and the second adhesive layers 212 and 214 may be connected or coupled to each other between the first protection member 213 and the second protection member 215. For example, in the second vibration generator 230, the first and the second adhesive layers 212 and 214 may be connected or coupled to each other at a periphery portion between the first protection member 213 and the second protection member 215. Accordingly, in the second vibration generator 230, the vibration portion 221 may be surrounded by the first and second adhesive layers 212 and 214. For example, the first and second adhesive layers 212 and 214 may completely surround the whole vibration portion 221. For example, the first and second adhesive layers 212 and 214 may be referred to as a cover member, but embodiments of the present disclosure are not limited thereto. When the first and second adhesive layers 212 and 214 are a cover member, the first protection member 213 may be disposed at a first surface of the cover member, and the second protection member 215 may be disposed at a second surface of the cover member. For example, for convenience of description, the first and second adhesive layers 212 and 214 are illustrated as first and second adhesive layers 212 and 214, but embodiments of the present disclosure are not limited thereto and may be provided as one adhesive layer.

In each of the first and the second vibration generators 210 and 230, each of the first and second adhesive layers 212 and 214 may include an electric insulating material. For example, the electric insulating material may have adhesiveness and may include a material capable of compression and decompression. For example, one or more of the first and second adhesive layers 212 and 214 may include an epoxy resin, an acrylic resin, a silicone resin, or a urethane resin, but embodiments of the present disclosure are not limited thereto.

One or more of the first and second vibration generators 210 and 230 according to an embodiment of the present disclosure may further include a first power supply line PL1, a second power supply line PL2, and a pad part 217.

The first power supply line PL1 of one or more of the first and second vibration generators 210 and 230 may extend long in a second direction Y. The first power supply line PL1 may be disposed at the first protection member 213 and may be electrically connected to the first electrode layer 221b. For example, the first power supply line PL1 may be disposed at a rear surface of the first protection member 213 facing the first electrode layer 221b and may be electrically connected to the first electrode layer 221b. For example, the first power supply line PL1 may be disposed at the rear surface of the first protection member 213 directly facing the first electrode layer 221b and may be directly and electrically connected to the first electrode layer 221b. For example, the first power supply line PL1 may be electrically connected to the first electrode layer 221b by using an anisotropic conductive film. As another embodiment of the present disclosure, the first power supply line PL1 may be electrically connected to the first electrode layer 221b through a conductive material (or particles) included in the first adhesive layer 212.

For example, the first power supply line PL1 of one or more of the first and second vibration generators 210 and 230 may include at least one or more first power lines which protrude along a first direction X crossing the second direction Y. The at least one or more first power lines may extend long from at least one or more among one surface and the other surface of the first power supply line PL1 along the first direction X and may be electrically connected to the first electrode layer 221b. Accordingly, the at least one or more first power lines may enhance the uniformity of the vibration driving signal applied to the first electrode layer 221b.

The second power supply line PL2 of one or more of the first and second vibration generators 210 and 230 may be disposed at the second protection member 215 and may be electrically connected to the second electrode layer 221c. For example, the second power supply line PL2 may be disposed at a rear surface of the second protection member 215 facing the second electrode layer 221c and may be electrically connected to the second electrode layer 221c. For example, the second power supply line PL2 may be disposed at the rear surface of the second protection member 215 directly facing the second electrode layer 221c and may be directly and electrically connected to the second electrode layer 221c. For example, the second power supply line PL2 may be electrically connected to the second electrode layer 221c by using an anisotropic conductive film. As another embodiment of the present disclosure, the second power supply line PL2 may be electrically connected to the second electrode layer 221c through a conductive material (or particles) included in the second adhesive layer 214.

For example, the second power supply line PL2 of one or more of the first and second vibration generators 210 and 230 may include at least one or more second power lines which protrude along the first direction X. The at least one or more second power lines may extend long from at least one or more among one surface and the other surface of the second power supply line PL2 along the first direction X and may be electrically connected to the second electrode layer 221c. The at least one or more second power lines may overlap or stack the at least one or more first power lines. Accordingly, the at least one or more second power lines may enhance the uniformity of the vibration driving signal applied to the second electrode layer 221c.

The pad part 217 may be electrically connected to a first portion (or one side or one end) of one or more among the first power supply line PL1 and the second power supply line PL2. For example, the pad part 217 may be disposed at a first periphery portion of one or more among the first protection member 213 and the second protection member 215. The pad part 217 may be electrically connected to the first portion (or one side or one end) of one or more among the first power supply line PL1 and the second power supply line PL2.

The pad part 217 according to an embodiment of the present disclosure may include a first pad electrode electrically connected to the first portion (or one side or one end) of the first power supply line PL1 and a second pad electrode electrically connected to the first portion (or one side or one end) of the second power supply line PL2. For example, one or more of the first pad electrode and the second pad electrode may be exposed at the first periphery portion of one or more among the first protection member 213 and the second protection member 215.

One or more of the first and second vibration generators 210 and 230 according to an embodiment of the present disclosure may further include a flexible cable 219.

The flexible cable 219 may be electrically connected to the pad part 217 of one or more among the first and second vibration generators 210 and 230. Thus, the flexible cable 219 may supply a corresponding vibration portion 221 with vibration driving signals (or a sound signal) provided from a vibration driving circuit. The flexible cable 219 according to an embodiment of the present disclosure may include a first terminal and a second terminal. The first terminal may be electrically connected to the first pad electrode of the pad part 217. The second terminal may be electrically connected to the second pad electrode of the pad part 217. For example, the flexible cable 219 may be a flexible printed circuit cable or a flexible flat cable, but embodiments of the present disclosure are not limited thereto.

The vibration driving circuit (or a sound processing circuit) may generate an alternating current (AC) vibration driving signal including a first vibration driving signal and a second vibration driving signal based on a sound source. The first vibration driving signal may be any one of a positive (+) vibration driving signal and a negative (−) vibration driving signal, and the second vibration driving signal may be any one of a positive (+) vibration driving signal and a negative (−) vibration driving signal. As an embodiment of the present disclosure, the first vibration driving signal may be supplied to the first electrode layer 221b of the vibration portion 221 through the first terminal of the flexible cable 219, the first pad electrode of the pad part 217, and the first power supply line PL1. The second vibration driving signal may be supplied to the second electrode layer 221c of the vibration portion 221 through the second terminal of the flexible cable 219, the second pad electrode of the pad part 217, and the second power supply line PL2. As another embodiment of the present disclosure, the first vibration driving signal may be supplied to the second electrode layer 221c of the vibration portion 221 through the first terminal of the flexible cable 219, the second pad electrode of the pad part 217, and the second power supply line PL2. The second vibration driving signal may be supplied to the first electrode layer 221b of the vibration portion 211 through the second terminal of the flexible cable 219, the first pad electrode of the pad part 217, and the first power supply line PL1.

The adhesive member 250 according to an embodiment of the present disclosure may be disposed between the first and second vibration generators 210 and 230. For example, the adhesive member 250 may be disposed between the first protection member 213 of the first vibration generator 210 and the second protection member 215 of the second vibration generator 230. For example, the adhesive member 250 may include a material including an adhesive layer which is good in adhesive force or attaching force with respect to the first and second vibration generators 210 and 230. For example, the adhesive member 250 may include a foam pad, a double-sided tape, or an adhesive, but embodiments of the present disclosure are not limited thereto. For example, an adhesive layer of the adhesive member 250 may include epoxy, acrylic, silicone, or urethane, but embodiments of the present disclosure are not limited thereto.

In FIGS. 7 and 8 and description relevant thereto, the vibration apparatus 200 according to an embodiment of the present disclosure has been described as including the first and second vibration generators 210 and 230 and the adhesive member 250 disposed between the first and second vibration generators 210 and 230, but embodiments of the present disclosure are not limited thereto. For example, the vibration apparatus 200 according to an embodiment of the present disclosure may include a plurality of (for example, three or more) vibration generators 210 and 230 and an adhesive member 250 disposed between the plurality of vibration generators 210 and 230 based on a sound pressure level characteristic and an output characteristic of a sound generated based on a displacement of the display panel 100 based on a size and weight, or the like of the display panel 100. In this case, in order to maximize or increase the displacement amount or the amplitude displacement of the vibration apparatus 200, the plurality of vibration generators 210 and 230 may have the same size and may overlap or stack with each other. For example, first and second parts (or end portions, or outer surfaces, or each corner portion) 210a and 230a of each vibration portion 221 (or vibration layer 221a) of one or more of the plurality of vibration generators 210 and 230 may substantially overlap or stack without being staggered. For example, the first and second parts (or end portions, or outer surfaces, or each corner portion) 210a and 230a of each vibration portion 221 (or vibration layer 221a) of one or more of the plurality of vibration generators 210 and 230 may substantially overlap or stack within an error range of a manufacturing process without being staggered. For example, the first and second parts (or end portions, ends, outer surfaces, or each corner portion) 210a and 230a of each vibration portion 221 (or vibration layer 221a) of each of the plurality of vibration generators 210 and 230 may be aligned on a virtual extension line VL, or may be disposed at the virtual extension line VL. For example, the first and second parts (or end portions, ends, outer surfaces, or each corner portion) 210a and 230a of each vibration portion 221 (or vibration layer 221a) of each of the plurality of vibration generators 210 and 230 may be accurately aligned on the virtual extension line VL, or may be accurately disposed at the virtual extension line VL.

Figure 9:
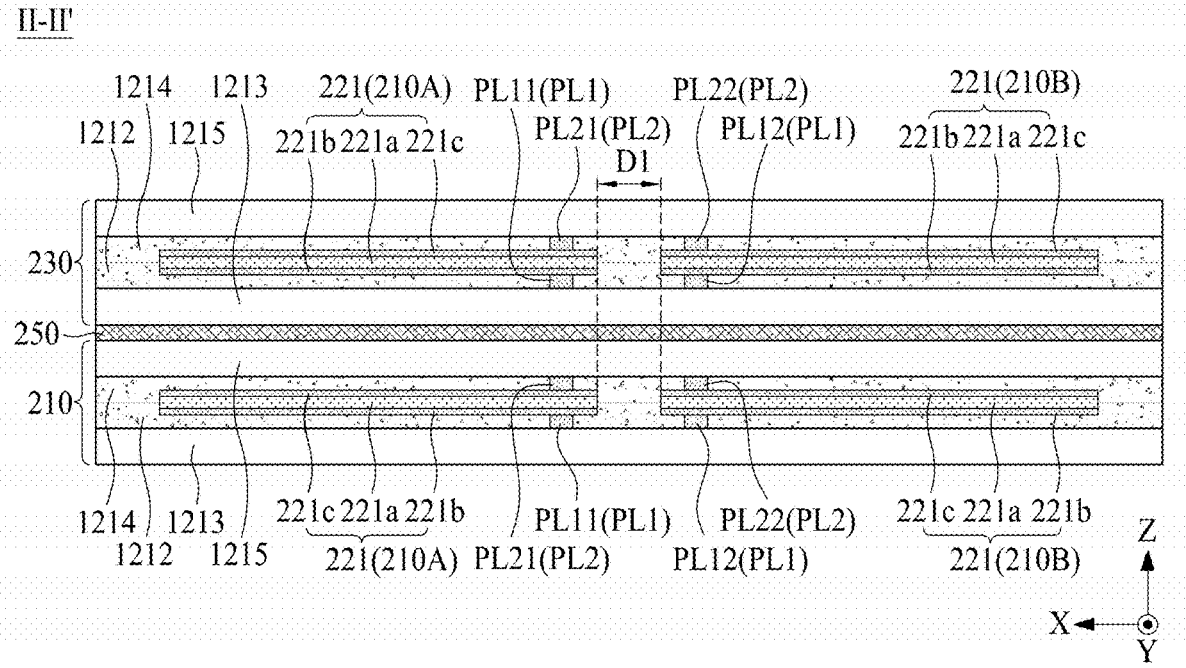
FIG. 9 is another cross-sectional view taken along line II-II' illustrated in FIG. 3.

FIG. 9 is another cross-sectional view taken along line II-II' illustrated in FIG. 3.

With reference to FIG. 9, in the vibration apparatus according to another embodiment of the present disclosure, each of the first vibration generator 210 and the second vibration generator 230 may include at least one or more vibration structures 210A to 210D or a plurality of vibration structures 210A to 210D. FIG. 9 illustrates an example including four vibration structures, each of the first vibration generator 210 and the second vibration generator 230 according to an embodiment of the present disclosure may be configured to include two or more vibration structures.

The plurality of vibration structures 210A to 210D may be electrically separated and disposed while being spaced apart from each other along each of a first direction X and a second direction Y.

Each of the plurality of vibration structures 210A to 210D may alternately and/or repeatedly contract and expand based on a piezoelectric effect to vibrate. Each of the plurality of vibration structures 210A to 210D may be disposed or tiled at a certain interval. Therefore, each of the first vibration generator 210 and the second vibration generator 230 in which the plurality of vibration structures 210A to 210D are tiled may be referred to as a vibration film, a displacement generator, a displacement film, a displacement structure, a sound generating structure, a sound generator, a tiling vibration array, a tiling vibration array module, or a tiling vibration film, but embodiments of the present disclosure are not limited thereto. Descriptions of a plurality of vibration structures 210A to 210D may be substantially the same as descriptions given above with reference to FIG. 3, and thus, their repetitive descriptions may be omitted or will be briefly given.

Each of the first to fourth vibration structures 210A to 210D according to an embodiment of the present disclosure may include a vibration layer 221a, a first electrode layer 221b, and a second electrode layer 221c. Descriptions of a vibration layer 221a, a first electrode layer 221b, and a second electrode layer 221c may be substantially the same as descriptions given above with reference to FIGS. 3, 4, 7, and 8, and thus, their repetitive descriptions may be omitted or will be briefly given.

The vibration layer 221a may include a ceramic-based material capable of realizing a relatively high vibration. For example, the vibration layer 221a may include a 1-3 composite structure having a piezoelectric characteristic of a 1-3 vibration mode or a 2-2 composite structure having a piezoelectric characteristic of a 2-2 vibration mode. For example, the vibration layer 221a may be the same as the vibration portion 211 described above with reference to FIG. 3, or may include the first portions 211a and the second portion 211b similar to the vibration layer 221a described above with reference to FIG. 5.

Each of the first vibration generator 210 and the second vibration generator 230 according to an embodiment of the present disclosure may further include a first protection member 1213 and a second protection member 1215.

The first protection member 1213 according to an embodiment of the present disclosure may be commonly disposed over the first surface of each of the plurality of vibration structures 210A to 210D by a first adhesive layer 1212. The second protection member 1215 may be commonly disposed over the second surface of each of the first vibration generator 210 and the second vibration generator 230. The first protection member 1213 and the second protection member 1215 may be substantially the same as the first protection member 213 and the second protection member 215 described above with reference to FIGS. 3, 4, 7, and 8, and thus, its description is omitted.

The first adhesive layer 1212 may be disposed at the first surface of each of the plurality of vibration structures 210A to 210D and between the plurality of vibration structures 210A to 210D. For example, the first adhesive layer 1212 may be formed at a rear surface (or an inner surface) of the first protection member 1213 facing the first surface of each of the first vibration generator 210 and the second vibration generator 230. For example, the first adhesive layer 1212 may be disposed at the first surface of each of the plurality of vibration structures 210A to 210D, and filled between the plurality of vibration structures 210A to 210D.

The second adhesive layer 1214 may be disposed at the second surface of each of the plurality of vibration structures 210A to 210D and between the plurality of vibration structures 210A to 210D. For example, the second adhesive layer 1214 may be formed at a front surface (or an inner surface) of the second protection member 1215 facing the second surface of each of the first vibration generator 210 and the second vibration generator 230. For example, the second adhesive layer 1214 may be disposed at the second surface of each of the plurality of vibration structures 210A to 210D, and filled between the plurality of vibration structures 210A to 210D.

One or more of the first vibration generator 210 and the second vibration generator 230 according to another embodiment of the present disclosure may further include a first power supply line PL1, a second power supply line PL2, and a pad part 1217.

The first power supply line PL1 may be disposed at the first protection member 1213. For example, the first power supply line PL1 may be disposed at a rear surface of the first protection member 1213 facing the first surface of each of the first vibration generator 210 and the second vibration generator 230. The first power supply line PL1 may be electrically connected to the first electrode layer 221b of each of the plurality of vibration structures 210A to 210D. For example, the first power supply line PL1 may be directly and electrically connected to the first electrode layer 221b of each of the plurality of vibration structures 210A to 210D. For example, the first power supply line PL1 may be electrically connected to the first electrode layer 221b of each of the plurality of vibration structures 210A to 210D by an anisotropic conductive film. As another embodiment of the present disclosure, the first power supply line PL1 may be electrically connected to the first electrode layer 221b of each of the plurality of vibration structures 210A to 210D by a conductive material (or particle) included in the first adhesive layer 1212.

The first power supply line PL1 according to an embodiment of the present disclosure may include a 1-1$^{th}$ and a 1-2$^{th}$ upper power lines PL11 and PL12 disposed along a second direction Y. For example, the 1-1$^{th}$ upper power line PL11 may be electrically connected to the first electrode layer 221b of each of the first and third vibration structures 210A and 210C (or a first group) among the plurality of vibration structures 210A to 210D. For example, the first and third vibration structures 210A and 210C may be disposed at a first column parallel to the second direction Y among the plurality of vibration structures 210A to 210D. The 1-2$^{th}$ upper power line PL12 may be electrically connected to the first electrode layer 221$b$ of each of the second and fourth vibration structures 210B and 210D (or a second group) among the plurality of vibration structures 210A to 210D. For example, the second and fourth vibration structures 210B and 210D may be disposed at a second column parallel to the second direction Y among the plurality of vibration structures 210A to 210D.

The second power supply line PL2 may be disposed at the second protection member 1215. For example, the second power supply line PL2 may be disposed at a first surface of the second protection member 1215 facing the second surface of each of the first vibration generator 210 and the second vibration generator 230. For example, the first surface of the second protection member 1215 may be a rear surface (or a lower surface) of the second protection member 1215. The second power supply line PL2 may be electrically connected to the second electrode layer 221$c$ of each of the plurality of vibration structures 210A to 210D. For example, the second power supply line PL2 may be directly and electrically connected to the second electrode layer 221$c$ of each of the plurality of vibration structures 210A to 210D. For example, the second power supply line PL2 may be electrically connected to the second electrode layer 221$c$ of each of the plurality of vibration structures 210A to 210D by an anisotropic conductive film. As another embodiment of the present disclosure, the second power supply line PL2 may be electrically connected to the second electrode layer 221$c$ of each of the plurality of vibration structures 210A to 210D by a conductive material (or particle) included in the second adhesive layer 1214.

The second power supply line PL2 according to an embodiment of the present disclosure may include a 2-1$^{th}$ and a 2-2$^{th}$ lower power lines PL21 and PL22 disposed along a second direction Y. For example, the 2-1$^{th}$ lower power line PL21 may be electrically connected to the second electrode layer 221$c$ of each of the first and third vibration structures 210A and 210C (or a first group) among the plurality of vibration structures 210A to 210D. For example, the first and third vibration structures 210A and 210C may be disposed at a first column parallel to the second direction Y among the plurality of vibration structures 210A to 210D. The 2-2$^{th}$ lower power line PL22 may be electrically connected to the second electrode layer 221$c$ of each of the second and fourth vibration structures 210B and 210D (or a second group) among the plurality of vibration structures 210A to 210D. For example, the second and fourth vibration structures 210B and 210D may be disposed at a second column parallel to the second direction Y among the plurality of vibration structures 210A to 210D.

The pad part 1217 may be electrically connected to the first power supply line PL1 and the second power supply line PL2. For example, the pad part 1217 may be disposed at each of the first vibration generator 210 and the second vibration generator 230 so as to be electrically connected to one portion (or one end) of at least one or more among the first power supply line PL1 and the second power supply line PL2.

The pad part 1217 according to an embodiment of the present disclosure may include a first pad electrode electrically connected to one portion of the first power supply line PL1 and a second pad electrode electrically connected to one portion of the second power supply line PL2.

The first pad electrode may be connected to one portion (or one end) of each of the 1-1$^{th}$ and 1-2$^{th}$ upper power lines PL11 and PL12 of the first power supply line PL1 in common. For example, the one portion (or one end) of each of the 1-1$^{th}$ and 1-2$^{th}$ upper power lines PL11 and PL12 may branch from the first pad electrode.

The second pad electrode may be connected to one portion (or one end) of each of the 2-1$^{th}$ and 2-2$^{th}$ lower power lines PL21 and PL22 of the second power supply line PL2 in common. For example, the one portion (or one end) of each of the 2-1$^{th}$ and 2-2$^{th}$ lower power lines PL21 and PL22 may branch from the second pad electrode.

According to an embodiment of the present disclosure, one or more among the first power supply line PL1, the second power supply line PL2, and the pad part 1217 may be configured to be a transparent conductive material, a semitransparent conductive material, or an opaque conductive material so as to be transparent, translucent, or opaque.

One or more of the first vibration generator 210 and the second vibration generator 230 according to another embodiment of the present disclosure may further include a flexible cable 1219.

The flexible cable 1219 may be electrically connected to the pad part 1217 disposed at the each of the first vibration generator 210 and the second vibration generator 230 and may supply the each of the first vibration generator 210 and the second vibration generator 230 with one or more vibration driving signals (or a sound signal) provided from a vibration driving circuit. The flexible cable 1219 according to an embodiment of the present disclosure may include a first terminal and a second terminal. The first terminal may be electrically connected to the first pad electrode of the pad part 1217. The second terminal may be electrically connected to the second pad electrode of the pad part 1217. For example, the flexible cable 1219 may be a flexible printed circuit cable or a flexible flat cable, but embodiments of the present disclosure are not limited thereto.

Therefore, the vibration apparatus 200 according to another embodiment of the present disclosure may include the plurality of vibration structures 210A to 210D which are arranged (or tiled) at a certain interval D1 and D2 so as to be implemented as a single vibrator without being independently driven, and thus, may be driven as a large-area vibrator based on a single-body vibration of the plurality of vibration structures 210A to 210D. For example, the plurality of vibration structures 210A to 210D may be a single vibrator which is arranged (or tiled) at a certain interval D1 and D2. Accordingly, the vibration apparatus 200 may vibrate a large area of display panel or vibrate by itself in a large-area, thereby increasing or enhancing a sound characteristic and a sound pressure level characteristic in the low-pitched sound band and a reproduction band of a sound output from the display panel.

Figures 10, 11:
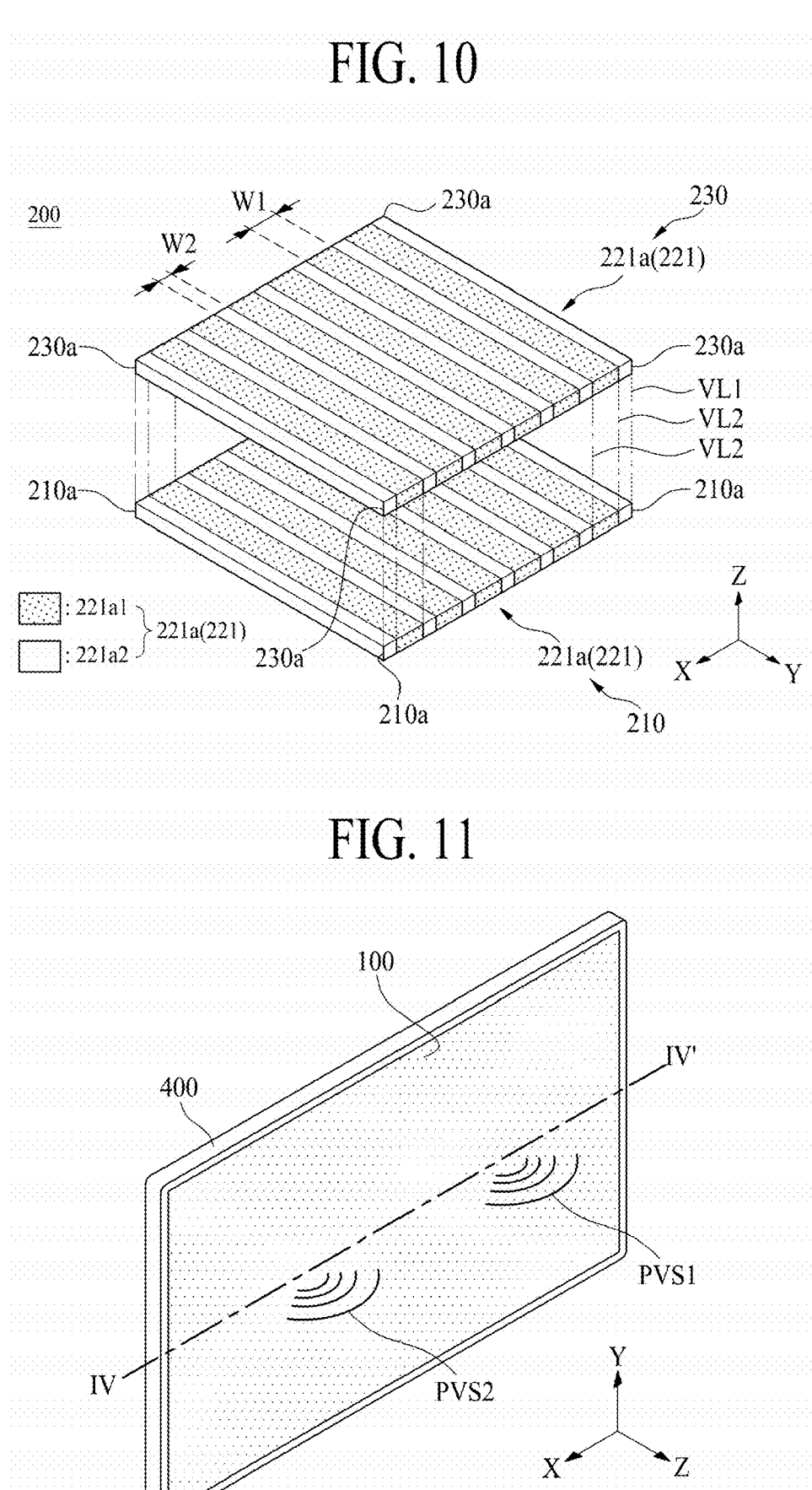
FIG. 10 illustrates a vibration layer of the vibration generators illustrated in FIG. 7.
FIG. 11 illustrates an apparatus according to another embodiment of the present disclosure.

FIG. 10 illustrates a vibration layer of the vibration generators illustrated in FIG. 7.

With reference to FIG. 10, in the vibration portion 221 of each of the vibration generators 210 and 230 according to an embodiment of the present disclosure, a vibration layer 221$a$ may include a plurality of first portions 221$a1$ and a plurality of second portions 221$a2$. For example, the plurality of first portions 221$a1$ and the plurality of second portions 221$a2$ may be alternately and repeatedly arranged in a first direction X (or a second direction Y). For example, the first direction X may be a widthwise direction of the vibration portion 221$a$, the second direction Y may be a lengthwise direction of the vibration portion 221$a$, but embodiments of the present disclosure are not limited thereto. For example, the first direction X may be the lengthwise direction of the vibration portion 221a, and the second direction Y may be the widthwise direction of the vibration portion 221a.

Each of the plurality of first portions 221a1 may be configured as an inorganic material portion. The inorganic material portion may include the piezoelectric material described above. For example, each of the plurality of first portions 221a1 may include a piezoelectric material which is be substantially the same as the vibration portion 211 described above with reference to FIGS. 5A to 5F, and thus, their repetitive descriptions may be omitted.

Each of the plurality of first portions 221a1 according to an embodiment of the present disclosure may be disposed between the plurality of second portions 221a2. Each of the plurality of first portions 221a1 and the plurality of second portions 221a2 may include a piezoelectric material which is be substantially the same as the plurality of first portions 221a1 and the plurality of second portions 221a2 described above with reference to FIGS. 5A to 5F, and thus, their repetitive descriptions may be omitted.

In order to maximize or increase a displacement amount or an amplitude displacement of the vibration apparatus 200, the vibration portion 221 of the first vibration generator 210 and the vibration portion 221 of the second vibration generator 230 may have the same size and may overlap (or stack) with each other. For example, a first part (or an end portion, or an outer surface, or each corner portion) 210a of the vibration portion 221 (or vibration layer 221a) of the first vibration generator 210 may be substantially aligned with or overlap a second part (or an end portion, or an outer surface, or each corner portion) 230a of each vibration portion 221 (or vibration layer 221a) of the second vibration generator 230 without being staggered. For example, the first part (or an end portion, or an outer surface, or each corner portion) 210a of the vibration portion 221 (or vibration layer 221a) of the first vibration generator 210 may be substantially aligned with or overlap the second part (or an end portion, or an outer surface, or each corner portion) 230a of each vibration portion 221 (or vibration layer 221a) of the second vibration generator 230 within an error range of a manufacturing process without being staggered. For example, the first part (or an end portion, or an outer surface, or each corner portion) 210a of each vibration portion 221 (or vibration layer 221a) of the first vibration generator 210 may be aligned on a first virtual extension line VL1, or may be disposed at the first virtual extension line VL1. The second part (or an end portion, or an outer surface, or each corner portion) 230a of each vibration portion 221 (or vibration layer 221a) of the second vibration generator 230 may be accurately aligned on the first virtual extension line VL1, or may be accurately disposed at the first virtual extension line VL1. The second part (or an end portion, or an outer surface, or each corner portion) 230a of each vibration portion 221 (or vibration layer 221a) of the second vibration generator 230 may be aligned on the first virtual extension line VL1, or may be disposed at the first virtual extension line VL1. The second part (or an end portion, or an outer surface, or each corner portion) 230a of each vibration portion 221 (or vibration layer 221a) of the second vibration generator 230 may be accurately aligned on the first virtual extension line VL1, or may be accurately disposed at the first virtual extension line VL1.

According to another embodiment of the present disclosure, the plurality of first portions 221a1 of the first vibration generator 210 and the plurality of first portions 221a1 of the second vibration generator 230 may have the same size as each other, and may substantially overlap or stack with each other. For example, the plurality of first portions 221a1 of the first vibration generator 210 and the plurality of first portions 221a1 of the second vibration generator 230 may have the same size as each other, and may substantially overlap or stack without being staggered. According to an embodiment of the present disclosure, the first portions of each of the plurality of first portions 221a1 included in the first vibration generator 210 may substantially overlap or stack the first portions of each of the plurality of first portions 221a1 included in the second vibration generator 230. For example, the first portions of each of the plurality of first portions 221a1 included in the first vibration generator 210 may substantially overlap or stack the first portions of each of the plurality of first portions 221a1 included in the second vibration generator 230 without being staggered. For example, the first portions of each of the plurality of first portions 221a1 included in the first vibration generator 210 and the first portions of each of the plurality of first portions 221a1 included in the second vibration generator 230 may be aligned on or disposed at a second virtual extension line VL2. For example, the first portions of each of the plurality of first portions 221a1 included in the first vibration generator 210 and the first portions of each of the plurality of first portions 221a1 included in the second vibration generator 230 may be accurately aligned on or accurately disposed at the second virtual extension line VL2 without being staggered.

According to another embodiment of the present disclosure, the plurality of second portions 221a2 of the first vibration generator 210 and the plurality of second portions 221a2 of the second vibration generator 230 may have the same size as each other, and may substantially overlap or stack with each other. For example, the plurality of second portions 221a2 of the first vibration generator 210 and the plurality of second portions 221a2 of the second vibration generator 230 may have the same size as each other, and may substantially overlap or stack without being staggered. According to an embodiment of the present disclosure, the first part (or an end portion) 210a of each of the plurality of second portions 221a2 included in the first vibration generator 210 may substantially overlap or stack the second part (or an end portion) 230a of each of the plurality of second portions 221a2 included in the second vibration generator 230. For example, the first part (or an end portion) 210a of each of the plurality of second portions 221a2 included in the first vibration generator 210 may substantially overlap or stack the second part (or an end portion) 230a of each of the plurality of second portions 221a2 included in the second vibration generator 230 without being staggered. For example, the first part (or an end portion) 210a of each of the plurality of second portions 221a2 included in the first vibration generator 210 and the second part (or an end portion) 230a of each of the plurality of second portions 221a2 included in the second vibration generator 230 may be aligned on or disposed at a second virtual extension line VL2. For example, the first part (or an end portion) 210a of each of the plurality of second portions 221a2 included in the first vibration generator 210 and the second part (or an end portion) 230a of each of the plurality of second portions 221a2 included in the second vibration generator 230 may be accurately aligned on or accurately disposed at the second virtual extension line VL2 without being staggered. Therefore, in the vibration apparatus 200 according to an embodiment of the present disclosure, the vibration layer 221a of the first vibration generator 210 and the vibration layer 221a of the second vibration generator 230 may be displaced in the same direction, and thus, the displacement amount or the amplitude displacement of the vibration apparatus 200 may be maximized or increased, thereby increasing (or maximizing) a displacement amount (or a bending force or a flexural force) or an amplitude displacement of the display panel 100.

In FIG. 10 and description relevant thereto, the vibration apparatus 200 according to another embodiment of the present disclosure has been described as including the first and second vibration generators 210 and 230, but embodiments of the present disclosure are not limited thereto. For example, the vibration apparatus 200 according to another embodiment of the present disclosure may include a plurality of (for example, three or more) vibration generators 210 and 230. In this case, in order to maximize or increase the displacement amount or the amplitude displacement of the vibration apparatus 200, the plurality of vibration generators 210 and 230 may have the same size and may overlap or stack with each other. According to an embodiment of the present disclosure, a first portion 221*a*1 of a vibration generator 210 disposed at an upper layer (or a top layer) among the three or more vibration generators 210 and 230 and a first portion 221*a*1 of a vibration generator 230 disposed at a lower layer (or a bottom layer) among the three or more vibration generators 210 and 230 may substantially overlap or stack with each other. For example, the first portion 221*a*1 of the vibration generator 210 disposed at the upper layer among the three or more vibration generators 210 and 230 and the first portion 221*a*1 of the vibration generator 230 disposed at the lower layer among the three or more vibration generators 210 and 230 may substantially overlap or stack without being staggered. For example, the first portion 221*a*1 of the vibration generator 210 disposed at the upper layer among the three or more vibration generators 210 and 230 and the first portion 221*a*1 of the vibration generator 230 disposed at the lower layer among the three or more vibration generators 210 and 230 may be aligned on or disposed at a virtual extension line VL. For example, the first portion 221*a*1 of the vibration generator 210 disposed at the upper layer among the three or more vibration generators 210 and 230 and the first portion 221*a*1 of the vibration generator 230 disposed at the lower layer among the three or more vibration generators 210 and 230 may be accurately aligned on or accurately disposed at the virtual extension line VL. For example, the first portion 221*a*1 of a vibration generator 210 disposed closer to a front surface of the display panel 100 overlaps the first portion 221*a*1 of another vibration generator 230 disposed less closer to the front surface of the display panel 100. Also, a second portion 221*a*2 of the vibration generator 210 disposed at the upper layer among the three or more vibration generators 210 and 230 and a second portion 221*a*2 of the vibration generator 230 disposed at the lower layer among the three or more vibration generators 210 and 230 may substantially overlap or stack with each other. For example, the second portion 221*a*2 of the vibration generator 210 disposed at the upper layer among the three or more vibration generators 210 and 230 and the second portion 221*a*2 of the vibration generator 230 disposed at the lower layer among the three or more vibration generators 210 and 230 may substantially overlap or stack without being staggered. For example, the second portion 221*a*2 of the vibration generator 210 disposed at the upper layer among the three or more vibration generators 210 and 230 and the second portion 221*a*2 of the vibration generator 230 disposed at the lower layer among the three or more vibration generators 210 and 230 may be aligned on or disposed at the virtual extension line VL. For example, the second portion 221*a*2 of the vibration generator 210 disposed at the upper layer among the three or more vibration generators 210 and 230 and the second portion 221*a*2 of the vibration generator 230 disposed at the lower layer among the three or more vibration generators 210 and 230 may be accurately aligned on or accurately disposed at the virtual extension line VL. For example, the second portion 221*a*2 of a vibration generator 210 disposed closer to the front surface of the display panel 100 overlaps the second portion 221*a*2 of the other vibration generator 230 disposed less closer to the front surface of the display panel 100.

Figure 12:
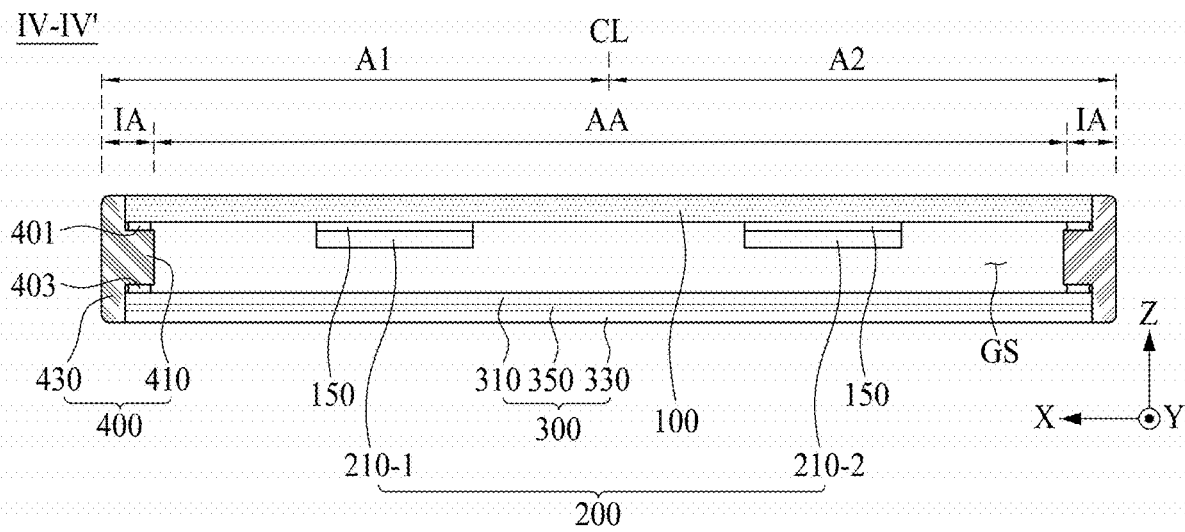
FIG. 12 is a cross-sectional view taken along line IV-IV' illustrated in FIG. 11.

FIG. 11 illustrates an apparatus according to another embodiment of the present disclosure. FIG. 12 is a cross-sectional view taken along line IV-IV' illustrated in FIG. 11.

With reference to FIGS. 11 and 12, in the apparatus according to another embodiment of the present disclosure, a rear surface (or a back surface) of a display panel 100 may include a first region (or a first rear area) A1 and a second region (or a second rear area) A2. For example, in the rear surface of the display panel 100, the first region A1 may be a left rear region, and the second region A2 may be a right rear region. The first and second regions A1 and A2 may be a left-right symmetrical with respect to a center line CL of the display panel 100 in a first direction X, but embodiments of the present disclosure are not limited thereto. For example, each of the first and second regions A1 and A2 may overlap the display area of the display panel 100.

The vibration apparatus 200 according to another embodiment of the present disclosure may include a first vibration apparatus 210-1 and a second vibration apparatus 210-2 disposed at the rear surface of the display panel 100.

The first vibration apparatus 210-1 may be disposed at the first region A1 of the display panel 100. For example, the first vibration apparatus 210-1 may be disposed close to a center or a periphery within the first region A1 of the display panel 100 with respect to the first direction X. The first vibration apparatus 210-1 according to an embodiment of the present disclosure may vibrate the first region A1 of the display panel 100, and thus, may generate a first vibration sound PVS1 or a first haptic feedback in the first region A1 of the display panel 100. For example, the first vibration apparatus 210-1 according to an embodiment of the present disclosure may directly vibrate the first region A1 of the display panel 100, and thus, may generate the first vibration sound PVS1 or the first haptic feedback in the first region A1 of the display panel 100. For example, the first vibration sound PVS1 may be a left sound. A size of the first vibration apparatus 210-1 according to an embodiment of the present disclosure may have a size corresponding to half or less of the first region A1 or half or more of the first region A1 based on a characteristic of the first vibration sound PVS1 or a sound characteristic needed for an apparatus. As another embodiment of the present disclosure, the size of the first vibration apparatus 210-1 may have a size corresponding to the first region A1 of the display panel 100. For example, the size of the first vibration apparatus 210-1 may have the same size as the first area A1 of the display panel 100 or may have a size smaller than the first area A1 of the display panel 100.

The second vibration apparatus 210-2 may be disposed at the second region A2 of the display panel 100. For example, the second vibration apparatus 210-2 may be disposed close to a center or a periphery within the second region A2 of the display panel 100 with respect to the first direction X. The second vibration apparatus 210-2 according to an embodiment of the present disclosure may vibrate the second region A2 of the display panel 100, and thus, may generate a second vibration sound PVS2 or a second haptic feedback in the second region A2 of the display panel 100. For example, the second vibration apparatus 210-2 according to an embodiment of the present disclosure may directly vibrate the second region A2 of the display panel 100, and thus, may generate the second vibration sound PVS2 or the second haptic feedback in the second region A2 of the display panel 100. For example, the second vibration sound PVS2 may be a right sound. A size of the second vibration apparatus 210-2 according to an embodiment of the present disclosure may have a size corresponding to half or less of the second region A2 or half or more of the second region A2 based on a characteristic of the second vibration sound PVS2 or a sound characteristic needed for an apparatus. As another embodiment of the present disclosure, the size of the second vibration apparatus 210-2 may have a size corresponding to the second region A2 of the display panel 100. For example, the size of the second vibration apparatus 210-2 may have the same size as the second area A2 of the display panel 100 or may have a size smaller than the second area A2 of the display panel 100. Therefore, the first vibration apparatus 210-1 and the second vibration apparatus 210-2 may have the same size or different sizes to each other based on a sound characteristic of left and right sounds and/or a sound characteristic of the apparatus. And, the first vibration apparatus 210-1 and the second vibration apparatus 210-2 may be disposed in a left-right symmetrical structure or a left-right asymmetrical structure with respect to the center line CL of the display panel 100.

Each of the first vibration apparatus 210-1 and the second vibration apparatus 210-2 may include one or more among the vibration apparatus 200 described above with reference to FIGS. 2 to 5, and thus, their repetitive descriptions may be omitted.

The connection member 150 according to an embodiment of the present disclosure may be disposed between each of the first vibration apparatus 210-1 and the second vibration apparatus 210-2 and the rear surface of the display panel 100. For example, each of the first vibration apparatus 210-1 and the second vibration apparatus 210-2 may be disposed at the rear surface of the display panel 100 by the connection member 150. The connection member 150 may be substantially the same as the connection member 150 described above with reference to FIG. 2, and thus, their repetitive descriptions may be omitted.

Accordingly, the apparatus according to another embodiment of the present disclosure may output, through the first vibration apparatus 210-1 and the second vibration apparatus 210-2, a left sound PVS1 and a right sound PVS2 to a forward region in front of the display panel 100 to provide a sound to a user.

Figure 13:
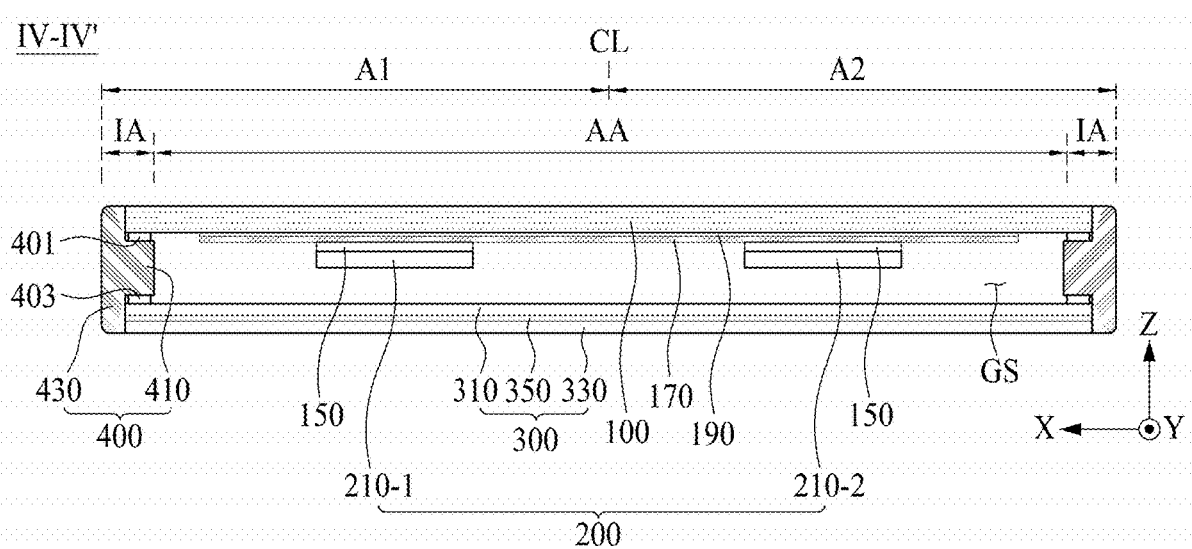
FIG. 13 is another cross-sectional view taken along line IV-IV' illustrated in FIG. 11.

FIG. 13 is another cross-sectional view taken along line IV-IV' illustrated in FIG. 11 and illustrates an embodiment where a plate is further configured in the apparatus illustrated in FIG. 12. Hereinafter, therefore, repetitive descriptions of elements other than the plate and elements relevant thereto are omitted or will be briefly given.

With reference to FIG. 13, the apparatus according to another embodiment of the present disclosure may include a display panel 100 and a vibration apparatus 200, and may further include a plate 170 which is disposed between the display panel 100 and the vibration apparatus 200.

Each of the display panel 100 and the vibration apparatus 200 may be substantially the same as each of the display panel 100 and the vibration apparatus 200 described above with reference to FIGS. 2 to 5, and thus, their repetitive descriptions may be omitted or will be briefly given.

The plate 170 may be disposed between each of the first vibration apparatus 210-1 and the second vibration apparatus 210-2 of the vibration apparatus 200 and the rear surface of the display panel 100.

The plate 170 may dissipate heat generated from the display panel 100 or may reinforce a mass of the vibration apparatus 200 which is disposed at or hung from the rear surface of the display panel 100. The plate 170 may have the same shape and size as the rear surface of the display panel 100, or may have the same shape and size as the vibration apparatus 200. As another embodiment of the present disclosure, the plate 170 may have a size different from the display panel 100. For example, the plate 170 may be smaller than the size of the display panel 100. As another embodiment of the present disclosure, the plate 170 may have a size different from the vibration apparatus 200. For example, the plate 170 may be greater or smaller than the size of the vibration apparatus 200. The vibration apparatus 200 may be the same as or smaller than the size of the display panel 100.

The plate 170 according to an embodiment of the present disclosure may include a metal material. For example, the plate 170 may include one or more materials of stainless steel, aluminum (Al), a magnesium (Mg), a Mg alloy, a magnesium-lithium (Mg—Li) alloy, and an Al alloy, but embodiments of the present disclosure are not limited thereto.

The plate 170 according to an embodiment of the present disclosure may include a plurality of opening portions. The plurality of opening portions may be configured to have a predetermined size and a predetermined interval. For example, the plurality of opening portions may be provided along a first direction X and a second direction Y so as to have a predetermined size and a predetermined interval. Due to the plurality of opening portions, a sound wave (or a sound pressure) based on a vibration of the vibration apparatus 200 may not be dispersed by the plate 170, and may concentrate on the display panel 100. Thus, the loss of a vibration caused by the plate 170 may be minimized, thereby increasing a sound pressure level characteristic of a sound generated based on a vibration of the display panel 100. For example, the plate 170 including the plurality of openings may have a mesh shape. For example, the plate 170 including the plurality of openings may be a mesh plate.

According to some embodiments of the present disclosure, the plate 170 may be connected or coupled to the rear surface of the display panel 100. For example, when the display panel 100 is a light emitting display panel, the plate 170 may be disposed at a rear surface of an encapsulation portion of the light emitting display panel. The plate 170 may be configured in a structure which is disposed at or bonded to the rear surface of the encapsulation portion. The plate 170 may dissipate heat occurring in the display panel 100. For example, the plate 170 may be referred to as a heat dissipation member, a heat dissipation plate, or a heat sink, but embodiments of the present disclosure are not limited thereto. For example, when the plate 170 is configured in a structure which is disposed at or bonded to the rear surface of the encapsulation portion, the first supporting member 310 may be omitted.

According to an embodiment of the present disclosure, the plate 170 may reinforce a mass of the vibration apparatus 200 which is disposed at or hung from the rear surface of the display panel 100. Thus, the plate 170 may decrease a resonance frequency of the vibration apparatus 200 based on an increase in mass of the vibration apparatus 200. Therefore, the plate 170 may increase a sound characteristic and a sound pressure level characteristic of the low-pitched sound band generated based on a vibration of the vibration apparatus 200 and may enhance the flatness of a sound pressure level characteristic. For example, the flatness of a sound pressure level characteristic may be a magnitude of a deviation between a highest sound pressure level and a lowest sound pressure level. For example, the plate 170 may be referred to as a weight member, a mass member, a sound planarization member, or the like, but embodiments of the present disclosure are not limited thereto.

According to an embodiment of the present disclosure, a displacement amount (or a bending force or a flexural force) or an amplitude displacement (or a vibration width) of the display panel 100 with the plate 170 disposed therein may decrease as a thickness of the plate 170 increases, based on the stiffness of the plate 170. Accordingly, a sound pressure level characteristic and a low-pitched sound band characteristic of a sound generated based on a displacement (or a vibration) of the display panel 100.

The plate 170 according to an embodiment of the present disclosure may be coupled or connected to a rear surface of the display panel 100 by a plate connection member (or a fourth connection member) 190.

The plate connection member 190 according to an embodiment of the present disclosure may include a material including an adhesive layer which is good in adhesive force or attaching force with respect to the rear surface of the display panel 100 and the vibration apparatus 200, respectively. For example, the plate connection member 190 may include a foam pad, a double-sided tape, or an adhesive, but embodiments of the present disclosure are not limited thereto. For example, the adhesive layer of the plate connection member 190 may include epoxy, acrylic, silicone, or urethane, but embodiments of the present disclosure are not limited thereto. For example, the adhesive layer of the plate connection member 190 may be the same as the adhesive layer of the connection member 150, but embodiments of the present disclosure are not limited thereto. For example, the adhesive layer of the plate connection member 190 may include an acrylic-based material which is relatively better in adhesive force and hardness among acrylic and urethane so that the vibration of the vibrating apparatus 200 may be transmitted to the display panel 100 well. As another embodiment of the present disclosure, the adhesive layer of the plate connection member 190 may differ from the adhesive layer of the connection member 150.

The vibration apparatus 200 may be connected or coupled to a rear surface of the plate 170 by the connection member 150 described above, and thus, may be supported by or hung at the rear surface of the plate 170. Each of the first vibration apparatus 210-1 and the second vibration apparatus 210-2 of the vibration apparatus 200 may be connected or coupled to a rear surface of the plate 170 by using the connection member 150 described above, and thus, may be supported by or hung at the rear surface of the plate 170.

The plate 170 according to an embodiment of the present disclosure may be integrated into the vibration apparatus 200, or may be provided as an element of the vibration apparatus 200. For example, the plate 170 and the vibration apparatus 200 may be configured as one structure or one component (or module), which is provided as one body. Accordingly, when the plate 170 is disposed between the rear surface of the display panel 100 and the vibration apparatus 200, an assembly process between the display panel 100 and the vibration apparatus 200 may be easily performed based on component integration (or modulization) between the plate 170 and the vibration apparatus 200.

As another embodiment of the present disclosure, in a case where the plate 170 and the vibration apparatus 200 are configured as one structure or one component (or module) which is provided as one body, a non-display panel may be configured as a vibration plate. The plate 170 and the vibration apparatus 200 may be disposed at the non-display panel. The plate 170 and the vibration apparatus 200 may be connected or coupled to the non-display panel by a connection member. For example, the non-display panel may be wood, plastic, glass, cloth, a vehicle interior material, a building indoor ceiling, an aircraft interior material, or the like, but embodiments of the present disclosure are not limited thereto. Therefore, a sound may be output by vibrating the non-display panel. As another embodiment of the present disclosure, in a case where the plate 170 and the vibration apparatus 200 are configured as one structure or one component (or module) which is provided as one body, the plate 170 may be configured as a vibration plate. For example, the plate 170 may include one or more materials of stainless steel, aluminum (Al), a magnesium (Mg), a Mg alloy, a magnesium-lithium (Mg—Li) alloy, and an Al alloy, but embodiments of the present disclosure are not limited thereto. For example, in a module (or structure) of the plate 170 and the vibration apparatus 200, the plate 170 may include a single nonmetal material or a composite nonmetal material of one or more among wood, plastic, glass, cloth, and leather, but embodiments of the present disclosure are not limited thereto.

Accordingly, the apparatus according to another embodiment of the present disclosure may output, through the first vibration apparatus 210-1 and the second vibration apparatus 210-2, a left sound PVS1 and a right sound PVS2 to a forward region in front of the display panel 100 to provide a sound to a user. Moreover, in the apparatus, a resonance frequency of the vibration apparatus 200 may decrease by the plate 170, and the heat generated from the display panel 100 may dissipate through the plate 170.

Figure 14:
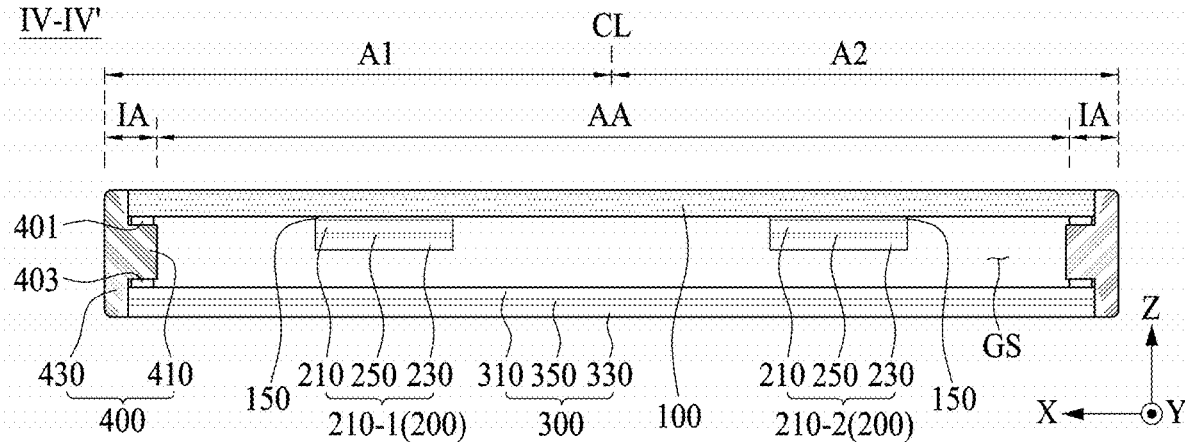
FIG. 14 is another cross-sectional view taken along line IV-IV' illustrated in FIG. 11.
Figure 15:
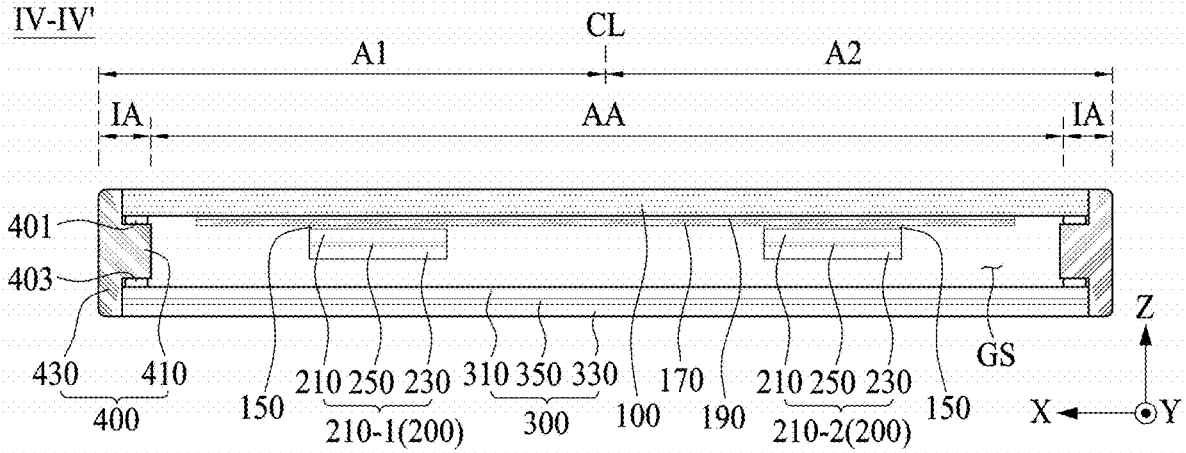
FIG. 15 is another cross-sectional view taken along line IV-IV' illustrated in FIG. 11.

FIG. 14 is another cross-sectional view taken along line IV-IV; illustrated in FIG. 11. FIG. 15 is another cross-sectional view taken along line IV-IV' illustrated in FIG. 11. FIG. 15 illustrates an embodiment where a plate is further configured in the apparatus illustrated in FIG. 14.

With reference to FIGS. 14 and 15, the vibration apparatus 200 according to another embodiment of the present disclosure may include a first vibration apparatus 210-1 and a second vibration apparatus 210-2 disposed at the rear surface of the display panel 100. Each of the first vibration apparatus 210-1 and the second vibration apparatus 210-2 may include one or more among the vibration apparatus 200 described above with reference to FIGS. 6 to 10. Each of the display panel 100 and the vibration apparatus 200 may be substantially the same as each of the display panel 100 and the vibration apparatus 200 described above with reference to FIGS. 6 to 10, and thus, their repetitive descriptions may be omitted or will be briefly given. A description of a plate 170 may be substantially the same as descriptions given above with reference to FIG. 13, and thus, its description is omitted or will be briefly given.

The vibration apparatus 200 according to an embodiment of the present disclosure may include a plurality of vibration generators 210 and 230 which have the first size and overlap or stack with each other, thereby minimizing a reduction in the displacement amount of the display panel 100 caused by the thickness of the plate 170. Also, the vibration apparatus 200 according to an embodiment of the present disclosure may include the plurality of vibration generators 210 and 230 which have the first size and overlap, and thus, the displacement amount of the display panel 100 may be increased or maximized, thereby increasing or enhancing a sound pressure level characteristic and a low-pitched sound band characteristic of a sound generated based on the displacement of the display panel 100. Accordingly, in the apparatus according to another embodiment of the present disclosure, the vibration apparatus 200 may increase or maximize the displacement amount of the display panel 100 with the plate 170 disposed therein, based on a stack structure of the vibration generators 210 and 230 which overlap or stack with each other. The plate 170 may have a thickness which enables heat of the display panel 100 to be smoothly dissipated.

The plate 170 according to an embodiment of the present disclosure may be connected or coupled to a front surface of the vibration apparatus 200 by the connection member 150 described above. For example, the plate 170 may be connected or coupled to an uppermost vibration generator of the plurality of vibration generators 210 and 230 of the vibration apparatus 200 by the connection member 150. For example, when the vibration apparatus 200 include first and second vibration generators 210 and 230, the plate 170 may be connected or coupled to a first surface of the second vibration generator 230 or a second surface of the first vibration generator 210 by the connection member 150.

Accordingly, in the apparatus according to another embodiment of the present disclosure, as described above with reference to FIGS. 6 to 10, a sound pressure level characteristic and a low-pitched sound band characteristic of a sound generated based on the displacement of the display panel 100 may be increased or enhanced based on a stack structure of the vibration generators 210 and 230. Also, in the apparatus according to another embodiment of the present disclosure, a resonance frequency of the vibration apparatus 200 may be reduced by the plate 170, and heat of the display panel 100 may be dissipated through the plate 170.

Figure 16:
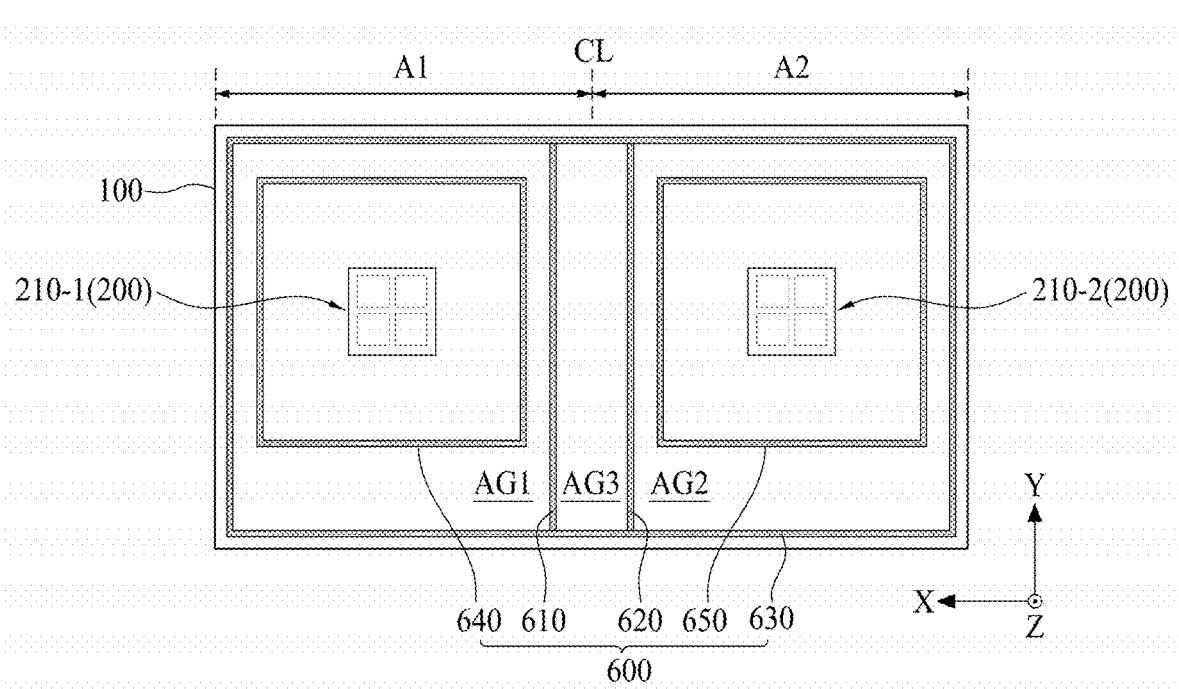
FIG. 16 illustrates an apparatus according to another embodiment of the present disclosure.

FIG. 16 illustrates an apparatus according to another embodiment of the present disclosure and illustrates an embodiment where a partition is further configured in the apparatus illustrated in FIGS. 11 to 13. Hereinafter, therefore, repetitive descriptions of elements other than the partition and elements relevant thereto are omitted or will be briefly given.

With reference to FIGS. 11 to 13, and 16, the apparatus according to another embodiment of the present disclosure may further include a partition 600 for dividing the first and second regions A1 and A2 of the display panel 100.

The partition 600 may be an air gap or a space, where sounds PVS1 and PVS2 are generated when the display panel 100 is vibrated by the first and second vibration apparatuses 210-1 and 210-2. For example, a partition 600 may separate the sounds PVS1 and PVS2 or a channel and may prevent or decrease the reduction of a sound characteristic caused by interference of the sounds PVS1 and PVS2. The partition 600 may be referred to as a sound blocking member, a sound separation member, a space separation member, an enclosure, or a baffle, or the like, but embodiments of the present disclosure are not limited thereto.

The partition 600 according to an embodiment of the present disclosure may include a first partition member 610 and a second partition member 620 disposed between the first vibration apparatus 210-1 and the second vibration apparatus 210-2.

The first partition member 610 and the second partition member 620 may be disposed between the display panel 100 and a supporting member 300. For example, the first partition member 610 and the second partition member 620 may be disposed between the display panel 100 and a supporting member 300 corresponding to a center region of the display panel 100. The first partition member 610 and the second partition member 620 may separate a first vibration sound PVS1 generated by the first vibration apparatus 210-1 and a second vibration sound PVS2 generated by the second vibration apparatus 210-2. For example, the first partition member 610 and the second partition member 620 may block the transfer of a vibration, generated by the first vibration apparatus 210-1 in the first region A1 of the display panel 100, to the second region A2 of the display panel 100, or may block the transfer of a vibration, generated by the second vibration apparatus 210-2 in the second region A2 of the display panel 100, to the first region A1 of the display panel 100. Therefore, the first partition member 610 and the second partition member 620 may attenuate or absorb a vibration of the display panel 100 at a center of the display panel 100, and thus, the first and second partition members 610 and 620 may block the transfer of a sound of the first region A1 to the second region A2, or may block the transfer of a sound of the second region A2 to the first region A1. Accordingly, the first partition member 610 and the second partition member 620 may separate a left sound and a right sound to further enhance a sound output characteristic of the apparatus. Thus, the apparatus according to an embodiment of the present disclosure may output a sound having a two-channel type to a forward region in front of the display panel 100 by separating the left and right sounds according to the first partition member 610 and the second partition member 620.

For example, the partition 600 may include a material having elasticity which enables a certain degree of compression. For example, the partition 600 may be configured as polyurethane, polyolefin, or the like, but embodiments of the present disclosure are not limited thereto. As another embodiment of the present disclosure, the partition 600 may be configured as a single-sided tape, a single-sided foam pad, a double-sided tape, a double-sided foam tape, or the like, but embodiments of the present disclosure are not limited thereto.

For example, any one of the first partition member 610 and the second partition member 620 may be omitted. For example, even when any one of the first partition member 610 and the second partition member 620 is between the first vibration apparatus 210-1 and the second vibration apparatus 210-2, a left sound and a right sound may be separated from each other. For example, when the second partition member 620 of the first partition member 610 and the second partition member 620 is omitted, the first partition member 610 may be disposed between the display panel 100 and the supporting member 300 to correspond to a rear center line CL of the display panel 100.

Therefore, the first partition member 610 or the second partition member 620 may separate a left sound and a right sound to further enhance a sound output characteristic of the apparatus. An apparatus including the first partition member 610 or the second partition member 620 may separate the left and right sounds by the first partition member 610 or the second partition member 620 to output a sound having a two-channel type to the forward region in front of the display panel 100.

The partition 600 according to an embodiment of the present disclosure may further include a third partition member 630 between the display panel 100 and the supporting member 300.

The third partition member 630 may be disposed to surround the entire first and second vibration apparatuses 210-1 and 210-2. The third partition member 630 may be disposed between a rear periphery of the display panel 100 and a front periphery of the supporting member 300. The third partition member 630 may be referred to as an edge partition, a sound blocking member, an edge enclosure, an edge baffle, or the like, but embodiments of the present disclosure are not limited thereto. For example, the third partition member 630 may be adjacent to or in contact with the first frame connection member 401 illustrated in FIG. 11, and may be surrounded by the first frame connection member 401. As another embodiment of the present disclosure, the third partition member 630 may be integrated as one body with the first frame connection member 401.

The third partition member 630 may provide first to third air gaps AG1 to AG3 between the display panel 100 and the supporting member 300 together with the first and second partition members 610 and 620. For example, each of the first to third air gaps AG1 to AG3 may be referred to as a vibration space, a sound pressure space, a sound box, a sound part, a resonance box, or a resonance part, but embodiments of the present disclosure are not limited thereto.

The first air gap AG1 may be provided in the first region A1 of the display panel 100. For example, the first air gap AG1 may be provided in the first region A1 of the display panel 100 which is surrounded by the first partition member 610 and the third partition member 630 disposed at the first region A1 of the display panel 100.

The second air gap AG2 may be provided in the second region A2 of the display panel 100. For example, the second air gap AG2 may be provided in the second region A2 of the display panel 100 which is surrounded by the second partition member 620 and the third partition member 630 disposed at the second region A2 of the display panel 100.

The third air gap AG3 may be provided in a rear center region of the display panel 100. For example, the third air gap AG3 may be provided in a rear center region of the display panel 100 surrounded by the first and second partition members 610 and 620 and the third partition member 630. For example, the third air gap AG3 may be provided between the second air gap AG2 and the first air gap AG1, including the rear center line CL of the display panel 100. The third air gap AG3 may be referred to as a sound separation space, a sound blocking space, a sound interference prevention space, or the like, but embodiments of the present disclosure are not limited thereto. The third air gap AG3 may separate the first air gap AG1 from the second air gap AG2, and thus, the third air gap AG3 may reduce or prevent a resonance phenomenon or an interference phenomenon in a certain frequency band generated in each of the first air gap AG1 and the second air gap AG2.

The first vibration apparatus 210-1 may be surrounded by the first partition member 610 and the third partition member 630 providing the first air gap AG1. The second vibration apparatus 210-2 may be surrounded by the second partition member 620 and the third partition member 630 providing the second air gap AG2.

When one of the first and second partition members 610 and 620 is omitted, the third air gap AG3 may be omitted.

Therefore, the third partition member 630 may surround an area between the display panel 100 and the supporting member 300, and may individually surround each of the first and second vibration apparatuses 210-1 and 210-2, together with the first and second partition members 610 and 620, to secure a vibration space of each of the first and second vibration apparatuses 210-1 and 210-2. Thus, the third partition member 630 may enhance a sound pressure lever characteristic of left and right sounds. Further, the third partition member 630 may prevent sound or a sound pressure lever from being leaked to the outside through the side surface between the display panel 100 and the supporting member 300, thereby further enhancing a sound output characteristic of the apparatus.

The partition 600 according to an embodiment of the present disclosure may further include a fourth partition member 640 and a fifth partition member 650. The fourth partition member (or a first enclosure) 640 may surround the first vibration apparatus 210-1. The fifth partition member (or a second enclosure) 650 may surround the second vibration apparatus 210-2.

The fourth partition member 640 may be disposed between the display panel 100 and the supporting member 300 to correspond to the first air gap AG1. For example, the fourth partition member 640 may individually (or independently) surround the first vibration apparatus 210-1. The fourth partition member 640 according to an embodiment of the present disclosure may have a rectangular shape surrounding the first vibration apparatus 210-1, but embodiments of the present disclosure are not limited thereto. For example, the fourth partition member 640 may have a shape that is the same as or different from a whole shape of the first vibration apparatus 210-1. For example, when the first vibration apparatus 210-1 has a square shape, the fourth partition member 640 may have a square shape, a circular shape or an oval shape having a size relatively larger than the first vibration apparatus 210-1.

The fourth partition member 640 may limit (or define) a vibration region (or a vibration area) of the display panel 100 based on the first vibration apparatus 210-1. For example, in the first region A1 of the display panel 100, as a size of the fourth partition member 640 increases, a vibration region of the first region A1 may increase. Thus, a low-pitched sound band characteristic of a left sound may be enhanced. As another embodiment of the present disclosure, in the first region A1 of the display panel 100, as a size of the fourth partition member 640 decreases, the vibration region of the first region A1 may decrease. Thus, a high-pitched sound band characteristic of the left sound may be enhanced. Accordingly, a size of the fourth partition member 640 may be adjusted based on a desired characteristic of a sound band, based on a vibration of the display panel 100 due to the vibration of the first vibration apparatus 210-1.

The fifth partition member 650 may be disposed between the display panel 100 and the supporting member 300 to correspond to the second air gap AG2. The fifth partition member 650 may individually (or independently) surround the second vibration apparatus 210-2. For a left sound to be symmetrical with a right sound, the fifth partition member 650 according to an embodiment of the present disclosure may have the same shape as the fourth partition member 640 and may have a symmetrical structure with the fourth partition member 640 with respect to the rear center line CL of the display panel 100.

The fifth partition member 650 may limit (or define) a vibration region (or a vibration area) of the display panel 100 based on the second vibration apparatus 210-2. For example, in the second region A2 of the display panel 100, as a size of the fifth partition member 650 increases, a vibration region of the second region A2 may increase. Thus, the low-pitched sound band characteristic of the left sound may be enhanced. As another embodiment of the present disclosure, in the second region A2 of the display panel 100, as a size of the fifth partition member 650 decreases, the vibration region of the second region A2 may decrease. Thus, the high-pitched sound band characteristic of the left sound may be enhanced. Accordingly, a size of the fifth partition member 650 may be adjusted based on a desired characteristic of a sound band, based on a vibration of the display panel 100 due to the vibration of the first vibration apparatus 210-2.

The fourth and fifth partition members 640 and 650 may limit a vibration region (or a vibration area) of each of the first and second vibration apparatuses 210-1 and 210-2. Thus, the fourth and fifth partition members 640 and 650 may enhance lateral symmetricity of a left sound and a right sound each generated based on a vibration of the display panel 100, and may optimize a sound pressure level characteristic and a sound reproduction band of each of the left and right sounds. For example, when the fourth and fifth partition members 640 and 650 are provided, the third partition member 630 may be omitted. As another embodiment of the present disclosure, when the fourth and fifth partition members 640 and 650 are provided, one or more of the first to third partition members 610 to 630 may be omitted.

Therefore, the apparatus according to another embodiment of the present disclosure includes the partition 600, and thus, the sound pressure level characteristic and the sound reproduction band of each of the left and right sounds may be optimized. For example, the apparatus according to another embodiment of the present disclosure may include at least one or more among the first and second partition members 610 and 620, but embodiments of the present disclosure are not limited thereto. For example, the apparatus according to another embodiment of the present disclosure may include the third partition member 630 and at least one or more among the first and second partition members 610 and 620. For example, the apparatus according to another embodiment of the present disclosure may include the third partition member 630, the fourth partition member 640 and the fifth partition member 650. For example, the apparatus according to another embodiment of the present disclosure may include the entire first to fifth partition members 610 to 650.

Accordingly, the apparatus according to another embodiment of the present disclosure may output, through the first vibration apparatus 210-1 and the second vibration apparatus 210-2, a left sound PVS1 and a right sound PVS2 to a forward region in front of the display panel 100 to provide a sound to a user. The apparatus according to another embodiment of the present disclosure may output a sound having a two-channel type to the forward region in front of the display panel 100 by separating the left and right sounds PVS1 and PVS2 according to the partition 600. Moreover, in the apparatus according to another embodiment of the present disclosure, the flatness of a sound pressure level characteristic may be improved due to decrease of a resonance frequency caused by a plate implemented in each of the first and second vibration apparatuses 210-1 and 210-2.

Figure 17:
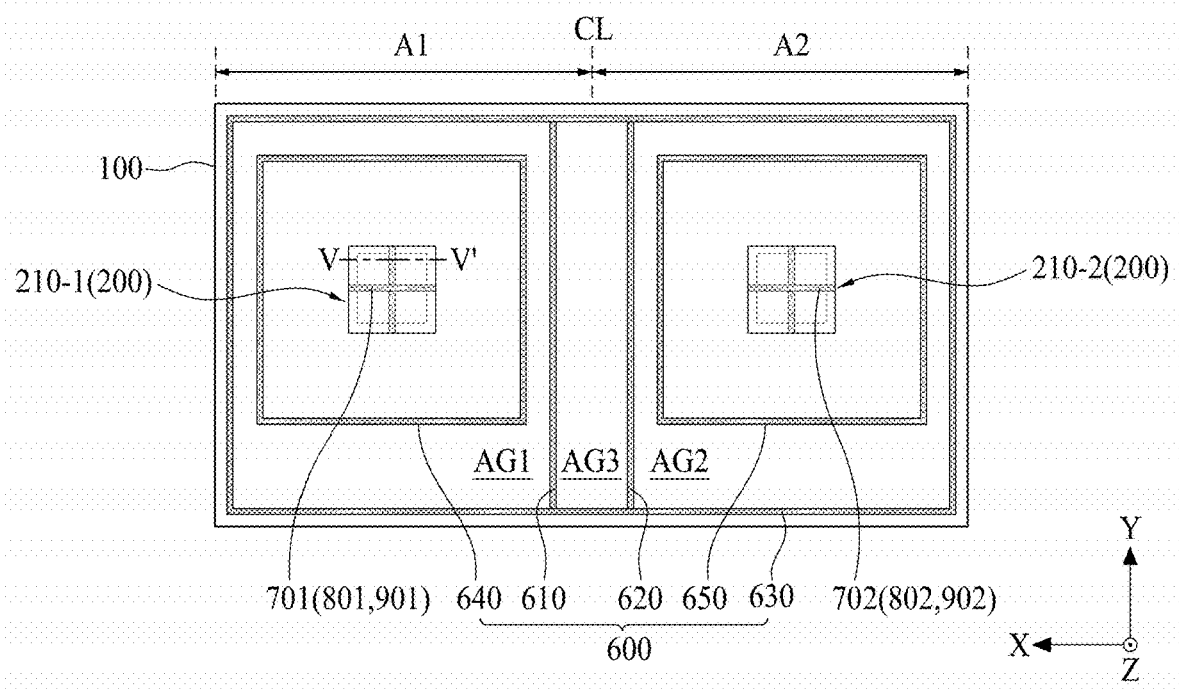
FIG. 17 illustrates an apparatus according to another embodiment of the present disclosure.
Figure 18:
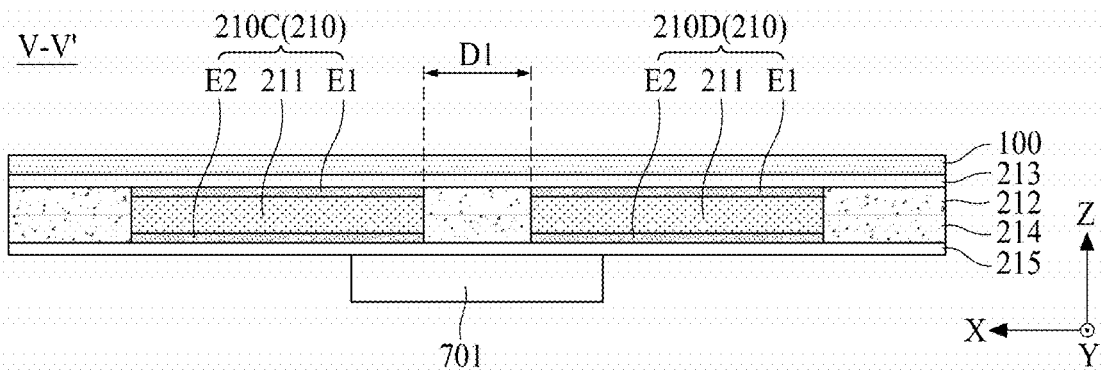
FIG. 18 is a cross-sectional view taken along line V-V' illustrated in FIG. 17.

FIG. 17 illustrates an apparatus according to another embodiment of the present disclosure. FIG. 18 is a cross-sectional view taken along line V-V' illustrated in FIG. 17. FIG. 17 illustrates an embodiment implemented by modifying a pad member in the apparatus illustrated in FIG. 16. Therefore, in the following description, repeated descriptions of elements other than a pad member and elements relevant thereto are omitted or will be briefly given.

With reference to FIGS. 17 and 18, a vibration apparatus according to another embodiment of the present disclosure may include a first vibration apparatus 210-1 and a second vibration apparatus 210-2. In a case where the first vibration apparatus 210-1 and the second vibration apparatus 210-2 include a plurality of vibration structures, a sound pressure level may be reduced in a specific frequency. For example, a sound pressure level may be reduced in a middle-pitched sound band. Resonance or inverse resonance may occur in a boundary between a plurality of vibration structures, and thus, a sound pressure level may be reduced. For example, resonance or inverse resonance may occur in a center portion between a plurality of vibration structures, and thus, a sound pressure level may be reduced. Therefore, in order to decrease a reduction in a sound pressure level caused by resonance or inverse resonance, an interval between the plurality of vibration structures may decrease. However, due to difficulty in a process of placing the plurality of vibration structures, it may be difficult to reduce an interval between the plurality of vibration structures. In order to decrease a reduction in a sound pressure level, a pad member may be disposed at the boundary between the plurality of vibration structures.

The vibration apparatus 200 according to another embodiment of the present disclosure may include a pad member disposed at the boundary between the plurality of vibration structures in order to improve the deterioration or dip phenomenon of sound quality occurring in a boundary region between the plurality of vibration structures. For example, the pad member may prevent or reduce a resonance frequency in a boundary portion between the plurality of vibration structures. The pad member may be configured to decrease a reduction in a sound pressure level occurring in the boundary between the plurality of vibration structures.

With reference to FIGS. 17 and 18, a first pad member 701 may be disposed between a plurality of vibration structures in the first vibration apparatus 210-1. For example, a region between the plurality of vibration structures in the first vibration apparatus 210-1 may overlap the first pad member 701. A second pad member 702 may be disposed between a plurality of vibration structures in the second vibration apparatus 210-2. For example, a region between the plurality of vibration structures in the second vibration apparatus 210-2 may overlap the second pad member 702. The first pad member 701 and the second pad member 702 may be a resonance control pad, an external resonance pad, a gap pad, or a resonance controller, but embodiments of the present disclosure are not limited thereto.

The first pad member 701 may be disposed between the first vibration apparatus 210-1 and the supporting member 300. For example, the first pad member 701 may have a "+"-shape which overlaps a region between the plurality of vibration structures of the first vibration apparatus 210-1. The second pad member 702 may be disposed between the second vibration apparatus 210-2 and the supporting member 300. For example, the second pad member 702 may have a "+"-shape which overlaps a region between the plurality of vibration structures of the second vibration apparatus 210-2.

With reference to FIG. 18, the first pad member 701 may be disposed between a third vibration structure 210C and a fourth vibration structure 210D of the first vibration apparatus 210-1. For example, the first pad member 701 may be disposed between the first vibration apparatus 210-1 and the supporting member 300. For example, the first pad member 701 may be disposed between a rear surface of the first vibration apparatus 210-1 and an upper surface of the supporting member 300. A size of each of the first pad member 701 and the second pad member 702 may be configured to be equal to or different from a region between a plurality of vibration structures. For example, a width of each of the first pad member 701 and the second pad member 702 may be the same as or different from each of the third vibration structure 210C and the fourth vibration structure 210D with respect to a first direction (an X direction).

For example, each of the plurality of vibration structures may include a vibration portion 211, a first electrode layer E1 disposed at a first surface of the vibration portion 211, and a second electrode layer E2 disposed at a second surface different from the first surface of the vibration portion 211. Each of the plurality of vibration structures may further include a first protection member 213 over a first surface of the first electrode layer E1 and a second protection member 215 over a second surface different from the first surface of the first electrode layer E1.

For example, each of the plurality of vibration structures may include the vibration portion 211, the first protection member 213 over the first surface of the vibration portion 211, and the second protection member 215 over the second surface different from the first surface of the vibration portion 211. Each of the plurality of vibration structures may further include the first electrode layer E1 between the vibration layer 211 and the first protection member 213 and the second electrode layer E2 between the vibration layer 211 and the second protection member 215. For example, the first protection member 213 and the second protection member 215 of the vibration apparatus may cover the plurality of vibration structures in common. For example, the first protection member 213 and the second protection member 215 of the vibration apparatus may to be disposed to surround the plurality of vibration structures.

In each of the third vibration structure 210C and the fourth vibration structure 210D of the first vibration apparatus 210-1, the first electrode layer E1 may be disposed closer to the display panel 100 than the second electrode layer E2. For example, the first electrode layer E1 may be a negative (−) electrode, and the second electrode layer E2 may be a positive (+) electrode. However, embodiments of the present disclosure are not limited thereto, and the first electrode layer E1 may be a positive (+) electrode and the second electrode layer E2 may be a negative (−) electrode.

The first pad member 701 and the second pad member 702 may be configured as a material which absorbs or adjusts a vibration. For example, the first pad member 701 and second pad member 702 may be configured as a material which differs from the partition 600, but embodiments of the present disclosure are not limited thereto. For example, the first pad member 701 and the second pad member 702 may be configured as one of a silicone-based polymer, paraffin wax, and an acrylic polymer, but embodiments of the present disclosure are not limited thereto. For example, each of the first pad member 701 and the second pad member 702 may include a urethane-based material which relatively has a ductile characteristic compared to acrylic among acrylic and urethane, so as to minimize the transfer of a vibration of the vibration apparatus 210 to the supporting member 300.

The first pad member 701 may decrease heat caused by a vibration of the first vibration apparatus 210-1. The second pad member 702 may decrease heat caused by a vibration of the second vibration apparatus 210-2. Therefore, because a pad member is provided between a plurality of vibration structures, a reduction in a sound pressure level in a specific frequency occurring between the plurality of vibration structures may decrease, and a heat dissipation effect of reducing heat caused by vibrations of the plurality of vibration structures may be enhanced. As another embodiment of the present disclosure, a heat dissipation member may be further provided between the display panel 100 and the vibration apparatus 200. For example, the heat dissipation member may be disposed at the rear surface of the display panel 100.

Figure 19:
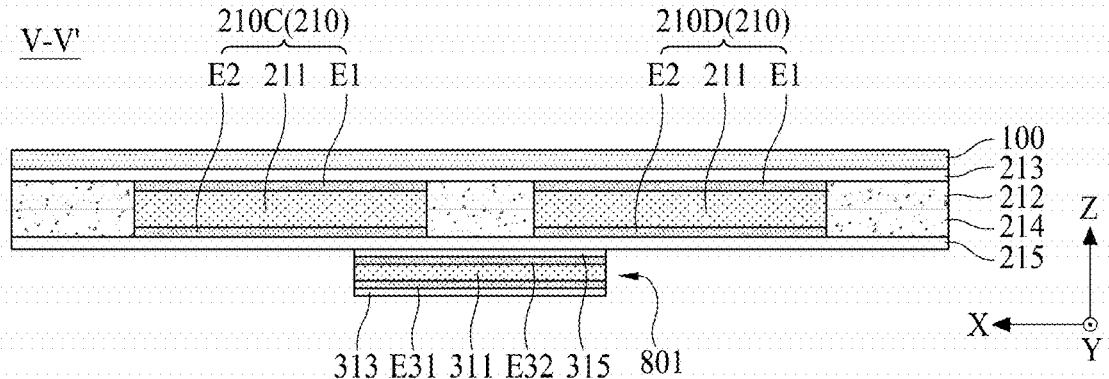
FIG. 19 is another cross-sectional view taken along line V-V' illustrated in FIG. 17.

FIG. 19 is another cross-sectional view taken along line V-V' illustrated in FIG. 17.

With reference to FIGS. 17 and 19, a first pad member 801 may be disposed between the plurality of vibration structures of the first vibration apparatus 210-1. For example, a region between the plurality of vibration structures in the first vibration apparatus 210-1 may overlap the first pad member 801. A second pad member may be disposed between the plurality of vibration structures of the second vibration apparatus 210-2. For example, a region between the plurality of vibration structures in the second vibration apparatus 210-2 may overlap the second pad member. The first pad member 801 and the second pad member may be a resonance control element, an external resonance element, a resonance control pad, an external resonance pad, a gap pad, or a resonance controller, but embodiments of the present disclosure are not limited thereto.

With reference to FIG. 19, the first pad member 801 may be disposed between the third vibration structure 210C and the fourth vibration structure 210D of the first vibration apparatus 210-1. For example, the first pad member 801 may be disposed between the vibration generator 210 and the supporting member 300. For example, the first pad member 801 may be disposed between the rear surface of the first vibration apparatus 210-1 and an upper surface of the supporting member 300.

A size of each of the first pad member 801 and the second pad member may be configured to be equal to or different from a region between a plurality of vibration structures. For example, a width of each of the first pad member 801 and the second pad member may be the same as or different from each of the third vibration structure 210C and the fourth vibration structure 210D with respect to the first direction (or a X direction).

For example, each of the plurality of vibration structures may include a vibration portion 211, a first electrode layer E1 disposed at the first surface of the vibration layer 211, and a second electrode layer E2 disposed at the second surface different from the first surface of the vibration portion 211. For example, like the vibration portion 211 described above with reference to FIG. 3 or the vibration layer 221a described above with reference to FIGS. 5A to 5F, the vibration portion 211 may include a first portion 211a and a second portion 211b. For example, as illustrated in FIGS. 5A to 5F or FIG. 10, the second portion 211b or 221a2 may be disposed more outward than the first portion 211a or 221a1, but embodiments of the present disclosure are not limited thereto. Each of the plurality of vibration structures may further include a first protection member 213 on the first surface of the first electrode layer E1 and a second protection member 215 on the second surface different from the first surface of the first electrode layer E1.

For example, each of the plurality of vibration structures may include the vibration portion 211, the first protection member 213 over the first surface of the vibration layer 211, and the second protection member 215 over the second surface different from the first surface of the vibration portion 211. Each of the plurality of vibration structures may further include the first electrode layer E1 between the vibration layer 211 and the first protection member 213 and the second electrode layer E2 between the vibration layer 211 and the second protection member 215. For example, the first protection member 213 and the second protection member 215 of the vibration apparatus may cover the plurality of vibration structures in common. For example, the first protection member 213 and the second protection member 215 of the vibration apparatus may to be disposed to surround the plurality of vibration structures.

One or more of the first pad member 801 and the second pad member may be configured to be equal to the first vibration apparatus 210-1. For example, in a case where one or more of the first pad member 801 and the second pad member are configured to be equal to the first vibration apparatus 210-1, a level of a signal applied to the first pad member 801 and the second pad member may be adjusted, and thus, a resonance of the vibration apparatus may be easily adjusted.

For example, the first pad member 801 may include a vibration layer 311, a first electrode layer E31, and a second electrode layer E32. For example, the first pad member 801 may include the vibration layer 311, the first electrode layer E31 disposed at a first surface of the vibration layer 311, and the second electrode layer E32 disposed at a second surface different from the first surface of the vibration layer 311. For example, like the vibration portion 211 described above with reference to FIG. 3 or the vibration portion 211 described above with reference to FIGS. 5A to 5F, the vibration layer 311 may include a first portion 211a and a second portion 211b. The first protection member 313 may be disposed under the first electrode layer E31. For example, the first protection member 313 may protect the first electrode layer E31. The second protection member 315 may be disposed over the second electrode layer E32. For example, the second protection member 315 may protect the second electrode layer E32. The first protection member 313 and the second protection member 315 may be substantially the same as the first protection member 213 or 1213 and the second protection member 215 or 1215 described above with reference to FIGS. 3, 4, and 7 to 9, and thus, their descriptions are omitted.

For example, the first electrode layer E1 of each of the third vibration structure 210C and the fourth vibration structure 210D of the first vibration apparatus 210-1 may be disposed closer to the display panel 100 than the second electrode layer E2. For example, the first electrode layer E1 may be a negative (−) electrode, and the second electrode layer E2 may be a positive (+) electrode. However, embodiments of the present disclosure are not limited thereto, and the first electrode layer E1 may be a positive (+) electrode and the second electrode layer E2 may be a negative (−) electrode. The second electrode layer E32 of the first pad member 801 may be disposed closer to the display panel 100 than the first electrode layer E31. For example, the first electrode layer E31 may be a negative (−) electrode, and the second electrode layer E32 may be a positive (+) electrode. However, embodiments of the present disclosure are not limited thereto, and the first electrode layer E31 may be a positive (+) electrode and the second electrode layer E32 may be a negative (−) electrode. Polarities of the first electrode layer E1 and the second electrode layer E2 of the first vibration apparatus 210-1 may be configured to be opposite to those of the first electrode layer E31 and the second electrode layer E32 of the first pad member 801. For example, with respect to the display panel 100, a polarity of the first electrode layer E1 of each of the plurality of vibration structures may differ from the second electrode layer E32 of the pad member. For example, with respect to the display panel 100, the first electrode layer E1 and the second electrode layer E2 of the first vibration apparatus 210-1 may be configured as a negative (−) electrode and a positive (+) electrode, and the second electrode layer E32 and the first electrode layer E31 of the first pad member 801 may be configured as a positive (+) electrode and a negative (−) electrode. As another embodiment of the present disclosure, with respect to the display panel 100, the first electrode layer E1 and the second electrode layer E2 of the first vibration apparatus 210-1 may be configured as a positive (+) electrode and a negative (−) electrode, and the second electrode layer E32 and the first electrode layer E31 of the first pad member 801 may be configured as a negative (−) electrode and a positive (+) electrode. Therefore, because the electrode layer of the first pad member 801 is disposed as an electrode layer having a polarity opposite to a polarity of the first vibration apparatus 210-1, a dip phenomenon caused by resonance between a plurality of vibration structures and may be offset based on inverse resonance caused by the first pad member 801. Accordingly, because a pad member is provided between a plurality of vibration structures, a reduction in a sound pressure level occurring in the boundary between the plurality of vibration structures may decrease.

Figure 20:
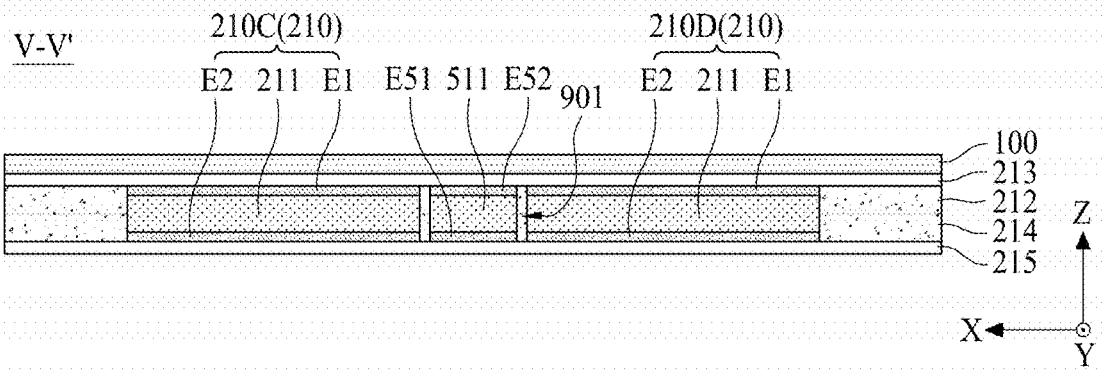
FIG. 20 is another cross-sectional view taken along line V-V' illustrated in FIG. 17.

FIG. 20 is another cross-sectional view taken along line V-V' illustrated in FIG. 17.

With reference to FIGS. 17 and 20, a first pad member 901 may be disposed between the plurality of vibration structures of the first vibration apparatus 210-1. For example, a region between the plurality of vibration structures may overlap the first pad member 901. For example, the first pad member 901 may be embedded between a plurality of vibration structures in the first vibration apparatus 210-1. A second pad member may be disposed between the plurality of vibration structures of the second vibration apparatus 210-2. For example, a region between the plurality of vibration structures may overlap a second pad member 902. For example, the second pad member may be embedded between a plurality of vibration structures in the second vibration apparatus 210-2. The first pad member 901 and the second pad member may be a resonance control element, an internal resonance element, a resonance control pad, an internal resonance pad, a gap pad, or a resonance controller, but embodiments of the present disclosure are not limited thereto.

With reference to FIG. 20, the first pad member 901 may be disposed between the third vibration structure 210C and the fourth vibration structure 210D of the first vibration apparatus 210-1. For example, a region between the plurality of vibration structures may overlap the first pad member 901. For example, the first pad member 901 may be embedded between the third vibration structure 210C and the fourth vibration structure 210D in the first vibration apparatus 210-1. A size of each of the first pad member 901 and the second pad member may be configured to be equal to or different from a region between a plurality of vibration structures. For example, a width of each of the first pad member 901 and the second pad member may be the same as or different from each of the third vibration structure 210C and the fourth vibration structure 210D with respect to the first direction (or the X direction).

The first pad member 901 and the second pad member may be configured to be equal to the first vibration apparatus 210-1. For example, in a case where the first pad member 901 and the second pad member are configured to be equal to the first vibration apparatus 210-1, a level of a signal applied to the first pad member 901 and the second pad member may be adjusted, and thus, a resonance of the vibration apparatus may be easily adjusted. For example, because the first pad member 901 and the second pad member are provided between the plurality of vibration structures, an increase in thickness of the apparatus caused by the arrangement of a pad member may be reduced, and an attachment process performed on the pad member may be omitted.

For example, each of the plurality of vibration structures may include a vibration layer 211, a first electrode layer E1 disposed at the first surface of the vibration layer 211, and a second electrode layer E2 disposed at the second surface different from the first surface of the vibration layer 211. For example, like the vibration portion 211 described above with reference to FIG. 3 or the vibration layer 221a described above with reference to FIGS. 5A to 5F, the vibration layer 211 may include a first portion 211a and a second portion 211b. For example, as illustrated in FIGS. 5A to 5F or FIG. 10, the second portion 211b or 221a2 may be disposed more outward than the first portion 211a or 221a1, but embodiments of the present disclosure are not limited thereto. Each of the plurality of vibration structures may further include a first protection member 213 over the first surface of the first electrode layer E1 and a second protection member 215 over the second surface different from the first surface of the first electrode layer E1.

For example, each of the plurality of vibration structures may include the vibration portion 211, the first protection member 213 over the first surface of the vibration portion 211, and the second protection member 215 over the second surface different from the first surface of the vibration portion 211. Each of the plurality of vibration structures may further include the first electrode layer E1 between the vibration portion 211 and the first protection member 213 and the second electrode layer E2 between the vibration portion 211 and the second protection member 215.

For example, the first pad member 901 may include a vibration layer 511, a first electrode layer E51, and a second electrode layer E52. For example, the first pad member 901 may include the vibration layer 511, the first electrode layer E51 disposed at a first surface of the vibration layer 511, and the second electrode layer E52 disposed at a second surface different from the first surface of the vibration layer 511. For example, like the vibration portion 211 described above with reference to FIG. 3 or the vibration portion 211 described above with reference to FIGS. 5A to 5F, the vibration layer 511 may include a first portion 211a and a second portion 211b. The vibration layer 511 of the first pad member 901 may be arranged to be identical to the vibration portion 211 of each of the plurality of vibration structures. For example, the arrangement of the first portion and the second portion of the vibration layer 511 of the first pad member 901 may be the same as the arrangement of the first portion and the second portion of the vibration portion 211 of each of the plurality of vibration structures. However, the present disclosure is not limited thereto, and the arrangement of the first portion and the second portion of the vibration layer 511 of the first pad member 901 may be configured to be different from the arrangement of the first portion and the second portion of the vibration portion 211 of each of the plurality of vibration structures.

The first protection member 213 of the first vibration apparatus 210-1 may protect the second electrode layer E52 of the first pad member 901. For example, the first protection member 213 of the first vibration apparatus 210-1 may protect the second electrode layer E52 of the first pad member 901, and thus, a separate first protection member for protecting the second electrode layer E52 of the first pad member 901 may not be provided. The second protection member 215 of the first vibration apparatus 210-1 may protect the first electrode layer E51 of the first pad member 901. For example, the second protection member 215 of the first vibration apparatus 210-1 may protect the first electrode layer E51 of the first pad member 901, and thus, a separate second protection member for protecting the first electrode layer E51 of the first pad member 901 may not be provided. For example, the first protection member 213 and the second protection member 215 of the vibration apparatus may cover a plurality of vibration structures in common. For example, the first protection member 213 and the second protection member 215 of the vibration apparatus may be disposed to surround the plurality of vibration structures. For example, the first protection member 213 and the second protection member 215 of the vibration apparatus may be shared by a pad member.

For example, the first electrode layer E1 of each of the third vibration structure 210C and the fourth vibration structure 210D of the first vibration apparatus 210-1 may be disposed closer to the display panel 100 than the second electrode layer E2. For example, the first electrode layer E1 may be a negative (−) electrode, and the second electrode layer E2 may be a positive (+) electrode. However, embodiments of the present disclosure are not limited thereto, and the first electrode layer E1 may be a positive (+) electrode and the second electrode layer E2 may be a negative (−) electrode. The second electrode layer E52 of the first pad member 901 may be disposed closer to the display panel 100 than the first electrode layer E51. For example, the first electrode layer E51 may be a negative (−) electrode, and the second electrode layer E52 may be a positive (+) electrode. However, embodiments of the present disclosure are not limited thereto, and the first electrode layer E51 may be a positive (+) electrode and the second electrode layer E52 may be a negative (−) electrode. Polarities of the first electrode layer E1 and the second electrode layer E2 of the first vibration apparatus 210-1 may be configured to be opposite to those of the first electrode layer E51 and the second electrode layer E52 of the first pad member 901. For example, with respect to the display panel 100, a polarity of the first electrode layer E1 of each of the plurality of vibration structures may differ from the second electrode layer E52 of the pad member. For example, with respect to the display panel 100, the first electrode layer E1 and the second electrode layer E2 of the first vibration apparatus 210-1 may be configured as a negative (−) electrode and a positive (+) electrode, and the second electrode layer E52 and the first electrode layer E51 of the first pad member 901 may be configured as a positive (+) electrode and a negative (−) electrode. Therefore, because the electrode layer of the first pad member 901 is disposed as an electrode layer having a polarity opposite to a polarity of the first vibration apparatus 210-1, a dip phenomenon caused by resonance between a plurality of vibration structures and may be offset, based on inverse resonance caused by the first pad member 901. Accordingly, because a pad member is provided between a plurality of vibration structures, a reduction in a sound pressure level occurring in the boundary between the plurality of vibration structures may decrease. Also, because a pad member is embedded between a plurality of vibration structures, a thickness of an apparatus may be reduced, and a process may be simplified.

As another embodiment of the present disclosure, the pad members of FIGS. 18 to 20 may be configured in common. For example, the first pad member 701 and the second pad member of FIG. 18 may be configured in vibration apparatus 210-1 and 210-2 together with the first pad member 901 and the second pad member of FIG. 20. For example, the first pad member 801 and the second pad member of FIG. 19 may be configured in vibration apparatus 210-1 and 210-2 together with the first pad member 901 and the second pad member of FIG. 20.

Figure 21:
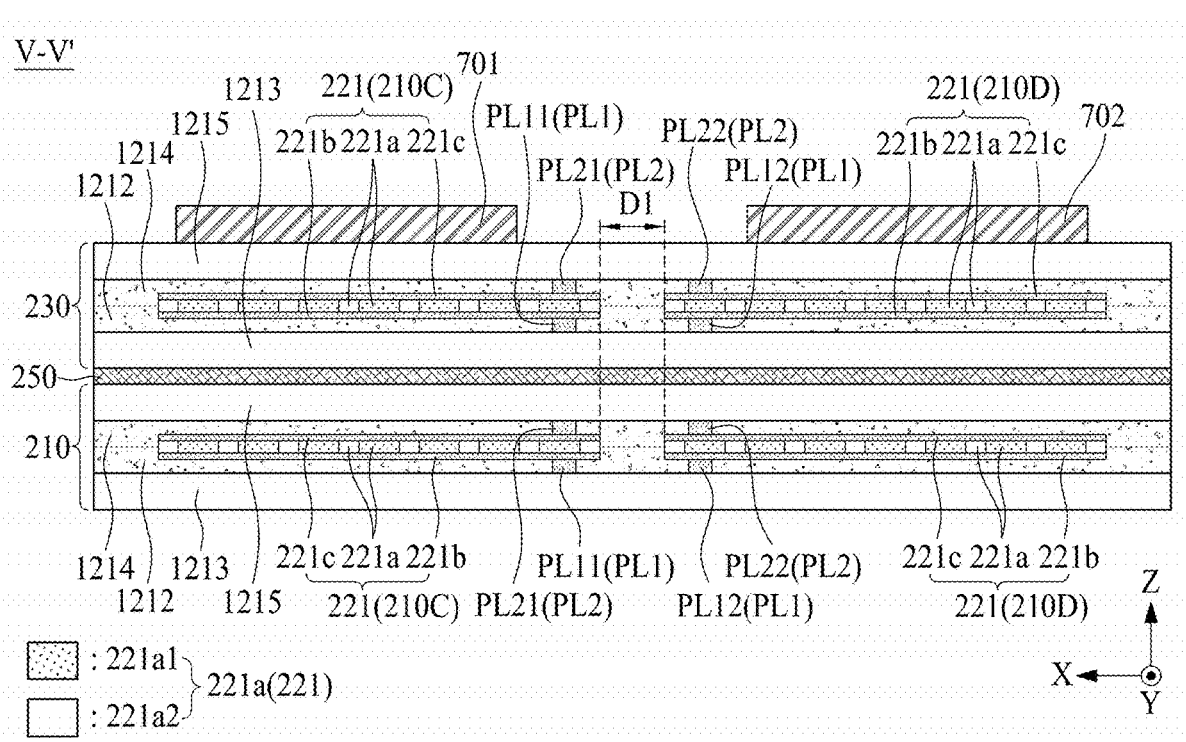
FIG. 21 is another cross-sectional view taken along line V-V' illustrated in FIG. 17.

FIG. 21 is another cross-sectional view taken along line V-V' illustrated in FIG. 17.

Figure 22:
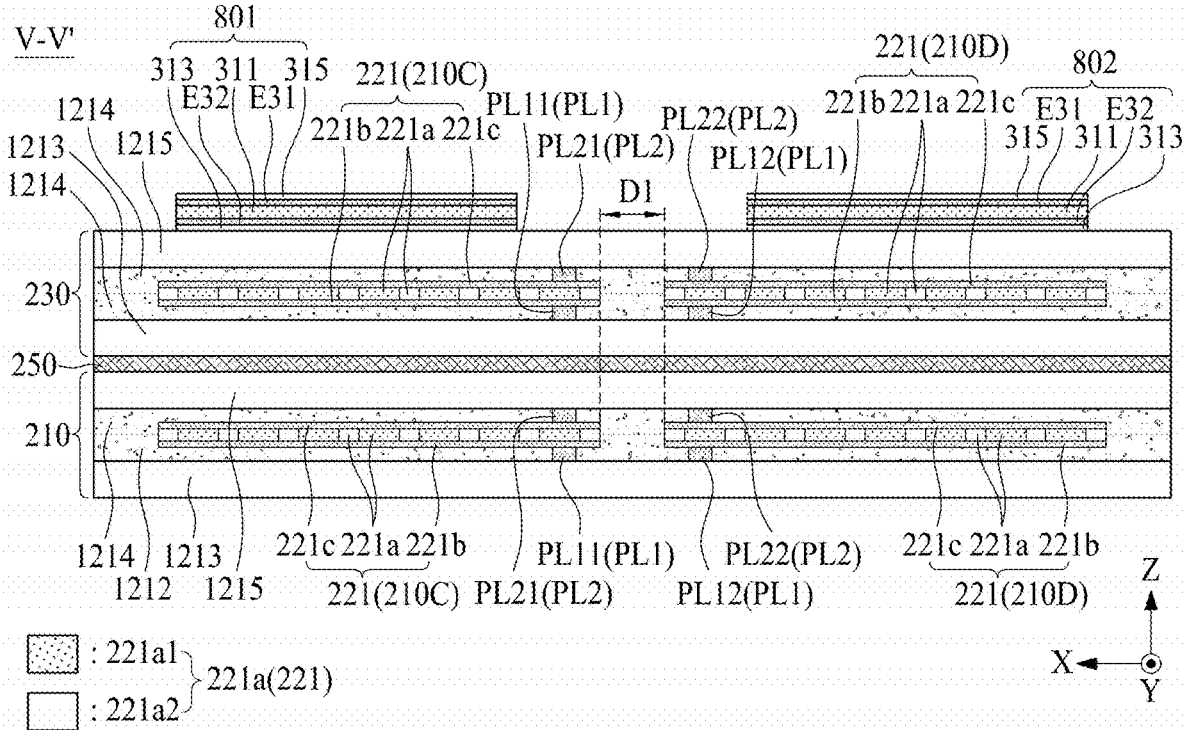
FIG. 22 is another cross-sectional view taken along line V-V' illustrated in FIG. 17.
Figure 23:
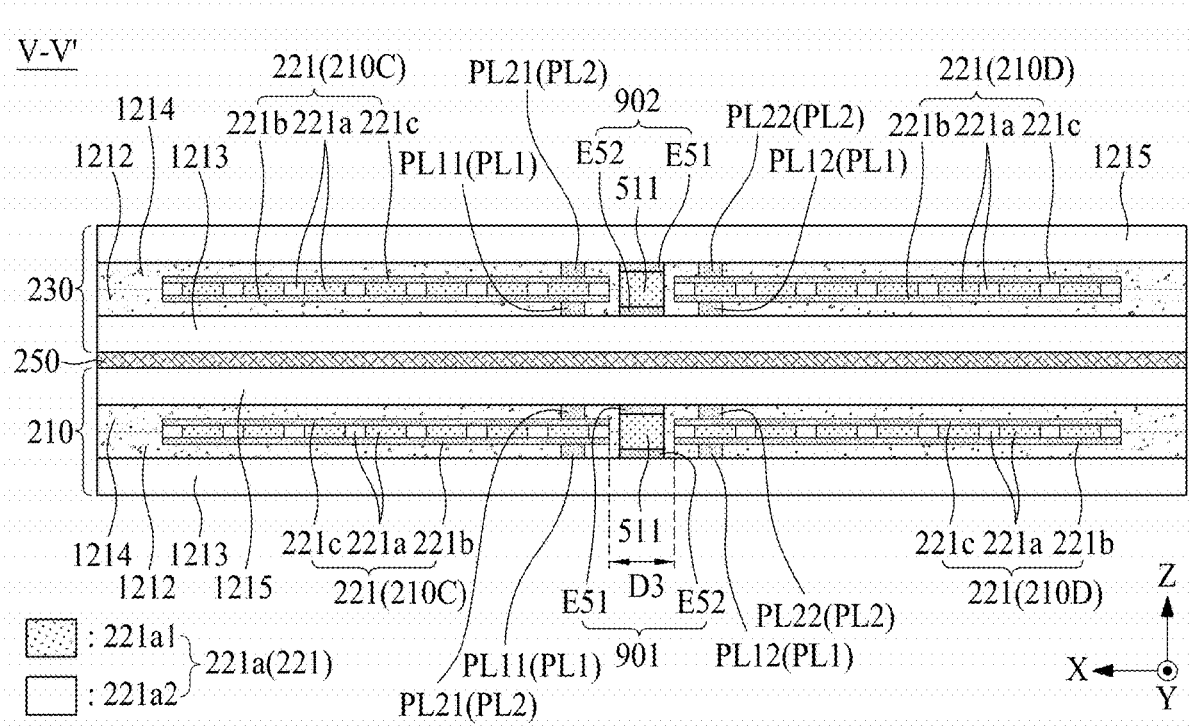
FIG. 23 is another cross-sectional view taken along line V-V' illustrated in FIG. 17.

With reference to FIGS. 21 to 23, a pad member may be provided in each of the plurality of vibration generators 210 and 230 of the vibration apparatus 200 of FIGS. 7 to 10. Therefore, a description of a vibration apparatus is omitted or will be briefly given below.

With reference to FIGS. 17 and 21, a vibration apparatus 200 according to another embodiment of the present disclosure may include a plurality of vibration generators 210 and 230. The plurality of vibration generators 210 and 230 may include a plurality of vibration structures.

For example, each of the plurality of vibration structures may include a vibration layer 221a, a first electrode layer 221b disposed at a first surface of the vibration layer 221a, and a second electrode layer 221c disposed at a second surface different from the first surface of the vibration layer 221a. Each of the plurality of vibration structures may further include a first protection member 1213 on a first surface of the first electrode layer 221b and a second protection member 1215 on a second surface different from the first surface of the first electrode layer 221b.

For example, each of the plurality of vibration structures may include the vibration layer 221a, the first protection member 1213 on the first surface of the vibration layer 221a, and the second protection member 1215 on the second surface different from the first surface of the vibration layer 221a. Each of the plurality of vibration structures may further include the first electrode layer 221b between the vibration layer 221a and the first protection member 1213 and the second electrode layer 221c between the vibration layer 221a and the second protection member 1215. For example, the first protection member 1213 and the second protection member 1215 of the vibration apparatus may cover the plurality of vibration structures in common. For example, the first protection member 1213 and the second protection member 1215 of the vibration apparatus may to be disposed to surround the plurality of vibration structures.

A first pad member 701 may be disposed at the plurality of vibration generators 210 and 230 of the vibration apparatus 200. For example, the first pad member 701 may be disposed at a rear surface of each of the plurality of vibration generators 210 and 230 of the vibration apparatus 200. For example, the first pad member 701 may be disposed under a second vibration generator 230 of the plurality of vibration generators 210 and 230. For example, the first pad member 701 may be disposed between the vibration apparatus 200 and a supporting member. For example, the first pad member 701 may be disposed between the plurality of vibration generators 210 and 230 and the supporting member. For example, the first pad member 701 may be disposed between the rear surface of each of the plurality of vibration generators 210 and 230 and an upper surface of the supporting member. For example, the first pad member 701 may be disposed between a rear surface of the second vibration generator 230 of the plurality of vibration generators 210 and 230 and the upper surface of the supporting member. For example, an end of the first pad member 701 may be disposed to correspond to a first portion 221a1. The end of the first pad member 701 may not overlap a second portion 221a2 and may overlap the first portion 221a1. For example, the end of the first pad member 701 may be disposed or aligned at a boundary between the first portion 221a1 and the second portion 221a2. For example, the first pad member 701 may be configured to correspond to both sides of a plurality of first portions 221a1 of a first vibration generator 210 and/or the second vibration generator 230.

A second pad member 702 may be disposed at the plurality of vibration generators 210 and 230 of the vibration apparatus 200. For example, the second pad member 702 may be disposed under the second vibration generator 230 of the plurality of vibration generators 210 and 230. For example, the second pad member 702 may be disposed between the vibration apparatus 200 and the supporting member. For example, the second pad member 702 may be disposed between the plurality of vibration generators 210 and 230 and the supporting member. For example, the second pad member 702 may be disposed between the rear surface of each of the plurality of vibration generators 210 and 230 and the upper surface of the supporting member. For example, the second pad member 702 may be disposed between the rear surface of the second vibration generator 230 of the plurality of vibration generators 210 and 230 and the upper surface of the supporting member. For example, an end of the second pad member 702 may be disposed to correspond to the first portion 221a1. The end of the second pad member 702 may not overlap the second portion 221a2 and may overlap the first portion 221a1. For example, the end of the second pad member 702 may be disposed or aligned at the boundary between the first portion 221a1 and the second portion 221a2. For example, the end of the second pad member 702 may be configured to correspond to the both sides of the plurality of first portions 221a1 of the first vibration generator 210 and/or the second vibration generator 230. The first pad member 701 and the second pad member 702 may be a resonance control pad, an external resonance pad, a gap pad, or a resonance controller, but embodiments of the present disclosure are not limited thereto. For example, the pad member includes a plurality of pad members 701 and 702, and each the vibration structures 210A to 210D has a corresponding pad member 701 and 702. For example, the pad members 701 and 702 are disposed parallelly with the vibration structures 210A to 210D of the vibration generators 210 and 230. For example, the vibration generators 210A to 210D and the pad members 701 and 702 are disposed in a stacked arrangement.

A size of each of the first pad member 701 and the second pad member 702 may be configured to be equal to or different from each of the plurality of vibration structures of the plurality of vibration generators 210 and 230.

A first electrode layer 221b of each of a third vibration structure 210C and a fourth vibration structure 210D in the first vibration generator 210 may be disposed closer to the display panel 100 than a second electrode layer 221c. For example, the first electrode layer 221b may be a negative (−) electrode. For example, the second electrode layer 221c may be a positive (+) electrode. A first electrode layer 221b of each of the third vibration structure 210C and the fourth vibration structure 210D in the second vibration generator 230 may be disposed closer to the display panel 100 than a second electrode layer 221c. For example, the first electrode layer 221b may be a negative (−) electrode. For example, the second electrode layer 221c may be a positive (+) electrode. One or more among the first electrode layer 221b of each of the third vibration structure 210C and the fourth vibration structure 210D of the first vibration generator 210 and the second electrode layer 221b of each of the third vibration structure 210C and the fourth vibration structure 210D of the second vibration generator 230 may be disposed closer to the display panel 100 than the second electrode layer 221c.

For example, the first pad member 701 and the second pad member 702 may be configured as a material which differs from a partition 600, but embodiments of the present disclosure are not limited thereto. For example, the first pad member 701 and the second pad member 702 may be configured as one among a silicone-based polymer, paraffin wax, and an acrylic polymer, but embodiments of the present disclosure are not limited thereto.

The first pad member 701 may decrease heat caused by vibrations of the third vibration structure 210C of the first vibration generator 210 and the third vibration structure 210C of the second vibration generator 230. The second pad member 702 may decrease heat caused by vibrations of the fourth vibration structure 210D of the first vibration generator 210 and the fourth vibration structure 210D of the second vibration generator 230. Therefore, because a pad member is provided in a vibration apparatus, a reduction in a sound pressure level in a specific frequency occurring between a plurality of vibration structures may decrease, and a heat dissipation effect of reducing heat caused by vibrations of the plurality of vibration structures may be enhanced. As another embodiment of the present disclosure, a heat dissipation member may be further provided between the display panel 100 and the vibration apparatus. For example, the heat dissipation member may be disposed at the rear surface of the display panel 100.

FIG. 22 is another cross-sectional view taken along line V-V' illustrated in FIG. 17.

With reference to FIGS. 17 and 22, a vibration apparatus 200 according to an embodiment of the present disclosure may include a plurality of vibration generators 210 and 230. The plurality of vibration generators 210 and 230 may include a plurality of vibration structures.

For example, each of the plurality of vibration structures may include a vibration layer 221a, a first electrode layer 221b disposed at a first surface of the vibration layer 221a, and a second electrode layer 221c disposed at a second surface different from the first surface of the vibration layer 221a. Each of the plurality of vibration structures may further include a first protection member 1213 over a first surface of the first electrode layer 221b and a second protection member 1215 over a second surface different from the first surface of the first electrode layer 221b.

For example, each of the plurality of vibration structures may include the vibration layer 221a, the first protection member 1213 over the first surface of the vibration layer 221a, and the second protection member 1215 over the second surface different from the first surface of the vibration layer 221a. Each of the plurality of vibration structures may further include the first electrode layer 221b between the vibration layer 221a and the first protection member 1213 and the second electrode layer 221c between the vibration layer 221a and the second protection member 1215. For example, the first protection member 1213 and the second protection member 1215 of the vibration apparatus may cover the plurality of vibration structures in common. For example, the first protection member 1213 and the second protection member 1215 of the vibration apparatus may to be disposed to surround the plurality of vibration structures.

A first pad member 801 and a second pad member 802 may include a vibration layer 311, a first electrode layer E31, and a second electrode layer E32. For example, the first pad member 801 and the second pad member 802 may include the vibration layer 311, the first electrode layer E31 disposed at a first surface of the vibration layer 311, and the second electrode layer E32 disposed at a second surface different from the first surface of the vibration layer 311. For example, like the vibration portion 211 described above with reference to FIG. 3 or the vibration portion 211 described above with reference to FIGS. 5A to 5F, the vibration layer 311 of each of the first pad member 801 and the second pad member 802 may include a first portion 211a and a second portion 211b. For example, the vibration layer 311 of each of the first pad member 801 and the second pad member 802 may be arranged to be identical to the vibration layer 221a of each of the plurality of vibration structures. For example, the arrangement of the first portion and the second portion of the vibration layer 311 of each of the first pad member 801 and the second pad member 802 may be the same as the arrangement of the first portion and the second portion of the vibration layer 221a of each of the plurality of vibration structures. However, embodiments of the present disclosure are not limited thereto, and the arrangement of the first portion and the second portion of the vibration layer 311 of each of the first pad member 801 and the second pad member 802 may be configured to be different from the arrangement of the first portion and the second portion of the vibration layer 221a of each of the plurality of vibration structures.

The first protection member 313 may be disposed under the first electrode layer E31. For example, the first protection member 313 may protect the first electrode layer E31. The second protection member 315 may be disposed under the second electrode layer E32. For example, the second protection member 315 may protect the second electrode layer E32. The first protection member 313 and the second protection member 315 may be substantially the same as the first protection member 213 or 1213 and the second protection member 215 or 1215 described above with reference to FIGS. 3, 4, and 7 to 9, and thus, their descriptions are omitted.

A first pad member 801 may be disposed at the plurality of vibration generators 210 and 230 of the vibration apparatus 200. For example, the first pad member 801 may be disposed under a second vibration generator 230 of the plurality of vibration generators 210 and 230. For example, the first pad member 801 may be disposed between the vibration apparatus 200 and a supporting member. For example, the first pad member 801 may be disposed between the plurality of vibration generators 210 and 230 and the supporting member. For example, the first pad member 801 may be disposed between the rear surface of each of the plurality of vibration generators 210 and 230 and an upper surface of the supporting member. For example, the first pad member 801 may be disposed between a rear surface of the second vibration generator 230 of the plurality of vibration generators 210 and 230 and the upper surface of the supporting member. For example, an end of the first pad member 801 may be disposed to correspond to a first portion 221a1. The end of the first pad member 801 may not overlap a second portion 221a2 and may overlap the first portion 221a1. For example, the end of the first pad member 801 may be disposed or aligned at a boundary between the first portion 221a1 and the second portion 221a2. For example, the first pad member 801 may be configured to correspond to both sides of a plurality of first portions 221a1 of a first vibration generator 210 and/or the second vibration generator 230.

A second pad member 802 may be disposed at the plurality of vibration generators 210 and 230 of the vibration apparatus 200. For example, the second pad member 802 may be disposed under the second vibration generator 230 of the plurality of vibration generators 210 and 230. For example, the second pad member 802 may be disposed between the vibration apparatus 200 and the supporting member. For example, the second pad member 802 may be disposed between the rear surface of each of the plurality of vibration generators 210 and 230 and the upper surface of the supporting member. For example, the second pad member 802 may be disposed between the rear surface of the second vibration generator 230 of the plurality of vibration generators 210 and 230 and the upper surface of the supporting member. For example, an end of the second pad member 802 may be disposed to correspond to the first portion 221a1. The end of the second pad member 802 may not overlap the second portion 221a2 and may overlap the first portion 221a1. For example, the end of the second pad member 802 may be disposed or aligned at the boundary between the first portion 221a1 and the second portion 221a2. For example, the second pad member 802 may be configured to correspond to the both sides of the plurality of first portions 221a1 of the first vibration generator 210 and/or the second vibration generator 230. The first pad member 801 and the second pad member 802 may be a resonance control pad, an external resonance pad, a gap pad, or a resonance controller, but embodiments of the present disclosure are not limited thereto. For example, the pad member includes a plurality of pad members 801 and 802, and each the vibration structures 210A to 210D has a corresponding pad member 801 and 802. For example, the pad members 801 and 802 are disposed parallelly with the vibration structures 210A to 210D of the vibration generators 210 and 230. For example, the vibration generators 210A to 210D and the pad members 801 and 802 are disposed in a stacked arrangement.

A size of each of the first pad member 801 and the second pad member 802 may be configured to be equal to or different from each of the plurality of vibration structures.

One or more of the first pad member 801 and the second pad member 802 may be configured to be identical to the vibration generators 210 and 230. For example, one or more of the first pad member 801 and the second pad member 802 may be configured to be identical to the plurality of vibration structures 210A to 210D of the plurality of vibration generators 210 and 230. For example, in a case where one or more of the first pad member 801 and the second pad member 802 are configured to be identical to the vibration generators 210 and 230, a level of a signal applied to the first pad member 801 and the second pad member 802 may be adjusted, and thus, a resonance of the vibration apparatus may be easily adjusted.

For example, the first pad member 801 may include the vibration layer 311, the first electrode layer E31, and the second electrode layer E32. For example, like the vibration portion 211 described above with reference to FIG. 3 or the vibration portion 211 described above with reference to FIGS. 5A to 5F, the vibration layer 311 may include a first portion 211a and a second portion 211b. As another embodiment of the present disclosure, like the vibration layer 221a described above with reference to FIGS. 7 to 10, the vibration layer 311 may include a first portion 211a1 and a second portion 211a2.

The first protection member 313 may be disposed under the first electrode layer E31. For example, the first protection member 313 may protect the first electrode layer E31. The second protection member 315 may be disposed over the second electrode layer E32. For example, the second protection member 315 may protect the second electrode layer E35. The first protection member 313 and the second protection member 315 may be substantially the same as the first protection member 213 or 1213 and the second protection member 215 or 1215 described above with reference to FIGS. 3, 4, and 7 to 9, and thus, their descriptions are omitted.

A first electrode layer 221b of each of a third vibration structure 210C and a fourth vibration structure 210D of the first vibration generator 210 may be disposed closer to the display panel 100 than a second electrode layer 221c. For example, the first electrode layer 221b may be a negative (−) electrode. For example, the second electrode layer 221c may be a positive (+) electrode. A first electrode layer 221b of each of the third vibration structure 210C and the fourth vibration structure 210D of the second vibration generator 230 may be disposed closer to the display panel 100 than a second electrode layer 221c. For example, the first electrode layer 221b may be a negative (−) electrode. For example, the second electrode layer 221c may be a positive (+) electrode. One or more of the first electrode layer 221b of each of the third vibration structure 210C and the fourth vibration structure 210D of the first vibration generator 210 and the second electrode layer 221b of each of the third vibration structure 210C and the fourth vibration structure 210D of the second vibration generator 230 may be disposed closer to the display panel 100 than the second electrode layer 221c.

The second electrode layer E32 of the first pad member 801 may be disposed closer to the display panel 100 than the first electrode layer E31. For example, the first electrode layer E31 may be a negative (−) electrode. For example, the second electrode layer E32 may be a positive (+) electrode. Polarities of the first electrode layer E31 and the second electrode layer E32 of the first vibration generator 210 may be configured to be opposite to those of the first electrode layer E31 and the second electrode layer E32 of the first pad member 801. For example, with respect to the display panel 100, a polarity of the first electrode layer E1 of each of the plurality of vibration structures may differ from the second electrode layer E32 of the pad member. For example, with respect to the display panel 100, the first electrode layer 221b and the second electrode layer 221c of the first vibration generator 210 may be configured as a negative (−) electrode and a positive (+) electrode, and the second electrode layer E32 and the first electrode layer E31 of the first pad member 801 may be configured as a positive (+) electrode and a negative (−) electrode. The second electrode layer E32 of the second pad member 802 may be disposed closer to the display panel 100 than the first electrode layer E31. For example, the first electrode layer E31 may be a negative (−) electrode. For example, the second electrode layer E32 may be a positive (+) electrode. Polarities of the first electrode layer 221b and the second electrode layer 221c of the second vibration generator 230 may be configured to be opposite to those of the first electrode layer E31 and the second electrode layer E32 of the second pad member 802. For example, with respect to the display panel 100, the first electrode layer 221b and the second electrode layer 221c of the second vibration generator 230 may be configured as a negative (−) electrode and a positive (+) electrode, and the second electrode layer E32 and the first electrode layer E31 of the second pad member 802 may be configured as a positive (+) electrode and a negative (−) electrode. Therefore, because the electrode layer of the first pad member 801 and/or the electrode layer of the second pad member 802 is disposed as an electrode layer having a polarity opposite to a polarity of the first vibration generator 210 and/or the second vibration generator 230, a dip phenomenon caused by resonance between a plurality of vibration structures and may be offset based on inverse resonance caused by the first pad member 801 and/or the electrode layer of the second pad member 802. Accordingly, because a pad member is provided in a vibration apparatus, a reduction in a sound pressure level occurring in the boundary between the plurality of vibration structures may decrease.

FIG. 23 is another cross-sectional view taken along line V-V' illustrated in FIG. 17.

With reference to FIGS. 17 and 23, a vibration apparatus 200 according to an embodiment of the present disclosure may include a plurality of vibration generators 210 and 230. The plurality of vibration generators 210 and 230 may include a plurality of vibration structures.

For example, each of the plurality of vibration structures may include a vibration layer 221*a*, a first electrode layer 221*b* disposed at a first surface of the vibration layer 221*a*, and a second electrode layer 221*c* disposed at a second surface different from the first surface of the vibration layer 221*a*. Each of the plurality of vibration structures may further include a first protection member 1213 over a first surface of the first electrode layer 221*b* and a second protection member 1215 over a second surface different from the first surface of the first electrode layer 221*b*.

For example, each of the plurality of vibration structures may include the vibration layer 221*a*, the first protection member 1213 over the first surface of the vibration layer 221*a*, and the second protection member 1215 over the second surface different from the first surface of the vibration layer 221*a*. Each of the plurality of vibration structures may further include the first electrode layer 221*b* between the vibration layer 221*a* and the first protection member 1213 and the second electrode layer 221*c* between the vibration layer 221*a* and the second protection member 1215. For example, the first protection member 1213 and the second protection member 1215 of the vibration apparatus may cover the plurality of vibration structures in common. For example, the first protection member 1213 and the second protection member 1215 of the vibration apparatus may to be disposed to surround the plurality of vibration structures.

A first pad member 901 may be disposed between the plurality of vibration structures in the first vibration generator 210. For example, a region between the plurality of vibration structures may overlap the first pad member 901. For example, the first pad member 901 may be embedded between a plurality of vibration structures in the first vibration generator 210. A second pad member 902 may be disposed between the plurality of vibration structures in the second vibration generator 230. For example, a region between the plurality of vibration structures may overlap the second pad member 902. For example, the second pad member 902 may be embedded between a plurality of vibration structures in the second vibration generator 230. The first pad member 901 and the second pad member 902 may be a resonance control element, an internal resonance element, a resonance control pad, an internal resonance pad, a gap pad, or a resonance controller, but embodiments of the present disclosure are not limited thereto. For example, the pad members 901 and 902 are disposed parallelly with the vibration structures 210A to 210D of the vibration generators 210 and 230. For example, the vibration generators 210A to 210D and the pad members 901 and 902 are disposed in a stacked arrangement. For example, the pad members 901 and 902 may be disposed between, i.e. directly inbetween, the plurality of vibration structures 201A to 201D.

With reference to FIG. 23, the first pad member 901 may be disposed between a third vibration structure 210C and a fourth vibration structure 210D of the first vibration generator 210. For example, the first pad member 901 may be embedded between the third vibration structure 210C and the fourth vibration structure 210D.

A size of one or more of the first pad member 901 and the second pad member 902 may be configured to be equal to or different from a region between a plurality of vibration structures. For example, a size of one or more of the first pad member 901 and the second pad member 902 may be the same as or different from an interval D3 between the plurality of vibration structures.

One or more of the first pad member 901 and the second pad member 902 may be configured to be identical to the vibration generators 210 and 230. For example, one or more of the first pad member 901 and the second pad member 902 are configured to be identical to a plurality of vibration structures 210A to 210D of the plurality of vibration generators 210 and 230. For example, in a case where one or more of the first pad member 901 and the second pad member 902 are configured to be identical to the plurality of vibration generators 210 and 230, a level of a signal applied to the first pad member 901 and the second pad member 902 may be adjusted, and thus, a resonance of the vibration apparatus may be easily adjusted. For example, because the first pad member 901 and the second pad member 902 are provided between the plurality of vibration structures, an increase in thickness of the apparatus caused by the arrangement of a pad member may be reduced, and an attachment process performed on the pad member may be omitted.

For example, the first pad member 901 may include a vibration layer 511, a first electrode layer E51, and a second electrode layer E52. For example, the first pad member 901 may include the vibration layer 511, the first electrode layer E51 disposed at a first surface of the vibration layer 511, and the second electrode layer E52 disposed at a second surface different from the first surface of the vibration layer 511. For example, like the vibration portion 211 described above with reference to FIG. 3 or the vibration portion 211 described above with reference to FIGS. 5A to 5F, the vibration layer 511 may include a first portion 211*a* and a second portion 211*b*. As another embodiment of the present disclosure, like the vibration layer 221*a* described above with reference to FIGS. 7 to 10, the vibration layer 311 may include a first portion 221*a*1 and a second portion 221*a*2. For example, the vibration layer 511 of each of the first pad member 901 and the second pad member 902 may be arranged to be identical to the vibration layer 221*a* of each of the plurality of vibration structures. For example, the arrangement of the first portion and the second portion of the vibration layer 511 of each of the first pad member 901 and the second pad member 902 may be the same as the arrangement of the first portion and the second portion of the vibration layer 221*a* of each of the plurality of vibration structures. However, embodiments of the present disclosure are not limited thereto, and the arrangement of the first portion and the second portion of the vibration layer 511 of each of the first pad member 901 and the second pad member 902 may be configured to be different from the arrangement of the first portion and the second portion of the vibration layer 221*a* of each of the plurality of vibration structures.

The first protection member 1213 of the first vibration generator 210 may protect the second electrode layer E52 of the first pad member 901. For example, the first protection member 1213 of the first vibration generator 210 may protect the second electrode layer E52 of the first pad member 901, and thus, a separate first protection member for protecting the second electrode layer E52 of the first pad member 901 may not be provided. The second protection member 1215 of the first vibration generator 210 may protect the first electrode layer E51 of the first pad member 901. For example, the second protection member 1215 of the first vibration generator 210 may protect the first electrode layer E51 of the first pad member 901, and thus, a separate second protection member for protecting the first electrode layer E51 of the first pad member 901 may not be provided.

The first protection member 1213 of the second vibration generator 230 may protect the second electrode layer E52 of the second pad member 902. For example, the first protection member 1213 of the second vibration generator 230 may protect the second electrode layer E52 of the second pad member 902, and thus, a separate first protection member for protecting the second electrode layer E52 of the second pad member 902 may not be provided. The second protection member 1215 of the second vibration generator 230 may protect the first electrode layer E51 of the second pad member 902. For example, the second protection member 1215 of the second vibration generator 230 may protect the first electrode layer E51 of the second pad member 902, and thus, a separate second protection member for protecting the first electrode layer E51 of the second pad member 902 may not be provided. For example, the first protection member 1213 and the second protection member 1215 of the vibration apparatus may cover a plurality of vibration structures in common. For example, the first protection member 1213 and the second protection member 1215 of the vibration apparatus may be disposed to surround the plurality of vibration structures. For example, the first protection member 1213 and the second protection member 1215 of the vibration apparatus may be shared by a pad member.

A first electrode layer 221b of each of a third vibration structure 210C and a fourth vibration structure 210D of the first vibration generator 210 may be disposed closer to the display panel 100 than a second electrode layer 221c. For example, the first electrode layer 221b may be a negative (−) electrode. For example, the second electrode layer 221c may be a positive (+) electrode. A first electrode layer 221b of each of the third vibration structure 210C and the fourth vibration structure 210D of the second vibration generator 230 may be disposed closer to the display panel 100 than a second electrode layer 221c. For example, the first electrode layer 221b may be a negative (−) electrode. For example, the second electrode layer 221c may be a positive (+) electrode. One or more of the first electrode layer 221b of each of the third vibration structure 210C and the fourth vibration structure 210D of the first vibration generator 210 and the second electrode layer 221b of each of the third vibration structure 210C and the fourth vibration structure 210D of the second vibration generator 230 may be disposed closer to the display panel 100 than the second electrode layer 221c.

The second electrode layer E52 of the first pad member 901 may be disposed closer to the display panel 100 than the first electrode layer E51. For example, the first electrode layer E51 may be a negative (−) electrode, and the second electrode layer E52 may be a positive (+) electrode. Polarities of the first electrode layer 221b and the second electrode layer 221c of the first vibration generator 210 may be configured to be opposite to those of the first electrode layer E51 and the second electrode layer E52 of the first pad member 901. For example, with respect to the display panel 100, a polarity of the first electrode layer E1 of each of the plurality of vibration structures may differ from the second electrode layer E32 of the pad member. For example, with respect to the display panel 100, the first electrode layer 221b and the second electrode layer 221c of the first vibration generator 210 may be configured as a negative (−) electrode and a positive (+) electrode, and the second electrode layer E52 and the first electrode layer E51 of the first pad member 901 may be configured as a positive (+) electrode and a negative (−) electrode. The second electrode layer E52 of the second pad member 902 may be disposed closer to the display panel 100 than the first electrode layer E51. For example, the first electrode layer E51 may be a negative (−) electrode, and the second electrode layer E52 may be a positive (+) electrode. Polarities of the first electrode layer 221b and the second electrode layer 221c of the second vibration generator 230 may be configured to be opposite to those of the first electrode layer E51 and the second electrode layer E52 of the second pad member 902. For example, with respect to the display panel 100, the first electrode layer 221b and the second electrode layer 221c of the second vibration generator 230 may be configured as a negative (−) electrode and a positive (+) electrode, and the second electrode layer E52 and the first electrode layer E51 of the second pad member 902 may be configured as a positive (+) electrode and a negative (−) electrode. Therefore, because the electrode layer of the first pad member 901 and/or the electrode layer of the second pad member 902 are/is disposed as an electrode layer having a polarity opposite to a polarity of each of the first vibration generator 210 and/or the second vibration generator 230, a dip phenomenon caused by resonance between a plurality of vibration structures and may be offset based on inverse resonance caused by the first pad member 901. Accordingly, because a pad member is provided between a plurality of vibration structures, a reduction in a sound pressure level occurring in the boundary between the plurality of vibration structures may decrease. Also, because a pad member is provided between a plurality of vibration structures, a thickness of an apparatus may be reduced, and a process may be simplified.

As another embodiment of the present disclosure, the pad members of FIGS. 21 to 23 may be configured in common. For example, the first pad member 701 and the second pad member of FIG. 21 may be configured in vibration apparatus 210-1 and 210-2 together with the first pad member 901 and the second pad member of FIG. 23. For example, the first pad member 801 and the second pad member of FIG. 22 may be configured in vibration apparatus 210-1 and 210-2 together with the first pad member 901 and the second pad member 902 of FIG. 23.

Figure 24A:
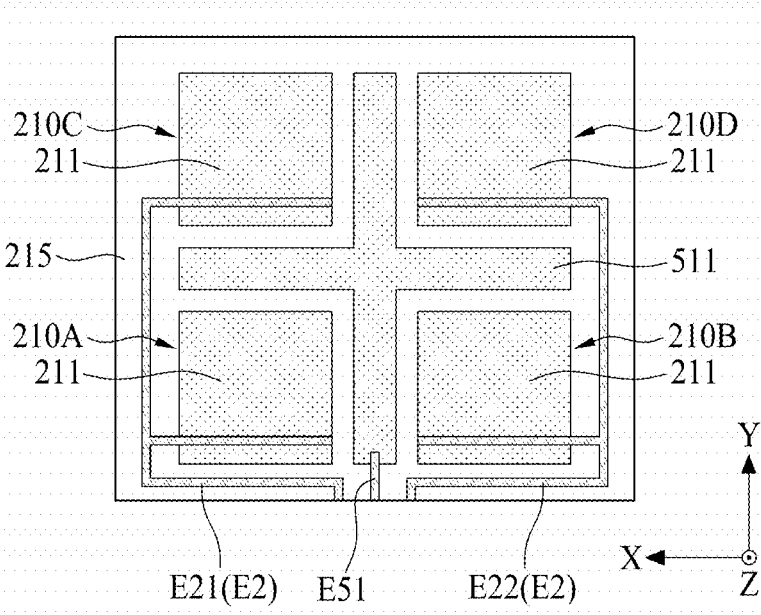
FIG. 24A is a front view illustrating a vibration apparatus according to another embodiment of the present disclosure.
Figure 24B:
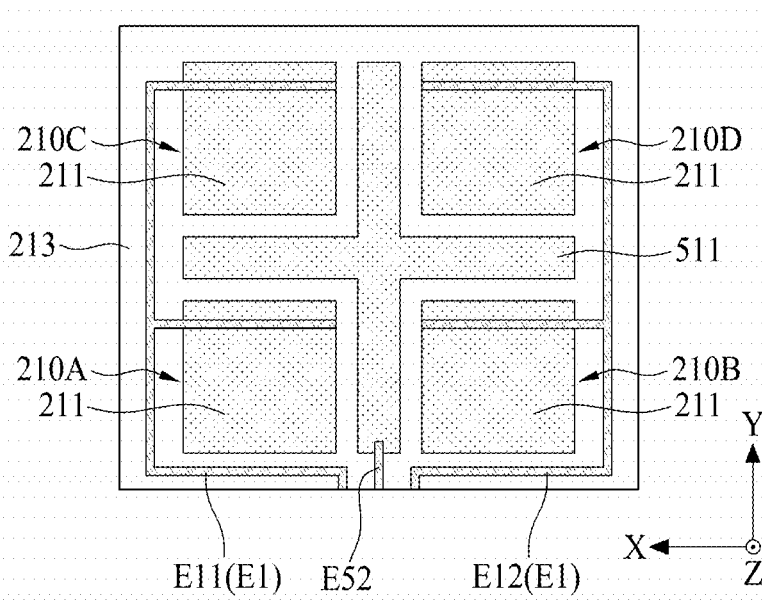
FIG. 24B is a rear view illustrating a vibration apparatus according to another embodiment of the present disclosure.

FIGS. 24A and 24B are a front view and a rear view of a vibration apparatus according to another embodiment of the present disclosure.

FIGS. 24A and 24B illustrate a front view and a rear view of the vibration apparatus of FIG. 20. But, embodiments of the present disclosure are not limited thereto, and descriptions of FIGS. 24A and 24B may be applied to FIGS. 17, 18, and 21 to 23.

With reference to FIGS. 24A and 24B, the vibration apparatus according to another embodiment of the present disclosure may include a plurality of vibration structures 210A to 210D. For example, the vibration apparatus may include first to fourth vibration structures 210A to 210D, but embodiments of the present disclosure are not limited thereto.

With reference to FIG. 24A, a plurality of vibration structures 210A to 210D may each include a vibration portion 211 and a second electrode layer E2. The second electrode layers E2 of the plurality of vibration structures 210A to 210D may be connected to one another. For example, the second electrode layer E2 may include a first line L21 and a second line L22. Each of the first line L21 and the second line L22 may be a second power supply line.

The first line L21 may be disposed at a first side (or a left side) of the vibration apparatus and may be electrically (or commonly) connected to the second electrode layer E2 of each of the first vibration structure 210A and the third vibration structure 210C. For example, the first line L21 may be disposed at the first side of the vibration apparatus which is one side of the first vibration structure 210A and the third vibration structure 210C, and moreover, may extend in a first direction X and may be electrically connected to the second electrode layer E2 of each of the first vibration structure 210A and the third vibration structure 210C. For example, the first line L21 may be electrically connected to the second electrode layer E2 of each of the first vibration structure 210A and the third vibration structure 210C at one side (or a lower side) of each of the first vibration structure 210A and the third vibration structure 210C. For example, the first line L21 disposed at the first side (or the left side) of the vibration apparatus may extend to a pad part 201 disposed at a center portion of a third side of the vibration apparatus. For example, one side (or an end) of the first line L21 may be a first pad electrode which is disposed at the pad part 201 and is exposed at the outside. For example, the first line L21 may have a finger shape, or may have a ∈-shape.

The second line L22 may be disposed at a second side (or a right side) of the vibration apparatus and may be electrically (or commonly) connected to the second vibration structure 210B and the fourth vibration structure 210D. For example, the second line L22 may be disposed at the second side of the vibration apparatus which is the other side of the second vibration structure 210B and the fourth vibration structure 210D, and moreover, may extend in the first direction X and may be electrically connected to the second electrode layer E2 of each of the second vibration structure 210B and the fourth vibration structure 210D. For example, the second line L22 may be electrically connected to the second electrode layer E2 of each of the second vibration structure 210B and the fourth vibration structure 210D at one side (or a lower side) of each of the second vibration structure 210B and the fourth vibration structure 210D. For example, the second line L22 disposed at the second side of the vibration apparatus may extend to the pad part 201. For example, one side (or an end) of the second line L22 may be a second pad electrode which is disposed at the pad part 201 and is exposed at the outside. For example, the second line L22 may have a finger shape, or may have ⊐-shape.

A first pad member 901 may be disposed between the plurality of vibration structures 210A to 210D. For example, a vibration layer 511 of the first pad member 901 may be disposed between the plurality of vibration structures 210A to 210D. A first electrode layer E51 of the first pad member 901 may include a fifth line L51.

The fifth line L51 may be a first power supply line or a third power supply line. The fifth line L51 may be disposed at a third side of the vibration apparatus, and moreover, may extend in a second direction Y and may be electrically connected to the first electrode layer E51 of the first pad member 901. For example, one side (or an end) of the fifth line L51 may be a fifth pad electrode which is disposed at the pad part 201 and is exposed at the outside. For example, the fifth line L51 may have a straight shape, or may have a " | "-shape. The pad part 201 may be electrically connected to a signal cable or a signal line connected to an audio amplifier or a driving circuit of the vibration apparatus. For example, the pad part 201 may be electrically connected to the signal cable or the signal line connected to the audio amplifier or the driving circuit of the vibration apparatus through a soldering process.

A second protection member 215 may be disposed at a front surface of the vibration apparatus. For example, the second protection member 215 may be disposed at a second surface of the vibration portion 211. For example, the second protection member 215 may be disposed over the plurality of vibration structures 210A to 210D and the first pad member 901. For example, the plurality of vibration structures 210A to 210D and the first pad member 901 may share the second protection member 215. The second protection member 215 may cover the second surface of the vibration portion 211, the first line L21, and the second line L22, and the first electrode layer E51 of the first pad member 901, and thus, may protect the second surface of the vibration portion 211 and/or the second electrode layer E2, and the first electrode layer E51 of the first pad member 901.

With reference to FIG. 24B, a plurality of vibration structures 210A to 210D may each include a vibration portion 211 and a first electrode layer E1. The first electrode layers E1 of the plurality of vibration structures 210A to 210D may be connected to one another. For example, the first electrode layer E1 may include a third line L11 and a fourth line L12. Each of the third line L11 and the fourth line L12 may be a first power supply line. For example, the third line L11 and the first line L21 may be disposed to be staggered or to non-overlap with each other over the vibration portion 211. The fourth line L12 and the second line L22 may be disposed to be staggered or to non-overlap with each other over the vibration portion 211.

The third line L11 may be disposed at a first side (or a left side) of the vibration apparatus and may be electrically (or commonly) connected to the first electrode layer E1 of each of the first vibration structure 210A and the third vibration structure 210C. For example, the third line L11 may be disposed at the first side of the vibration apparatus, and moreover, may extend in a first direction X and may be electrically connected to the first electrode layer E1 of each of the first vibration structure 210A and the third vibration structure 210C. For example, the third line L11 may be electrically connected to the first electrode layer E1 of each of the first vibration structure 210A and the third vibration structure 210C at the other side (or an upper side) of each of the first vibration structure 210A and the third vibration structure 210C. For example, the third line L11 disposed at the first side of the vibration apparatus may extend to a pad part 201. For example, one side or an end of the third line L11 may be a third pad electrode which is disposed at the pad part 201 and is exposed at the outside. For example, the third line L11 may have a finger shape, or may have a ∈-shape.

The fourth line L12 may be disposed at a second side of the vibration apparatus and may be electrically (or commonly) connected to the second vibration structure 210B and the fourth vibration structure 210D. For example, the fourth line L12 may be disposed at the second side of the vibration apparatus, and moreover, may extend in the first direction X and may be electrically connected to the first electrode layer E1 of each of the second vibration structure 210B and the fourth vibration structure 210D. For example, the fourth line L12 may be electrically connected to the first electrode layer E1 of each of the second vibration structure 210B and the fourth vibration structure 210D at the other side (or an upper side) of each of the second vibration structure 210B and the fourth vibration structure 210D. For example, the fourth line L12 disposed at the second side of the vibration apparatus may extend to the pad part 201. For example, one side (or an end) of the fourth line L12 may be a fourth pad electrode which is disposed at the pad part 201 and is exposed at the outside. For example, the fourth line L12 may have a finger shape, or may have a ∋-shape.

A first pad member 901 may be disposed between the plurality of vibration structures 210A to 210D. For example, the first pad member 901 and/or the second pad member may be disposed between, i.e. directly inbetween, the plurality of vibration structures 201A to 201D. For example, a vibration layer 511 of the first pad member 901 may be disposed between the plurality of vibration structures 210A to 210D. A second electrode layer E52 of the first pad member 901 may include a sixth line L52.

The sixth line L52 may be a second power supply line or a fourth power supply line. The sixth line L52 may be disposed at a third side of the vibration apparatus, and moreover, may extend in a second direction Y and may be electrically connected to the second electrode layer E52 of the first pad member 901. For example, one side (or an end) of the sixth line L52 may be a sixth pad electrode which is disposed at the pad part 201 and is exposed at the outside. For example, the sixth line L52 and the fifth line L51 may be disposed to be staggered or to non-overlap with each other over the first pad member 901. For example, the sixth line L52 may have a straight shape, or may have a "|"-shape.

A first protection member 213 may be disposed at a rear surface of the vibration apparatus. For example, the first protection member 213 may be disposed at a first surface of the vibration portion 211. For example, the first protection member 213 may be disposed over the plurality of vibration structures 210A to 210D and the first pad member 901. For example, the plurality of vibration structures 210A to 210D and the first pad member 901 may share the first protection member 213. The first protection member 213 may cover the first surface of the vibration portion 211, the third line L11, and the fourth line L12, and the second electrode layer E52 of the first pad member 901, and thus, may protect the first surface of the vibration portion 211 and/or the first electrode layer E1, and the second electrode layer E52 of the first pad member 901.

For example, each of the first protection member 213 and the second protection member 215 may include a plastic film. For example, each of the first protection member 213 and the second protection member 215 may include a polyimide film or a polyethylene terephthalate film, but embodiments of the present disclosure are not limited thereto.

As another embodiment of the present disclosure, each of the first protection member 213 and the second protection member 215 may include a metal plate or a metal film including a metal material. Each of the first protection member 213 and the second protection member 215 may be connected to the vibration portion 211 by a plurality of adhesive layers. Each of the first protection member 213 and the second protection member 215 including a metal material may complement (or reinforce) a mass of the vibration portion 211 to decrease a resonance frequency of the vibration portion 211 based on an increase in mass, thereby enhancing a sound pressure level characteristic of a low-pitched sound band of the vibration portion 211. For example, each of the first protection member 213 and the second protection member 215 including a metal material may include one or more metal materials among stainless steel, aluminum (Al), magnesium (Mg), a magnesium (Mg)

alloy, a magnesium lithium (Mg—Li) alloy, and an aluminum (Al) alloy, but embodiments of the present disclosure are not limited thereto.

As another embodiment of the present disclosure, one of the first protection member 213 and the second protection member 215 may include a metal material, and the other may include a plastic material or a plastic film. A mass of the vibration portion 211 may increase by a metal material of one of the first protection member 213 and the second protection member 215, thereby enhancing a sound pressure level of a low-pitched sound band of the vibration portion 211.

Therefore, the vibration apparatus according to another embodiment of the present disclosure may be driven through a connection to each other between lines for a signal supplied to the plurality of vibration structures 210A to 210D, and thus, a connection structure of the lines may be simplified.

Figure 25A:
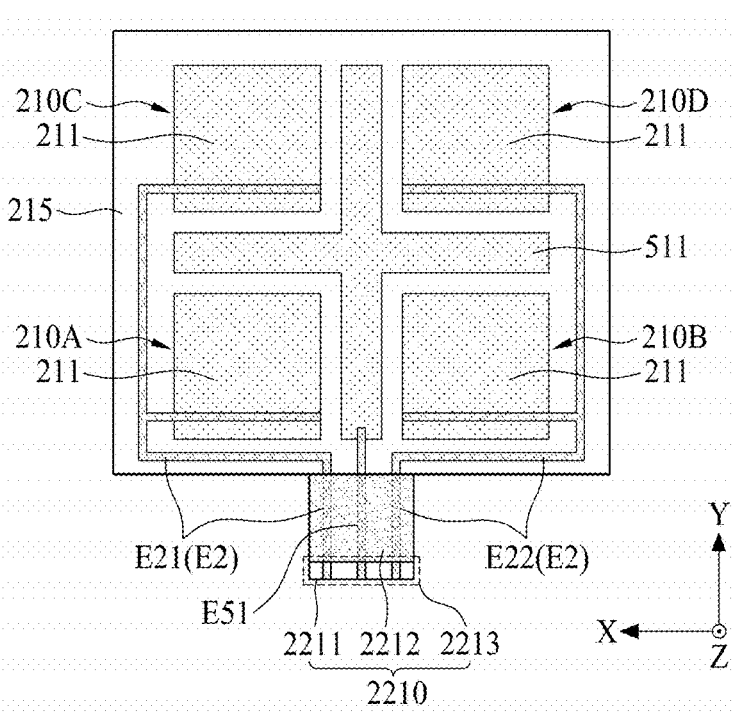
FIG. 25A is a front view illustrating a vibration apparatus according to another embodiment of the present disclosure.
Figure 25B:
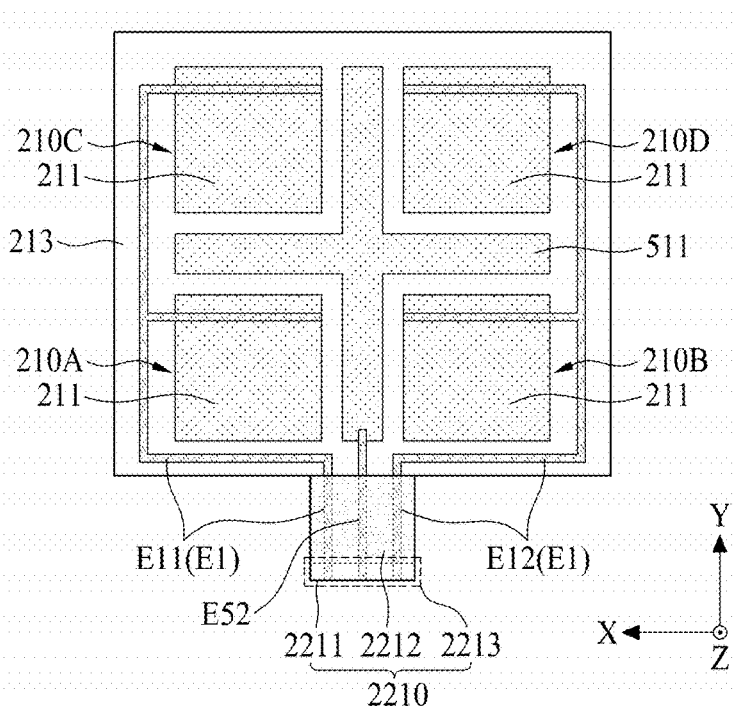
FIG. 25B is a rear view illustrating a vibration apparatus according to another embodiment of the present disclosure.

FIGS. 25A and 25B illustrate a vibration apparatus according to another embodiment of the present disclosure.

FIGS. 25A and 25B illustrate a front view and a rear view of the vibration apparatus of FIG. 20. FIGS. 25A and 25B illustrate an electrode layer connected to a flexible cable in FIGS. 24A and 24B, and descriptions of the other elements are omitted or will be briefly given below. Descriptions of FIGS. 25A and 25B may be applied to FIGS. 17, 18, and 21 to 23.

With reference to FIGS. 25A and 25B, a flexible cable 2210 may include a base member 2211, a plurality of cable lines CL1 to CL6, a protection layer 2212, and a plurality of power lines L11, L12, L21, L22, L51, and L52.

The base member 2211 may include a flexible material, but embodiments of the present disclosure are not limited thereto and may include a non-flexible material.

The plurality of cable lines CL1 to CL6 may be electrically disconnected from one another and may be disposed at the base member 2211. For example, the plurality of cable lines CL1 to CL6 may be apart from one another in a first direction X at the base member 2211.

The flexible cable 2210 according to an embodiment of the present disclosure may include first to sixth cable lines CL1 to CL6.

The protection layer 2212 may cover the first to sixth cable lines CL1 to CL6. The protection layer 2212 may electrically, physically, or chemically protect the first to sixth cable lines CL1 to CL6. The protection layer 2212 may be configured to cover a whole upper surface of the base member 2211 other than one periphery of each of the first to sixth cable lines CL1 to CL6. For example, the protection layer 2212 may include an electric insulating material.

The one periphery (or a lower periphery) of each of the first to sixth cable lines CL1 to CL6 may not be covered by the protection layer 2212 and may be exposed at the outside. For example, the one periphery of each of the first to sixth cable lines CL1 to CL6 may implement a terminal portion 2213 of the flexible cable 2210. The terminal portion 2213 of the flexible cable 2210 may be electrically connected to a driving circuit of a vibration apparatus and may receive a signal from the driving circuit of the vibration apparatus.

Each of the plurality of power lines L11, L12, L21, L22, L51, and L52 may extend (or enlarge) or protrude from the other end (or an upper end) of each of the first to sixth cable lines CL1 to CL6 to the vibration apparatus and may be electrically connected to an electrode layer of a corresponding vibration structure among first to fourth vibration structures 210A to 210D.

The flexible cable 2210 according to an embodiment of the present disclosure may include the first to sixth power lines L11, L12, L21, L22, L51, and L52.

The first power line L21 may be electrically (or commonly) connected to a second electrode layer of each of the first vibration structure 210A and the third vibration structure 210C. For example, the first power line L21 may have a finger shape, or may have a ∈-shape. The second power line L22 may be electrically (or commonly) connected to a second electrode layer of each of the second vibration structure 210B and the fourth vibration structure 210D. For example, the second power line L22 may have a finger shape, or may have a ⊇-shape. The third power line L11 may be electrically (or commonly) connected to a first electrode layer of each of the first vibration structure 210A and the third vibration structure 210C. For example, the third power line L11 may have a finger shape, or may have a ∈-shape. The fourth power line L12 may be electrically (or commonly) connected to a first electrode layer of each of the second vibration structure 210B and the fourth vibration structure 210D. For example, the fourth power line L12 may have a finger shape, or may have a ⊇-shape. The fifth power line L51 may be electrically connected to a first electrode layer of a first pad member 901. For example, the fifth power line L51 may have a straight shape, or may have a "|"-shape. The sixth power line L52 may be electrically connected to a second electrode layer of the first pad member 901. For example, the sixth power line L52 may have a straight shape, or may have a "|"-shape.

Except for that each of the first to sixth power lines L11, L12, L21, L22, L51, and L52 protrudes from the other side (or an end) of each of the first to sixth cable lines CL1 to CL6 to have a corresponding shape, the first to sixth power lines L11, L12, L21, L22, L51, and L52 may be substantially the same as the first to sixth lines L11, L12, L21, L22, L51, and L52 illustrated in FIGS. 24A and 24B, and thus, like reference numerals refer to like elements and their repetitive descriptions may be omitted.

Therefore, the flexible cable 2210 may transfer a driving power to a vibration portion 211 of a vibration apparatus through the first power line L21, the second power line L22, the third power line L11, and the fourth power line L12. Accordingly, the voltage drop, caused by a surface resistance characteristic, of each of a first electrode layer E1 and a second electrode E2 disposed at the vibration portion 211 of the vibration apparatus may be reduced, an electrical characteristic of each of the first electrode layer E1 and the second electrode layer E2 may be complemented, and the degree of selection freedom of a conductive material applied to the first electrode layer E1 and the second electrode E2 may increase.

The flexible cable 2210 may be electrically connected to the first electrode layer E1 and the second electrode layer E2 of the vibration portion 211 at one side of the vibration portion 211 of the vibration apparatus, and thus, may be integrated into the vibration portion 211. For example, the flexible cable 2210 may be directly and electrically connected to the first electrode layer E1 and the second electrode layer E2 of the vibration portion 211 at the one side of the vibration portion 211, and thus, may be integrated into the vibration portion 211. For example, one side portion of the flexible cable 2210 may be inserted or accommodated into the vibration apparatus. For example, the one side portion of the flexible cable 2210 inserted (or accommodated) into the vibration apparatus may be surrounded by an adhesive layer of the vibration apparatus. Accordingly, the vibration apparatus and the flexible cable 2210 may be implemented as one structure or one module (or electrical component), and thus, a connection structure of a power line between the vibration apparatus and the flexible cable 2210 may be simplified.

For example, four vibration structures 210A to 210D may be simultaneously driven by a driving power supplied through the first power line L21, the second power line L22, the third power line L11, and the fourth power line L12 disposed at the flexible cable 2210. Therefore, an electrical connection structure between the vibration portion 211 and the flexible cable 2210 configured to drive four vibration structures 210A to 210D may be simplified. Moreover, in the vibration apparatus according to another embodiment of the present disclosure, the number of terminals disposed at one flexible cable 2210 configured to drive the four vibration structures 210A to 210D may be reduced.

Therefore, in the vibration apparatus according to another embodiment of the present disclosure, a process of patterning a line and pad in each of the first protection member 213 and the second protection member 215 and a soldering process performed between the vibration portion 211 and the flexible cable 2210 may not be needed based on an integration structure between the vibration portion 211 and the flexible cable 2210, and thus, a line structure and a manufacturing process may be simplified. Also, in the vibration apparatus according to another embodiment of the present disclosure, because a line and a pad are not disposed at each of the first protection member 213 and the second protection member 215, a conductive sheet (or a conductive film) may not be disposed between each of the first protection member 213 and the second protection member 215 and the vibration portion 211, and thus, a vibration apparatus having a thin thickness may be implemented based on the omission of the conductive sheet. Also, in the vibration apparatus according to an embodiment of the present disclosure, the driving power may be directly supplied to the vibration portion 211 through the flexible cable 2210. In the vibration apparatus according to an embodiment of the present disclosure, the driving power may be supplied to the vibration portion 211 and the pad member through the flexible cable 2210, and thus, an electrical characteristic of each of the first electrode layer E1 and the second electrode layer E2 disposed at the vibration portion 211 and/or an electrical characteristic of each of the first electrode layer E1 and the second electrode layer E2 disposed at the pad member may be complemented.

Figure 26A:
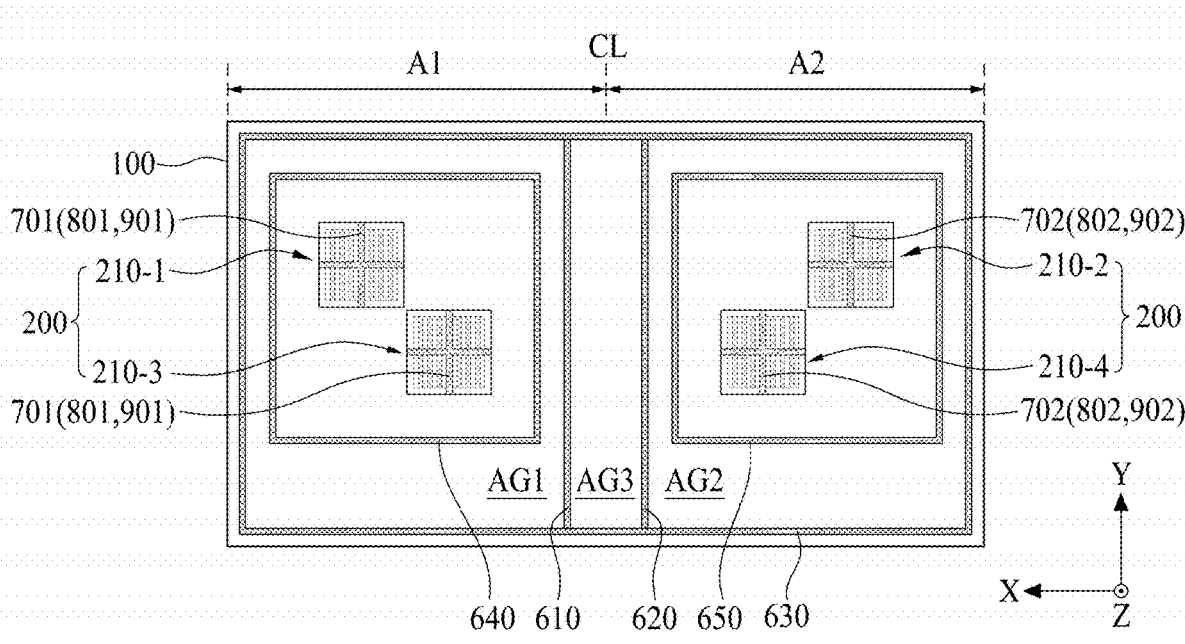
FIG. 26A illustrates an apparatus according to another embodiment of the present disclosure.
Figure 26B:
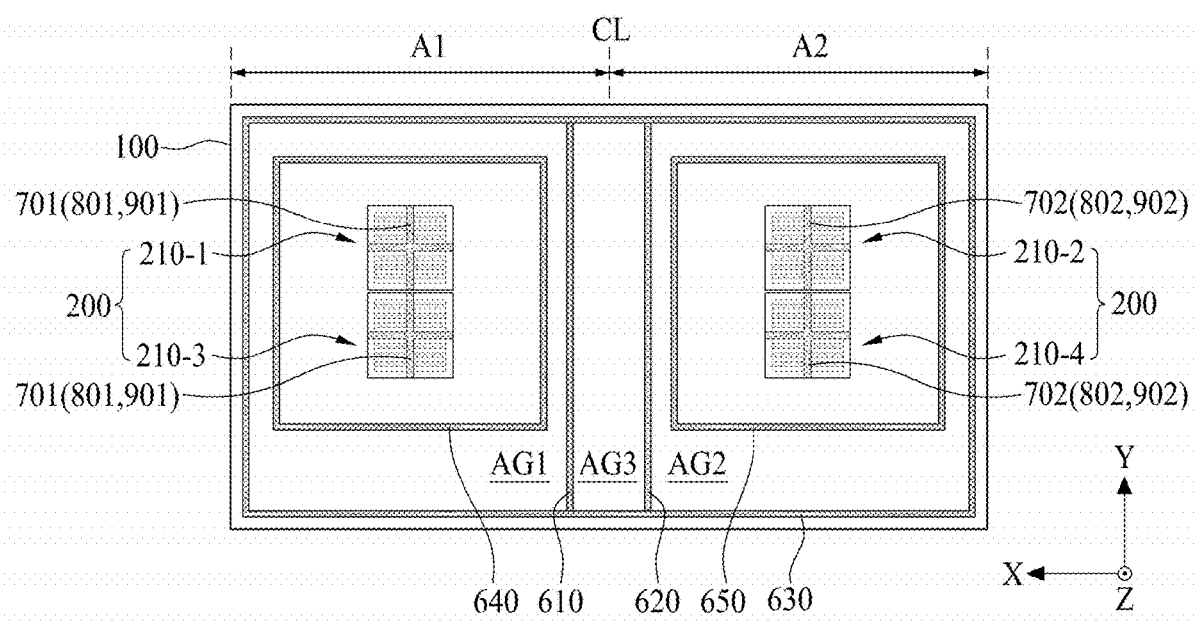
FIG. 26B illustrates an apparatus according to another embodiment of the present disclosure.

FIGS. 26A and 26B illustrate an apparatus according to another embodiment of the present disclosure.

With reference to FIGS. 26A and 26B, a vibration apparatus according to another embodiment of the present disclosure may include a first vibration apparatus 210-1, a second vibration apparatus 210-2, a third vibration apparatus 210-3, and a fourth vibration apparatus 210-4, which are disposed at a rear surface of a display panel 100. Descriptions of FIGS. 26A and 26B may be applied to FIGS. 18 to 23.

With reference to FIG. 26A, each of the first vibration apparatus 210-1 and the third vibration apparatus 210-3 may be disposed at a first region A1 of the display panel 100. For example, each of the first vibration apparatus 210-1 and the third vibration apparatus 210-3 may be disposed to be staggered or in a diagonal direction in the first region A1 of the display panel 100. Accordingly, a vibration area of the first region A1 of the display panel 100 may be increased. For example, the diagonal direction may be a direction between a first direction X and a second direction Y.

The first vibration apparatus 210-1 and the third vibration apparatus 210-3 may be surrounded by a partition 600. For example, the first vibration apparatus 210-1 and the third vibration apparatus 210-3 may be surrounded by a fourth partition member 640 (or a first enclosure).

Each of the first vibration apparatus 210-1 and the third vibration apparatus 210-3 may vibrate the first region A1 of the display panel 100, and thus, may generate a first vibration sound (or a left sound) in the first region A1 of the display panel 100 or may generate a first haptic feedback. For example, a vibration area of the first region A1 of the display panel 100 may enlarge based on a parallel arrangement structure of the first vibration apparatus 210-1 and the third vibration apparatus 210-3, thereby enhancing a sound characteristic including a low-pitched sound band of the left sound. For example, in addition to the first vibration apparatus 210-1, the third vibration apparatus 210-3 may be further disposed at the first region A1 of the display panel 100, and thus, the first vibration sound or the first haptic feedback according to another embodiment of the present disclosure may be more enhanced than the first vibration sound or the first haptic feedback described above with reference to FIG. 16.

According to an embodiment of the present disclosure, the first vibration apparatus 210-1 may be disposed to be close to a periphery in the first region A1 of the display panel 100. For example, the first vibration apparatus 210-1 may be disposed at a left upper region adjacent to a periphery of the display panel 100 in the first region A1 of the display panel 100. The third vibration apparatus 210-3 may be disposed to be close to a center line CL of the display panel 100 in the first region A1 of the display panel 100. For example, the third vibration apparatus 210-3 may be disposed at a right lower region adjacent to the center line CL of the display panel 100 in the first region A1 of the display panel 100. The third vibration apparatus 210-3 may be disposed to be staggered with respect to the first vibration apparatus 210-1 in the first region A1 of the display panel 100, and thus, may not overlap the first vibration apparatus 210-1 in the first direction X and the second direction Y. According to an embodiment of the present disclosure, a diagonal arrangement structure of the first vibration apparatus 210-1 and the third vibration apparatus 210-3 may have an effect where two vibration apparatuses 210-1 and 210-3 are arranged in a 2×2 structure in the first region A1 of the display panel 100, and thus, the number of vibration apparatuses vibrating the first region A1 of the display panel 100 may decrease by half.

Each of the second vibration apparatus 210-2 and the fourth vibration apparatus 210-4 may be disposed at a second region A2 of the display panel 100. For example, each of the second vibration apparatus 210-2 and the fourth vibration apparatus 210-4 may be disposed to be staggered or in a diagonal direction in the second region A2 of the display panel 100. Accordingly, a vibration area of the second region A2 of the display panel 100 may be increased. For example, the diagonal may be a direction between the first direction X and the second direction Y.

The second vibration apparatus 210-2 and the fourth vibration apparatus 210-4 may be surrounded by the partition 600. For example, the second vibration apparatus 210-2 and the fourth vibration apparatus 210-4 may be surrounded by a fifth partition member 650 (or a second enclosure).

Each of the second vibration apparatus 210-2 and the fourth vibration apparatus 210-4 may vibrate the second region A2 of the display panel 100, and thus, may generate a second vibration sound (or a right sound) in the second region A2 of the display panel 100 or may generate a second haptic feedback. For example, a vibration area of the second region A2 of the display panel 100 may enlarge based on a diagonal arrangement structure of the second vibration apparatus 210-2 and the fourth vibration apparatus 210-4, thereby enhancing a sound characteristic including a low-pitched sound band of the right sound. For example, in addition to the second vibration apparatus 210-2, the fourth vibration apparatus 210-4 may be further disposed at the second region A2 of the display panel 100, and thus, the second vibration sound or the second haptic feedback according to another embodiment of the present disclosure may be more enhanced than the second vibration sound or the second haptic feedback described above with reference to FIG. 16.

According to an embodiment of the present disclosure, the second vibration apparatus 210-2 may be disposed to be close to a periphery in the second region A2 of the display panel 100. For example, the second vibration apparatus 210-2 may be disposed at a right upper region adjacent to a periphery of the display panel 100 at the second region A2 of the display panel 100. Also, the first vibration apparatus 210-1 and the second vibration apparatus 210-2 may be a left-right symmetrical with respect to the center line CL of the display panel 100. The fourth vibration apparatus 210-4 may be disposed to be close to the center line CL of the display panel 100 in the second region A2 of the display panel 100. For example, the fourth vibration apparatus 210-4 may be disposed at a left lower region adjacent to the center line CL of the display panel 100 at the second region A2 of the display panel 100. The fourth vibration apparatus 210-4 may be disposed to be staggered with respect to the second vibration apparatus 210-2 in the second region A2 of the display panel 100, and thus, may not overlap the second vibration apparatus 210-2 in the first direction X and the second direction Y. According to an embodiment of the present disclosure, a diagonal arrangement structure of the second vibration apparatus 210-2 and the fourth vibration apparatus 210-4 may have an effect where two vibration apparatuses 210-2 and 210-4 are arranged in a 2×2 structure in the second region A2 of the display panel 100, and thus, the number of vibration apparatuses vibrating the second region A2 of the display panel 100 may decrease by half.

Vibration layers of a plurality of vibration structures included in each of the first to fourth vibration apparatuses 210-1 to 210-4 may be the same or differ. For example, based on a sound characteristic needed for the apparatus, the vibration layer of each of the plurality of vibration structures included in each of the first to fourth vibration apparatuses 210-1 to 210-4 may include a vibration portion 211 and 221 which are the same as or different from one or more among the vibration portion 211 and 221 described above with reference to FIGS. 3 to 5F, and 7 to 10. When the vibration layer of the vibration portion 211 and 221 of each of the plurality of vibration structures included in each of the first to fourth vibration apparatuses 210-1 to 210-4 includes different vibration portion 211 and 221 among the vibration portion 211 described above with reference to FIGS. 3 to 5F, and 7 to 10, the vibration apparatus 200 may have various resonance frequencies, and thus, a sound pressure level characteristic of a sound and a reproduction band of a sound generated based on a vibration of the vibration apparatus 200 may be considerably increased.

An arrangement structure of the first to fourth vibration apparatuses 210-1 to 210-4 is not limited to an arrangement structure illustrated in FIG. 26A. For example, in each of the first region A1 and the second region A2 of the display panel 100, when a direction between a left upper portion and a right lower portion is referred to as a first diagonal direction and a direction between a right upper portion and a left lower portion is referred to as a second diagonal direction, the first vibration apparatus 210-1 and the third vibration apparatus 210-3 may be disposed in a first diagonal direction or a second diagonal direction, and the second vibration apparatus 210-2 and the fourth vibration apparatus 210-4 may be disposed in a diagonal direction, which is the same as or different from a diagonal arrangement direction of the first vibration apparatus 210-1 and the third vibration apparatus 210-3, of the first diagonal direction or the second diagonal direction. For example, the first vibration apparatus 210-1 and the second vibration apparatus 210-2 may be disposed in a left-right symmetrical structure or a left-right asymmetrical structure with respect to the center line CL of the display panel 100. Also, the third vibration apparatus 210-3 and the fourth vibration apparatus 210-4 may be disposed in a left-right symmetrical structure or a left-right asymmetrical structure with respect to the center line CL of the display panel 100.

Therefore, the apparatus according to another embodiment of the present disclosure may provide a sound to a user, output a sound having a two or more-channel to a forward region in front of the display panel 100, decrease a resonance frequency of the vibration apparatus 200, and dissipate heat of the display panel 100. Moreover, in the apparatus according to another embodiment of the present disclosure, a vibration area of each of the first region A1 and the second region A2 may increase based on a diagonal arrangement structure of the first vibration apparatus 210-1 and the third vibration apparatus 210-3 and a diagonal arrangement structure of the second vibration apparatus 210-2 and the fourth vibration apparatus 210-4, and thus, a sound pressure level characteristic of a low-pitched sound band may be more enhanced.

With reference to FIG. 26B, each of a first vibration apparatus 210-1 and a third vibration apparatus 210-3 may be disposed at a first region A1 of a display panel 100. For example, the first vibration apparatus 210-1 and the third vibration apparatus 210-3 may be disposed in parallel in a first direction X (or a widthwise direction) in the first region A1 of the display panel 100. For example, the first vibration apparatus 210-1 and the third vibration apparatus 210-3 may be disposed in one row in a second direction Y (or a lengthwise direction) in the first region A1 of the display panel 100.

The first vibration apparatus 210-1 and the third vibration apparatus 210-3 may be surrounded by a partition 600. For example, the first vibration apparatus 210-1 and the third vibration apparatus 210-3 may be surrounded by a fourth partition member 640 (or a first enclosure).

Each of the first vibration apparatus 210-1 and the third vibration apparatus 210-3 may vibrate the first region A1 of the display panel 100, and thus, may generate a first vibration sound (or a left sound) in the first region A1 of the display panel 100 or may generate a first haptic feedback. For example, a vibration area of the first region A1 of the display panel 100 may enlarge based on a parallel arrangement structure of the first vibration apparatus 210-1 and the third vibration apparatus 210-3, thereby enhancing a sound characteristic including a low-pitched sound band of the left sound. For example, in addition to the first vibration apparatus 210-1, the third vibration apparatus 210-3 may be further disposed at the first region A1 of the display panel 100, and thus, the first vibration sound or the first haptic feedback according to another embodiment of the present disclosure may be more enhanced than the first vibration sound or the first haptic feedback described above with reference to FIG. 16.

According to an embodiment of the present disclosure, with respect to a center line of the first region A1 of the display panel 100 parallel to the first direction X, the first vibration apparatus 210-1 may be disposed over a center line, and the third vibration apparatus 210-3 may be disposed under the center line. The first vibration apparatus 210-1 and the third vibration apparatus 210-3 may be symmetrical (or vertically symmetrical) with respect to the center line. A vibration area of the first region A1 of the display panel 100 may increase based on a parallel arrangement structure of the first vibration apparatus 210-1 and the third vibration apparatus 210-3, and thus, a sound characteristic including a low-pitched sound band characteristic of a left sound may be enhanced.

According to an embodiment of the present disclosure, with respect to the second direction Y, an interval (or a separation distance) between the first vibration apparatus 210-1 and the third vibration apparatus 210-3 may be 0.1 mm or more and smaller than 3 cm, but embodiments of the present disclosure are not limited thereto. Accordingly, the occurrence of a crack or damage caused by a physical contact between the first vibration apparatus 210-1 and the third vibration apparatus 210-3 may be prevented.

Each of a second vibration apparatus 210-2 and a fourth vibration apparatus 210-4 may be disposed at a second region A2 of the display panel 100. For example, each of the second vibration apparatus 210-2 and the fourth vibration apparatus 210-4 may be disposed in parallel in the first direction X (or the widthwise direction) in the second region A2 of the display panel 100. For example, each of the second vibration apparatus 210-2 and the fourth vibration apparatus 210-4 may be disposed in one row in the second direction Y (or the lengthwise direction) in the second region A2 of the display panel 100.

The second vibration apparatus 210-2 and the fourth vibration apparatus 210-4 may be surrounded by the partition 600. For example, the second vibration apparatus 210-2 and the fourth vibration apparatus 210-4 may be surrounded by a fifth partition member 650 (or a second enclosure).

Each of the second vibration apparatus 210-2 and the fourth vibration apparatus 210-4 may vibrate the second region A2 of the display panel 100, and thus, may generate a second vibration sound (or a right sound) in the second region A2 of the display panel 100 or may generate a second haptic feedback. For example, a vibration area of the second region A2 of the display panel 100 may enlarge based on a diagonal arrangement structure of the second vibration apparatus 210-2 and the fourth vibration apparatus 210-4, thereby enhancing a sound characteristic including a low-pitched sound band of the right sound. For example, in addition to the second vibration apparatus 210-2, the fourth vibration apparatus 210-4 may be further disposed at the second region A2 of the display panel 100, and thus, the second vibration sound or the second haptic feedback according to another embodiment of the present disclosure may be more enhanced than the second vibration sound or the second haptic feedback described above with reference to FIG. 16.

According to an embodiment of the present disclosure, with respect to a center line of the second region A2 of the display panel 100 parallel to the first direction X, the second vibration apparatus 210-2 may be disposed over the center line, and the fourth vibration apparatus 210-4 may be disposed under the center line. The second vibration apparatus 210-2 and the fourth vibration apparatus 210-4 may be symmetrical (or vertically symmetrical) with respect to the center line. A vibration area of the second region A2 of the display panel 100 may increase based on a parallel arrangement structure of the second vibration apparatus 210-2 and the fourth vibration apparatus 210-4, and thus, a sound characteristic including a low-pitched sound band characteristic of a right sound may be enhanced.

According to an embodiment of the present disclosure, with respect to the second direction Y, an interval (or a separation distance) between the second vibration apparatus 210-2 and the fourth vibration apparatus 210-4 may be 0.1 mm or more and smaller than 3 cm, but embodiments of the present disclosure are not limited thereto. Accordingly, the occurrence of a crack or damage caused by a physical contact between the second vibration apparatus 210-2 and the fourth vibration apparatus 210-4 may be prevented.

Vibration layers of a plurality of vibration structures included in each of the first to fourth vibration apparatuses 210-1 to 210-4 may be the same or differ. For example, based on a sound characteristic needed for the apparatus, the vibration layer of each of the plurality of vibration structures included in each of the first to fourth vibration apparatuses 210-1 to 210-4 may include a vibration portion 211 and 221 which are the same as or different from one or more among the vibration portion 211 and 221 described above with reference to FIGS. 3 to 5F, and 7 to 10. When the vibration layer of the vibration portion 211 and 221 of each of the plurality of vibration structures included in each of the first to fourth vibration apparatuses 210-1 to 210-4 includes different vibration portion 211 and 221 among the vibration portion 211 described above with reference to FIGS. 3 to 5F, and 7 to 10, the vibration apparatus 200 may have various resonance frequencies, and thus, a sound pressure level characteristic of a sound and a reproduction band of a sound generated based on a vibration of the vibration apparatus 200 may be considerably increased.

According to an embodiment of the present disclosure, in FIG. 26B, it has been described that the first vibration apparatus 210-1 and the third vibration apparatus 210-3 are disposed in one row in the second direction Y (or the lengthwise direction), but embodiments of the present disclosure are not limited thereto. For example, the first vibration apparatus 210-1 and the third vibration apparatus 210-3 may be disposed in a parallel arrangement structure which is disposed in one row in the first direction X (or the widthwise direction), and even in this case, the same effect as FIG. 26 may be realized. Also, the second vibration apparatus 210-2 and the fourth vibration apparatus 210-4 may be disposed in a parallel arrangement structure which is disposed in one row in the first direction X (or the widthwise direction), and even in this case, the same effect as FIG. 26 may be realized.

With reference to FIGS. 26A and 26B, a plurality of first pad members 701, 801, and 901 may be disposed at a plurality of vibration structures of the first vibration apparatus 210-1. A plurality of first pad members 701, 801, and 901 may be disposed at a plurality of vibration structures of the third vibration apparatus 210-3. A plurality of second pad members 702, 802, and 902 may be disposed at a plurality of vibration structures of the second vibration apparatus 210-2. A plurality of second pad members 702, 802, and 902 may be disposed at a plurality of vibration structures of the fourth vibration apparatus 210-4. A description of a pad member may be substantially the same as descriptions given above with reference to FIGS. 18 to 23, and thus, its description is omitted.

Each of the plurality of vibration structures included in each of the first vibration apparatus 210-1, the second vibration apparatus 210-2, the third vibration apparatus 210-3, and the fourth vibration apparatus 210-4 may include a first portion and a second portion of the vibration portion (or vibration layer). With reference to FIG. 26A, an arrangement direction of the first portion of the vibration portion may be the same as an arrangement direction of the second portion of the vibration portion, but embodiments of the present disclosure are not limited thereto. For example, the arrangement direction of the first portion and the arrangement direction of the second portion in the vibration portion may be the same as a lengthwise direction of the display panel 100. For example, the arrangement direction of the first portion and the arrangement direction of the second portion in the vibration portion may be the same as the second direction Y of the display panel 100. For example, an arrangement direction of a first portion and an arrangement direction of a second portion in the vibration portion of the first vibration apparatus 210-1 may be adjusted to be identical to the lengthwise direction of the display panel 100, and an arrangement direction of a first portion and an arrangement direction of a second portion in the vibration portion of the third vibration apparatus 210-3 may be adjusted to be identical to the widthwise direction of the display panel 100, but the present disclosure may be implemented to be opposite thereto. For example, an arrangement direction of a first portion and an arrangement direction of a second portion in the vibration portion of the second vibration apparatus 210-2 may be adjusted to be identical to the lengthwise direction of the display panel 100, and an arrangement direction of a first portion and an arrangement direction of a second portion in the vibration portion of the fourth vibration apparatus 210-4 may be adjusted to be identical to the widthwise direction of the display panel 100, but the present disclosure may be implemented to be opposite thereto.

As another embodiment of the present disclosure, an arrangement direction of a first portion and an arrangement direction of a second portion in the vibration portion of the first vibration apparatus 210-1 may be adjusted to be identical to the lengthwise direction of the display panel 100, and an arrangement direction of a first portion and an arrangement direction of a second portion in the vibration portion of the second vibration apparatus 210-2 may be adjusted to be identical to the widthwise direction of the display panel 100, but the present disclosure may be implemented to be opposite thereto. For example, an arrangement direction of a first portion and an arrangement direction of a second portion in the vibration portion of the third vibration apparatus 210-3 may be adjusted to be identical to the lengthwise direction of the display panel 100, and an arrangement direction of a first portion and an arrangement direction of a second portion in the vibration portion of the fourth vibration apparatus 210-4 may be adjusted to be identical to the widthwise direction of the display panel 100, but the present disclosure may be implemented to be opposite thereto.

For example, an arrangement direction of a first portion and an arrangement direction of a second portion in the vibration portion included in each of the first vibration apparatus 210-1 and the second vibration apparatus 210-2 may be symmetrical with an arrangement direction of a first portion and an arrangement direction of a second portion in the vibration portion included in each of the third vibration apparatus 210-3 and the fourth vibration apparatus 210-4. As another embodiment of the present disclosure, an arrangement direction of a first portion and an arrangement direction of a second portion in the vibration portion included in each of the first vibration apparatus 210-1 and the second vibration apparatus 210-2 may be asymmetrical with an arrangement direction of a first portion and an arrangement direction of a second portion in the vibration portion included in each of the third vibration apparatus 210-3 and the fourth vibration apparatus 210-4. For example, an arrangement direction of a first portion and an arrangement direction of a second portion in the vibration portion of the first vibration apparatus 210-1 may differ from an arrangement direction of a first portion and an arrangement direction of a second portion in the vibration portion of the third vibration apparatus 210-3. For example, an arrangement direction of a first portion and an arrangement direction of a second portion in the vibration portion of the second vibration apparatus 210-2 may differ from an arrangement direction of a first portion and an arrangement direction of a second portion in the vibration portion of the fourth vibration apparatus 210-4.

With reference to FIGS. 26A and 26B, the apparatus according to an embodiment of the present disclosure may further include a partition 600. For example, the partition 600 may include a first partition member 610, a second partition member 620, a third partition member 630, a fourth partition member 640, and a fifth partition member 650. However, embodiments of the present disclosure are not limited thereto, and the partition 600 may include the first partition member 610, the third partition member 630, the fourth partition member 640, and the fifth partition member 650. Descriptions thereof may be the same as descriptions given above with reference to FIGS. 16 and 17, and thus, their repetitive descriptions are omitted.

FIG. 27 illustrates a sound output characteristic of an apparatus according to another embodiment of the present disclosure.

A sound output characteristic may be measured by a sound analysis apparatus. The sound output characteristic has been measured by a B&K audio measurement apparatus. The sound analysis apparatus may include a sound card which transmits or receives a sound to or from a control personal computer (PC), an amplifier which amplifies a signal generated from the sound card and transfers the amplified signal to a vibration apparatus, and a microphone which collects a sound generated by the vibration apparatus in a display panel. For example, the microphone may be disposed at a center of the vibration apparatus, and a distance between the display panel and the microphone may be 50 cm. A sound may be measured under a condition where the microphone is vertical to the vibration apparatus. The sound collected through the microphone may be input to the control PC through the sound card, and a control program may check the input sound to analyze a sound of the vibration apparatus. For example, a frequency response characteristic corresponding to a frequency range of 20 Hz to 20 kHz may be measured by using a pulse program.

FIG. 27 shows a result obtained by measuring a sound output characteristic with respect to a thickness of a pad member. FIG. 27 shows a result obtained by measuring a sound output characteristic of the apparatus of FIG. 18 or 21. A dotted line represents that the thickness of the pad member is 0.3 mm, and a one-dashed line represents that the thickness of the pad member is 0.6 mm. A solid line represents that the thickness of the pad member is 0.9 mm, and a thick solid line represents that the thickness of the pad member is 1.2 mm. In FIG. 27, the abscissa axis represents a frequency (Hz), and the ordinate axis represents a sound pressure level (SPL) (dB).

With reference to FIG. 27, when the thickness of the pad member according to an embodiment of the present disclosure increases, it may be seen that a sound pressure level increases in about 900 Hz to about 1.1 kHz.

Therefore, because a pad member is provided in a plurality of vibration structures, an apparatus with enhanced sound pressure level may be provided.

FIG. 28 illustrates a sound output characteristic of an apparatus according to another embodiment of the present disclosure.

The measurement of the sound output characteristic is the same as description given above with reference to FIG. 27, and thus, repeated descriptions are omitted.

A dotted line of FIG. 28 represents an example to which the pad member of FIG. 19 or 22 is applied, and a solid line of FIG. 28 represents an example to which the pad member of FIG. 20 or 23 is applied.

Comparing with the dotted line, in the solid line, it may be seen that a sound pressure level is enhanced in a frequency of about 400 Hz to about 1 kHz. For example, it may be seen that a sound pressure level is about 81 dB in a frequency of about 400 Hz when a pad member is provided outside a plurality of vibration structures corresponding to the dotted line, and a sound pressure level is about 83 dB in a frequency of about 400 Hz when a pad member is provided in a plurality of vibration structures corresponding to the solid line. Comparing with the solid line, in the dotted line, it may be seen that a sound pressure level is enhanced in a frequency of about 500 Hz to about 900 Hz. For example, it may be seen that a sound pressure level is about 81 dB in a frequency of about 400 Hz when a pad member is provided outside a plurality of vibration structures corresponding to the dotted line, and a sound pressure level is about 83 dB in a frequency of about 400 Hz when the pad member is provided in the plurality of vibration structures corresponding to the solid line. Therefore, when a pad member is provided in a plurality of vibration structures, it may be seen that a sound pressure level is enhanced in a frequency of a middle-pitched sound band. When a pad member is provided in a plurality of vibration structures, it may be seen that a sound pressure level is enhanced in a frequency of a low-pitched sound band. Accordingly, a pad member may be provided in a plurality of vibration structures, thereby providing an apparatus having a sound pressure level which is enhanced in low-pitched to middle-pitched sound bands.

The vibration apparatus according to an embodiment of the present disclosure may be applied to a vibration apparatus disposed at an apparatus. The apparatus according to an embodiment of the present disclosure may be applied to mobile apparatuses, video phones, smart watches, watch phones, wearable apparatuses, foldable apparatuses, rollable apparatuses, bendable apparatuses, flexible apparatuses, curved apparatuses, electronic organizers, electronic book, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theater apparatuses, theater display apparatuses, TVs, wall paper display apparatuses, signage apparatuses, game machines, notebook computers, monitors, cameras, camcorders, home appliances, etc. Also, the vibration apparatus according to an embodiment of the present disclosure may be applied to organic light emitting lighting apparatuses or inorganic light emitting lighting apparatuses. When the vibration apparatus of an embodiment of the present disclosure is applied to lighting apparatuses, the vibration apparatus may act as lighting and a speaker. Also, when the vibration apparatus of an embodiment of the present disclosure is applied to a mobile device, the vibration apparatus may act as one or more of a speaker, a receiver, and a haptic, but embodiments of the present disclosure are not limited thereto.

A vibration apparatus and an apparatus including the same according to an embodiment of the present disclosure will be described below.

An apparatus according to an embodiment of the present disclosure may include a display panel configured to display an image, a vibration apparatus disposed at a rear surface of the display panel to vibrate the display panel, the vibration apparatus including a plurality of vibration structures, and a pad member disposed outside or inside the vibration apparatus.

According to some embodiments of the present disclosure, the pad member may be disposed between the plurality of vibration structures.

According to some embodiments of the present disclosure, the pad member may include a plurality of pad members, each of which is configured to be equal to each of the plurality of vibration structures.

According to some embodiments of the present disclosure, the pad member may include the same material as a material of the plurality of vibration structures.

According to some embodiments of the present disclosure, the apparatus may further include a supporting member disposed at the rear surface of the display panel, the pad member may be disposed between the supporting member and the vibration apparatus.

According to some embodiments of the present disclosure, the supporting member may be spaced apart from the rear surface of the display panel with a gap space therebetween.

According to some embodiments of the present disclosure, the apparatus may further include a partition disposed between the display panel and the supporting member and configured to separate the plurality of vibration structures from each other.

According to some embodiments of the present disclosure, a region between the plurality of vibration structures may overlap the pad member.

According to some embodiments of the present disclosure, the vibration apparatus comprises N (where N is a natural number of 2 or more) or more vibration structures.

According to some embodiments of the present disclosure, the vibration structures may be disposed spaced apart from one another in a widthwise direction or a lengthwise direction of the display panel intersecting with the widthwise direction.

According to some embodiments of the present disclosure, with respect to the widthwise direction, a separation distance between the vibration structures may be 0.1 mm or more and smaller than 3 cm.

According to some embodiments of the present disclosure, the apparatus may further include a supporting member disposed at the rear surface of the display panel and a partition disposed between the display panel and the supporting member, and the partition may be configured to separate the plurality of vibration structures from each other.

According to some embodiments of the present disclosure, each of the plurality of vibration structures may include a first portion and a second portion between adjacent first portions.

According to some embodiments of the present disclosure, an arrangement direction of the first portion and an arrangement direction of the second portion may be the same as a widthwise direction of the display panel, a lengthwise direction of the display panel, or a combination thereof.

According to some embodiments of the present disclosure, the first portion may include an inorganic material, and the second portion comprises an organic material.

According to some embodiments of the present disclosure, the pad member may be disposed to correspond to the first portion.

According to some embodiments of the present disclosure, the vibration apparatus may include a plurality of vibration generators including the plurality of vibration structures.

According to some embodiments of the present disclosure, each of the plurality of vibration generators may be stacked to be displaced in the same direction.

According to some embodiments of the present disclosure, the vibration apparatus may include a vibration portion, a first protection member disposed at a first surface of the vibration portion, and a second protection member disposed at a second surface different from the first surface of the vibration portion.

According to some embodiments of the present disclosure, the vibration apparatus may further include a first electrode layer between the vibration portion and the first protection member, and a second electrode layer between the vibration portion and the second protection member.

According to some embodiments of the present disclosure, the vibration apparatus may include a vibration portion, a first electrode layer disposed at a first surface of the vibration portion, and a second electrode layer disposed at a second surface different from the first surface of the vibration portion.

According to some embodiments of the present disclosure, the vibration apparatus may further include a first protection member disposed on the first electrode layer, and a second protection member disposed below the second electrode layer.

According to some embodiments of the present disclosure, the vibration apparatus may further include a first adhesive layer disposed between the first electrode layer and the first protection member and between the vibration structures, and a second adhesive layer disposed between second first electrode layer and the second protection member and between the vibration structures.

According to some embodiments of the present disclosure, the vibration apparatus may further include a first power supply line disposed at the first protection member, a second power supply line disposed at the second protection member, and a pad part electrically connected to each of the first power supply line and the second power supply line.

According to some embodiments of the present disclosure, the pad member may include a vibration layer, a first electrode layer disposed at a first surface of the vibration layer, and a second electrode layer disposed at a second surface different from the first surface of the vibration layer.

According to some embodiments of the present disclosure, with respect to the display panel, a polarity of the first electrode layer of each of the plurality of vibration structures may differ from a polarity of the second electrode layer of the pad member.

According to some embodiments of the present disclosure, the first electrode layer of each of the plurality of vibration structures may be disposed closer to the display panel than the second electrode layer, and the second electrode layer of the pad member may be disposed closer to the display panel than the first electrode layer.

According to some embodiments of the present disclosure, the first protection member and the second protection member of each of the plurality of vibration structures may share the pad member.

According to some embodiments of the present disclosure, the apparatus may further include a plate between the display panel and the vibration apparatus.

A vibration apparatus according to an embodiment of the present disclosure may include a vibration portion including a plurality of vibration structures, and a pad member outside or inside the vibration portion.

According to some embodiments of the present disclosure, the pad member may include the same material as a material of the vibration structures.

According to some embodiments of the present disclosure, the pad member may be disposed between the plurality of vibration structures.

According to some embodiments of the present disclosure, the pad member may include a plurality of pad members, and each the vibration structures may have a corresponding pad member.

According to some embodiments of the present disclosure, the pad member may be disposed parallelly with the vibration structures of the vibration generator.

According to some embodiments of the present disclosure, the vibration apparatus may comprise a plurality of vibration generators, each including the plurality of vibration structures, and the vibration generators and the pad member may be disposed in a stacked arrangement.

According to some embodiments of the present disclosure, the vibration portion comprises a vibration layer, a first electrode layer disposed at a first surface of the vibration layer, and a second electrode layer disposed at a second surface different from the first surface of the vibration layer.

According to some embodiments of the present disclosure, the vibration apparatus may further include a first protection member disposed at a first surface of the first electrode layer, and a second protection member disposed at a second surface different from the first surface of the first electrode layer.

According to some embodiments of the present disclosure, the first protection member and the second protection member of the vibration portion may share the pad member.

According to some embodiments of the present disclosure, the pad member may include a vibration layer, a first electrode layer disposed at a first surface of the vibration layer, and a second electrode layer disposed at a second surface different from the first surface of the vibration layer.

According to some embodiments of the present disclosure, a polarity of the first electrode layer of the vibration portion may differ from a polarity of the second electrode layer of the pad member.

According to some embodiments of the present disclosure, the pad member may be disposed in the separation region between the vibration structures, the first electrode layer of the vibration structure may correspond to the second electrode layer of the pad member and the second electrode layer of the vibration structure may correspond to the first electrode layer of the pad member, and a polarity of the first electrode layer of the vibration structure may differ from a polarity of the second electrode layer of the pad member.

An apparatus according to some embodiments of the present disclosure may include a vibration member, and a vibration apparatus disposed at the vibration member, the vibration apparatus may include a vibration portion including a plurality of vibration structures, and a pad member outside or inside the vibration portion.

According to some embodiments of the present disclosure, the vibration object may include a plate, and the plate may include a metal material, or may include a single nonmetal material or a composite nonmetal material of one or more among wood, plastic, glass, cloth, and leather.

According to some embodiments of the present disclosure, the vibration object may include a display panel including a plurality of pixels configured to display an image, or may include one non-display panel among a light emitting diode lighting panel, an organic light emitting lighting panel, and an inorganic light emitting lighting panel.

According to some embodiments of the present disclosure, the vibration member may include a display panel including a plurality of pixels configured to display an image, or may include one or more among a vehicle interior material, a vehicle glass window, a building ceiling, a building glass window, a building interior material, an aircraft interior material, and an aircraft glass window.

According to some embodiments of the present disclosure, the vibration portion may include vibration layer, a first electrode layer disposed at a first surface of the vibration layer, and a second electrode layer disposed at a second surface different from the first surface of the vibration layer.

According to some embodiments of the present disclosure, the vibration layer may include a first portion including an inorganic material and a second portion between adjacent first portions, and the second portion may include an organic material.

According to some embodiments of the present disclosure, the pad member may include the same material as a material of the vibration layer.

According to some embodiments of the present disclosure, the first electrode layer may be disposed closer to the vibration object than the second electrode layer.

According to some embodiments of the present disclosure, the pad member may include a vibration layer, a first electrode layer disposed at a first surface of the vibration layer, and a second electrode layer disposed at a second surface different from the first surface of the vibration layer.

According to some embodiments of the present disclosure, the second electrode layer of the pad member may be disposed closer to the vibration object than the first electrode layer.

According to some embodiments of the present disclosure, a polarity of the first electrode layer of the vibration portion may differ from a polarity of the second electrode layer of the pad member.

According to some embodiments of the present disclosure, the vibration portion may include a plurality of vibration generators, and each of the plurality of vibration generators may include the plurality of vibration structures.

According to some embodiments of the present disclosure, the pad member may include a plurality of pad members, each of which is configured to be equal to each of the plurality of vibration structures.

It will be apparent to those skilled in the art that various modifications and variations can be made in the apparatus of the present disclosure without departing from the technical idea or scope of the disclosures. Thus, it is intended that embodiments of the present disclosure cover the modifications and variations of the disclosure provided they come within the scope of the appended claims and their equivalents.

What is claimed is:

1. An apparatus, comprising:

a display panel configured to display an image;

a vibration apparatus disposed at a rear surface of the display panel to vibrate the display panel, the vibration apparatus including a plurality of vibration structures, and at least one of the plurality of vibration structures including a plurality of layers stacked on each other; and a pad member disposed outside or inside the vibration apparatus, the pad member having a different shape from the plurality of vibration structures in a plan view and including a plurality of layers stacked on each other, wherein each of the plurality of layers of the pad member comprises a same material as a material comprised in a respective one of the plurality of layers of the at least one of the plurality of vibration structures, wherein the pad member is spaced apart from the plurality of vibration structures, overlaps a region between the plurality of vibration structures, and has a same shape as the region between the plurality of vibration structures, wherein the pad member has a smaller size than the vibration apparatus, and wherein the pad member is a resonance control pad configured to adjust a resonance of the vibration apparatus and to prevent a resonance frequency in the region between the plurality of vibration structures.

2. The apparatus of claim 1, wherein:

the plurality of vibration structures are spaced apart from each other in the plan view; and the pad member is disposed inside the vibration apparatus between the plurality of vibration structures and on a same plane as the plurality of vibration structures, or the pad member has a "+"-shape in the plan view.

3. The apparatus of claim 2, further comprising at least one other pad member including a plurality of layers stacked on each other, wherein each of the plurality of layers of the at least one other pad member includes the same material as the material comprised in the respective one of the plurality of layers of the at least one of the plurality of vibration structures.

4. The apparatus of claim 1, further comprising a supporting member disposed at the rear surface of the display panel, wherein the pad member is disposed outside the vibration apparatus between the supporting member and the vibration apparatus.

5. The apparatus of claim 4, wherein the supporting member is spaced apart from the rear surface of the display panel with a gap space therebetween.

6. The apparatus of claim 4, further comprising a partition disposed between the display panel and the supporting member and configured to separate the plurality of vibration structures from each other.

7. The apparatus of claim 4, wherein:

the pad member overlaps the region between the plurality of vibration structures and has a "+"-shape in the plan view.

8. The apparatus of claim 1, wherein the vibration apparatus comprises N (where N is a natural number of 2 or more) or more vibration structures.

9. The apparatus of claim 8, wherein the vibration structures are disposed spaced apart from one another in a widthwise direction or a lengthwise direction of the display panel intersecting with the widthwise direction.

10. The apparatus of claim 1, further comprising:

a supporting member disposed at the rear surface of the display panel; and a partition disposed between the display panel and the supporting member, wherein the partition is configured to separate the plurality of vibration structures from each other.

11. The apparatus of claim 1, wherein each of the plurality of vibration structures comprises a first portion and a second portion between adjacent first portions.

12. The apparatus of claim 11, wherein an arrangement direction of the first portion and an arrangement direction of the second portion are the same as a widthwise direction of the display panel, a lengthwise direction of the display panel, or a combination thereof.

13. The apparatus of claim 11, wherein the first portion comprises an inorganic material, and the second portion comprises an organic material.

14. The apparatus of claim 11, wherein the pad member is disposed to correspond to the first portion.

15. The apparatus of claim 1, wherein the vibration apparatus comprises a plurality of vibration generators including the plurality of vibration structures.

16. The apparatus of claim 15, wherein the plurality of vibration generators are stacked on each other to be displaced in the same direction.

17. The apparatus of claim 1, wherein:

one of the plurality of layers of the at least one of the plurality of vibration structures is a vibration portion; and the vibration apparatus further comprises:

a first protection member disposed at a first surface of the vibration portion; and a second protection member disposed at a second surface different from the first surface of the vibration portion.

18. The apparatus of claim 17, wherein the plurality of layers of the at least one of the plurality of vibration structures further comprise:

a first electrode layer between the vibration portion and the first protection member; and a second electrode layer between the vibration portion and the second protection member.

19. The apparatus of claim 18, wherein the vibration apparatus further comprises:

a first adhesive layer disposed between the first electrode layer and the first protection member and between the plurality of vibration structures; and a second adhesive layer disposed between second electrode layer and the second protection member and between the plurality of vibration structures.

20. The apparatus of claim 18, wherein the vibration apparatus further comprises:

a first power supply line disposed at the first protection member;

a second power supply line disposed at the second protection member; and a pad part electrically connected to each of the first power supply line and the second power supply line.

21. The apparatus of claim 18, wherein the pad member comprises:

a vibration layer comprising the same material as the vibration portion of the at least one of the plurality of vibration structures;

a first electrode layer disposed at a first surface of the vibration layer; and a second electrode layer disposed at a second surface different from the first surface of the vibration layer.

22. The apparatus of claim 21, wherein, with respect to the display panel, a polarity of the first electrode layer of the at least one of the plurality of vibration structures differs from a polarity of the second electrode layer of the pad member.

23. The apparatus of claim 21, wherein:

the first electrode layer of the at least one of the plurality of vibration structures is disposed closer to the display panel than the second electrode layer of the at least one of the plurality of vibration structures is, and the second electrode layer of the pad member is disposed closer to the display panel than the first electrode layer of the pad member is.

24. The apparatus of claim 17, wherein the first protection member and the second protection member of each of the plurality of vibration structures share the pad member.

25. The apparatus of claim 1, further comprising a plate between the display panel and the vibration apparatus.

26. A vibration apparatus, comprising:

a vibration portion including a plurality of vibration structures, at least one of the plurality of vibration structures including a plurality of layers stacked on each other; and a pad member outside or inside the vibration portion, the pad member having a different shape from the plurality of vibration structures in a plan view and including a plurality of layers stacked on each other, wherein each of the plurality of layers of the pad member comprises a same material as a material comprised in a respective one of the plurality of layers of the at least one of the plurality of vibration structures, wherein the pad member is spaced apart from the plurality of vibration structures, overlaps a region between the plurality of vibration structures, and has a same shape as the region between the plurality of vibration structures, wherein the pad member has a smaller size than the vibration apparatus, and wherein the pad member is a resonance control pad configured to adjust a resonance of the vibration portion and to prevent a resonance frequency in the region between the plurality of vibration structures.

27. The vibration apparatus of claim 26, wherein:

the pad member has a "+"-shape in the plan view.

28. The vibration apparatus of claim 26, wherein the pad member includes a plurality of pad members, and wherein each of the plurality of vibration structures has a corresponding pad member.

29. The vibration apparatus of claim 26, wherein the pad member is disposed in parallel with the plurality of vibration structures of a vibration generator.

30. The vibration apparatus of claim 26, wherein the vibration apparatus comprises a plurality of vibration generators, each including the plurality of vibration structures, and wherein the vibration generators and the pad member are disposed in a stacked arrangement.

31. The vibration apparatus of claim 26, wherein the vibration portion comprises:

a vibration layer;

a first electrode layer disposed at a first surface of the vibration layer; and a second electrode layer disposed at a second surface different from the first surface of the vibration layer.

32. The vibration apparatus of claim 31, further comprising:

a first protection member disposed at a first surface of the first electrode layer; and a second protection member disposed at a second surface different from the first surface of the first electrode layer.

33. The vibration apparatus of claim 32, wherein the first protection member and the second protection member of the vibration portion share the pad member.

34. The vibration apparatus of claim 31, wherein the pad member comprises:

a vibration layer;

a first electrode layer disposed at a first surface of the vibration layer; and a second electrode layer disposed at a second surface different from the first surface of the vibration layer.

35. The vibration apparatus of claim 34, wherein a polarity of the first electrode layer of the vibration portion differs from a polarity of the second electrode layer of the pad member.

36. The vibration apparatus of claim 34, wherein:

the pad member is disposed in a separation region between the plurality of vibration structures, the first electrode layer of the vibration portion corresponds to the second electrode layer of the pad member and the second electrode layer of the vibration portion corresponds to the first electrode layer of the pad member, and a polarity of the first electrode layer of the vibration portion differs from a polarity of the second electrode layer of the pad member.

37. An apparatus, comprising:

a vibration member; and a vibration apparatus disposed at the vibration member, wherein the vibration apparatus comprises:

a vibration portion including a plurality of vibration structures, at least one of the plurality of vibration structures including a plurality of layers stacked on each other; and a pad member outside or inside the vibration portion, the pad member having a different shape from the plurality of vibration structures in a plan view and including a plurality of layers stacked on each other, and wherein each of the plurality of layers of the pad member comprises a same material as a material comprised in a respective one of the plurality of layers of the at least one of the plurality of vibration structures, wherein the pad member is spaced apart from the plurality of vibration structures, overlaps a region between the plurality of vibration structures, and has a same shape as the region between the plurality of vibration structures, wherein the pad member has a smaller size than the vibration apparatus, and wherein the pad member is a resonance control pad configured to adjust a resonance of the vibration apparatus and to prevent a resonance frequency in the region between the plurality of vibration structures.

38. The apparatus of claim 37, wherein:

the vibration member comprises a plate, and the plate comprises a metal material, or comprises a single nonmetal material or a composite nonmetal material of one or more among wood, plastic, glass, cloth, and leather.

39. The apparatus of claim 37, wherein the vibration member comprises a display panel including a plurality of pixels configured to display an image, or comprises one non-display panel among a light emitting diode lighting panel, an organic light emitting lighting panel, and an inorganic light emitting lighting panel.

40. The apparatus of claim 37, wherein the vibration member comprises a display panel including a plurality of pixels configured to display an image, or comprises one or more among a vehicle interior material, a vehicle glass window, a building ceiling, a building glass window, a building interior material, an aircraft interior material, and an aircraft glass window.

41. The apparatus of claim 37, wherein the vibration portion comprises:

a vibration layer;

a first electrode layer disposed at a first surface of the vibration layer; and a second electrode layer disposed at a second surface different from the first surface of the vibration layer.

42. The apparatus of claim 41, wherein the vibration layer comprises a first portion including an inorganic material and a second portion between adjacent first portions, and the second portion includes an organic material.

43. The apparatus of claim 41, wherein the first electrode layer is disposed closer to the vibration member than the second electrode layer.

44. The apparatus of claim 41, wherein the pad member comprises:

a vibration layer;

a first electrode layer disposed at a first surface of the vibration layer; and a second electrode layer disposed at a second surface different from the first surface of the vibration layer.

45. The apparatus of claim 44, wherein the second electrode layer of the pad member is disposed closer to the vibration member than the first electrode layer.

46. The apparatus of claim 44, wherein a polarity of the first electrode layer of the vibration portion differs from a polarity of the second electrode layer of the pad member.

47. The apparatus of claim 37, wherein:

the vibration portion comprises a plurality of vibration generators; and each of the plurality of vibration generators comprise the plurality of vibration structures.

48. The apparatus of claim 37, wherein the pad member includes a plurality of pad members, each of which is configured to be equal to each of the plurality of vibration structures.

\* \* \* \* \*